US012419305B2

(12) United States Patent
Bandera et al.

(10) Patent No.: US 12,419,305 B2
(45) Date of Patent: *Sep. 23, 2025

(54) ANTIMICROBIAL COMPOSITIONS

(71) Applicant: Firmenich SA, Satigny (CH)

(72) Inventors: Monica Bandera, Satigny (CH); Yang Huang, Shanghai (CN); Gary Marr, Plainsboro, NJ (US); Nicholas O'Leary, Plainsboro, NJ (US); Mylene Therrien, Satigny (CH); Daniel Reichlin, Bernex (CH)

(73) Assignee: FIRMENICH SA, Satigny (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,377

(22) Filed: Sep. 11, 2023

(65) Prior Publication Data

US 2024/0000078 A1 Jan. 4, 2024

Related U.S. Application Data

(62) Division of application No. 16/954,332, filed as application No. PCT/EP2019/056727 on Mar. 18, 2019, now Pat. No. 11,785,945.

(30) Foreign Application Priority Data

Mar. 20, 2018 (WO) ................ PCT/CN2018/079526

(51) Int. Cl.
| A01N 43/30 | (2006.01) |
| A01N 31/02 | (2006.01) |
| A01N 31/04 | (2006.01) |
| A01N 31/06 | (2006.01) |
| A01N 31/08 | (2006.01) |

(52) U.S. Cl.
CPC ............ *A01N 43/30* (2013.01); *A01N 31/02* (2013.01); *A01N 31/04* (2013.01); *A01N 31/06* (2013.01); *A01N 31/08* (2013.01)

(58) Field of Classification Search
CPC ........ A01N 43/30; A01N 31/02; A01N 31/04; A01N 31/06; A01N 31/08; A01N 49/00; A01N 31/16; A01N 35/04; A01N 37/02; A01N 43/08; A01N 43/16; A01P 1/00

See application file for complete search history.

(56) References Cited

U.S. PATENT DOCUMENTS

| 5,861,546 A | 1/1999 | Sagi et al. |
| 6,319,958 B1 | 11/2001 | Johnson et al. |
| 7,759,058 B2 | 7/2010 | Bretler |
| 2005/0014827 A1 | 1/2005 | Schur |
| 2007/0161526 A1* | 7/2007 | Vlad ............... A61Q 13/00 510/130 |
| 2010/0041774 A1 | 2/2010 | Grascha et al. |
| 2010/0183692 A1 | 7/2010 | Natsch |
| 2020/0016049 A1* | 1/2020 | Rassat ............... C11D 3/505 |

FOREIGN PATENT DOCUMENTS

| CA | 2270835 A1 | 5/1998 |
| CH | 690263 A5 | 6/2000 |
| CN | 1330917 A | 1/2002 |
| CN | 101076315 A | 11/2007 |
| CN | 103347386 A | 10/2013 |
| EP | 2759199 A1 | 7/2014 |
| JP | 2003510343 A | 3/2003 |
| JP | 2004513153 A | 4/2004 |
| JP | 2009132665 A | 6/2009 |
| JP | 2010530855 A | 9/2010 |
| WO | 0124769 A1 | 4/2001 |
| WO | 2005079573 A1 | 9/2005 |
| WO | 2011036048 A1 | 3/2011 |
| WO | 2018024886 A2 | 2/2018 |

OTHER PUBLICATIONS

Bowles et al., "Inhibition of Foodborne Bacterial Pathogens by Naturally Occurring Food Additives", Journal of Food Safety, Jul. 1998, pp. 101-112, 18(2).
Kotan et al., "Screening of antibacterial activities of twenty-one oxygenated monoterpenes", Zeitschrift fur Naturforschung. C, Journal of Biosciences, 2007, pp. 507-513, 62(7-8).
Shimizu et al., "The Antibacterial Activity of Fragrance Ingredients against Legionella pneumophila", Biological & Pharmaceutical Bulletin, Jun. 2009, pp. 1114-1117, 32(6).
Han et al., "Experimental Observation on Germicidal Efficacy of α-Terpilenol", Chinese Journal of Disinfection, 2014, pp. 333-335, 31(4).
Zhang, "Study on the activity and mechanism of p-Anisaldehyde against *Staphylococcus aureus*", Chinese Master's Dissertations Full-Text Database Medical Science and Technology Series, Dec. 2, 2016, pp. 1-5.
Nomura et al., "Effects of Fragrance Ingredients on the Uptake of Legionella pneumophila into Acanthamoeba castellanii", Biocontrol Science, 2018, pp. 241-244, 23(4).
International Search Report and Written Opinion for PCT/EP2019/056727 issued on Sep. 17, 2019, 21 pages.

* cited by examiner

*Primary Examiner* — Snigdha Maewall
(74) *Attorney, Agent, or Firm* — Armstrong Teasdale LLP

(57) ABSTRACT

The various aspects presented herein relate to the field of antimicrobial compositions and their use as antibacterial agents, or their use for the preparation of antimicrobially active perfuming compositions and consumer products.

15 Claims, 3 Drawing Sheets

ANTIMICROBIAL COMPOSITIONS

CROSS-REFERENCE TO RELATED APPLICATIONS

The present application is divisional application of U.S. application Ser. No. 16/954,332, filed Jun. 16, 2020, which is a U.S. National Stage Application of International Patent Application Serial No. PCT/EP19/56727, filed Mar. 18, 2019, which claims priority to International Patent Application Serial No. PCT/CN18/79526, filed on Mar. 20, 2018, the entire contents of each of which are hereby incorporated by reference in their entirety.

FIELD

The present disclosure relates to the field of antimicrobial compositions and their use as antibacterial agents, or their use for the preparation of antimicrobially active perfuming compositions and consumer products.

BACKGROUND

Hygiene is a vast subject, which in its fullest meaning goes beyond simple 'cleanliness' to include, in addition to products, processes and devices, all circumstances and practices, lifestyle habits and premises that engender and foster a safe and healthy environment. In particular, hygiene refers to conditions and practices that help to maintain health and prevent the spread of diseases and therefore includes a specific set of practices associated with this preservation of health, for example environmental cleaning, sterilization of equipment, hand hygiene, water and sanitation or safe disposal of medical waste.

To improve hygiene, compounds having antimicrobial effects have been developed. However, the most currently used biocides such as Triclocarban and Triclosan are questioned by consumer or/and authorities, as such products are suspected to be endocrine disrupters. Consequently, there is a need to find antimicrobial ingredients having no or lower side effects, while maintaining a good antimicrobial activity.

In one example, U.S. Pat. No. 7,759,058 discloses an antimicrobial composition containing at least 30% by weight of one or more perfuming ingredients including nona-2,6-dien-1-ol.

In another example, International Patent Application Publication No. WO2005079573 reports a fragrance composition providing, as expected, an organoleptic effect but also an antifungal activity in a vapor phase. The antifungal composition comprises at least 50% by weight of the total composition of at least two perfuming ingredients selected from several lists of ingredients comprising, among others, 2,6-nonadienol and thymol. However, according to those teachings, a large amount of perfuming ingredients is required to deliver antimicrobial properties, which strongly influences the odor profile of the end-product containing those compositions, therefore limiting their use as an antimicrobial agent.

In another example, U.S. Pat. No. 9,339,477 discloses an antimicrobial composition for personal cleaning, oral care or hard surface cleaning applications. Wherein, it was found that compositions comprising thymol, selected propen-2-yl-methyl-cyclohexanols, and a carrier provide synergistic antimicrobial action.

In another example, U.S. Pat. No. 5,453,276 discloses antimicrobial compositions for controlling *P. aeruginosa* or *P. acnes* which contains indole and a naturally occurring substance selected from the group consisting of anacardic acid, limonene, beta-pinene, farnesol, beta-citronellol, pine resin, hinokitiol, longifolene, and beta-caryophyllene.

However, despite the availability of antimicrobial compounds and compositions, there remains a continuous need to find alternative antimicrobial compositions and active compounds that are suitable for use in such compositions. Without intending to be limited to any particular theory, the availability of alternatives may reduce the risk of development of microbial resistance and/or insensitivity to particular antimicrobial compounds.

Therefore, there is still a need to provide compositions having an antimicrobial effect, comprising ingredients having a minor impact on the overall perfume profile of the product in which the composition is added while maintaining or even improving the efficacy of the compositions in order to shorter contact time required for effective antimicrobial action.

The present disclosure provides a solution to the above mentioned problem by using as an antimicrobial agent, compositions that contain perfume ingredients, capable of providing significant antimicrobial effect at a low concentration of perfume ingredient.

SUMMARY

In one aspect, the present disclosure provides a composition containing perfume ingredients, wherein the composition is selected from the group consisting of:
i. 3-(1,3-Benzodioxol-5-yl)-2-methylpropanal (hereinafter "heliopropanal"), (Z)-3,7-dimethyl-2,6-octadien-1-ol (hereinafter "nerol"), phenylhexanol, and 3,7-Dimethyl-3-octanol (hereafter "tetralinol");
ii. 4-Methoxybenzaldehyde (hereinafter "anisic aldehyde"), 1,3-Benzodioxole-5-carbaldehyde (hereinafter "heliotropin"), and 2-(4-Methylcyclohex-3-en-1-yl)propan-2-ol (hereinafter "terpineol");
iii. anisic aldehyde, heliotropin, terpineol, and heliopropanal;
iv. gamma-dodecalactone (hereinafter "decal"), 2-Methoxy-4-(prop-1-en-1-yl)phenol (hereinafter "isoeugenol"), (S)-(−)-(4-Isopropenyl-1-cyclohexenyl)methanol (hereinafter "perycorolle"), and tetralinol;
v. phenylhexanol, terpineol, and isoeugenol;
vi. phenylhexanol, terpineol, isoeugenol, and 2H-chromen-2-one (hereinafter "coumarine");
vii. 2-Methoxy-4-(prop-2-en-1-yl)phenol (hereinafter "eugenol F"), phenyl hexanol, and dimethyl phenyl ethyl carbinol (hereinafter "carbinol muguet"); and
viii. eugenol F, phenyl hexanol, carbinol muguet, and benzyl acetate,
wherein the perfume ingredients are present in the composition in an amount sufficient to provide an antimicrobial effect.

In one aspect, the composition provides the antimicrobial effect by inactivating bacterial cells. In one aspect, bacterial cells comprise a bacterial strain selected from the group consisting of: *Corynebacterium xerosis, Pseudomonas aeruginosa, Salmonella enterica, Staphylococcus haemolyticus, Staphylococcus aureus* and *Escherichia coli*.

In one aspect, the present invention provides a method, comprising treating a substrate comprising microbes with a composition according to some aspects of the present disclosure, in an amount effective to provide an antimicrobial effect.

In one aspect, the composition comprises heliopropanal, nerol, phenylhexanol, and tetralinol. In one aspect, the ratio of the heliopropanal, nerol, phenylhexanol, and tetralinol is 6:3:5:6. In one aspect, the amount effective of the composition to provide an antimicrobial effect is 0.05 to 0.5% w/v.

In one aspect, the composition comprises anisic aldehyde, heliotropin, and terpineol. In one aspect, the ratio of the anisic aldehyde, heliotropin, and terpineol is 13:20:3. In one aspect, the amount effective of the composition to provide an antimicrobial effect is 0.3 to 0.6% w/v.

In one aspect, the composition comprises anisic aldehyde, heliotropin, terpineol, and heliopropanal. In one aspect, the ratio of the anisic aldehyde, heliotropin, terpineol, and heliopropanal is 13:20:3:20. In one aspect, the amount effective of the composition to provide an antimicrobial effect is 0.2 to 0.5% w/v.

In one aspect, the composition comprises decal, isoeugenol, perycorolle, and tetralinol. In one aspect, the ratio of the decal, isoeugenol, perycorolle, and tetralinol is 2:1:5:2. In one aspect, the amount effective of the composition to provide an antimicrobial effect is 0.05 to 0.5% w/v.

In one aspect, the composition comprises phenylhexanol, terpineol, and isoeugenol. In one aspect, the ratio of the phenylhexanol, terpineol, and isoeugenol is 2:5:5. In one aspect, the amount effective of the composition to provide an antimicrobial effect is 0.06 to 0.5% w/v.

In one aspect, the composition comprises phenylhexanol, terpineol, isoeugenol, and coumarine. In one aspect, the ratio of the phenylhexanol, terpineol, isoeugenol, and coumarine is 5:1:1:2. In one aspect, the amount effective of the composition to provide an antimicrobial effect is 0.03 to 0.5% w/v.

In one aspect, the composition comprises eugenol F, phenylhexanol, and carbinol muguet. In one aspect, the ratio of the eugenol F, phenylhexanol, and carbinol is 1:5:10. In one aspect, the amount effective of the composition to provide an antimicrobial effect is 0.06 to 0.5% w/v.

In one aspect, the composition comprises eugenol F, phenylhexanol, carbinol muguet, and benzyl acetate. In one aspect, the ratio of the eugenol F, phenylhexanol, carbinol muguet, and benzyl acetate is 1:5:10:10. In one aspect, the amount effective of the composition to provide an antimicrobial effect is 0.1 to 0.6% w/v.

In one aspect, the composition comprises phenylhexanol and at least one perfume ingredient selected from the group consisting of: heliopropanal, nerol, tetralinol, isoeugenol, terpineol, coumarine, eugenol F, carbinol muguet, and benzyl acetate.

In one aspect, the composition comprises anisic aldehyde and at least one perfume ingredient selected from the group consisting of: heliotropin, terpineol, and heliopropanal.

In one aspect, the amount effective of the phenylhexanol in the composition is from 500 to 6000 ppm.

In one aspect, the amount effective of the heliopropanal in the composition is from 2000 to 6000 ppm.

In one aspect, the amount effective of the tetralinol in the composition is from 1000 to 4000 ppm.

In one aspect, the amount effective of the isoeugenol in the composition is from 500 to 3000 ppm.

In one aspect, the amount effective of the terpineol in the composition is from 500 to 3000 ppm.

In one aspect, the amount effective of the coumarine in the composition is from 1000 to 3000 ppm.

In one aspect, the amount effective of the eugenol F in the composition is from 200 to 1000 ppm.

In one aspect, the amount effective of the carbinol muguet in the composition is from 4000 to 7000 ppm.

In one aspect, the amount effective of the benzyl acetate in the composition is from 4000 to 6000 ppm.

In one aspect, the amount effective of the anisic aldehyde in the composition is from 2500 to 4500 ppm.

In one aspect, the amount effective of the heliotropin in the composition is from 4000 to 6000 ppm.

In one aspect, the amount effective of the decal in the composition is from 1000 to 3000 ppm.

In one aspect, the amount effective of the perycorolle in the composition is from 4000 to 6000 ppm.

In one aspect, the composition further comprises at least one ingredient selected from the group consisting of a perfumery carrier, a perfuming co-ingredient and mixtures thereof; and optionally at least one perfumery adjuvant.

In one aspect, the composition is formulated as a consumer product, wherein the consumer product is a perfume, a fabric care product, a body-care product, a cosmetic preparation, a skin-care product, an air care product or a home care product. In one aspect, the consumer product is a fine perfume, a splash or eau de perfume, a cologne, an shave or after-shave lotion, a liquid or solid detergent, a fabric softener, a fabric refresher, an ironing water, a paper, a bleach, a carpet cleaners, curtain-care products a shampoo, a coloring preparation, a color care product, a hair shaping product, a dental care product, a disinfectant, an intimate care product, a hair spray, a vanishing cream, a deodorant or antiperspirant, hair remover, tanning or sun product, nail products, skin cleansing, a makeup, a perfumed soap, shower or bath mousse, oil or gel, or a foot/hand care products, a hygiene product, an air freshener, a "ready to use" powdered air freshener, a mold remover, furnisher care, wipe, a dish detergent or hard-surface detergent, a leather care product, a car care product.

DETAILED DESCRIPTION

Figure 1:
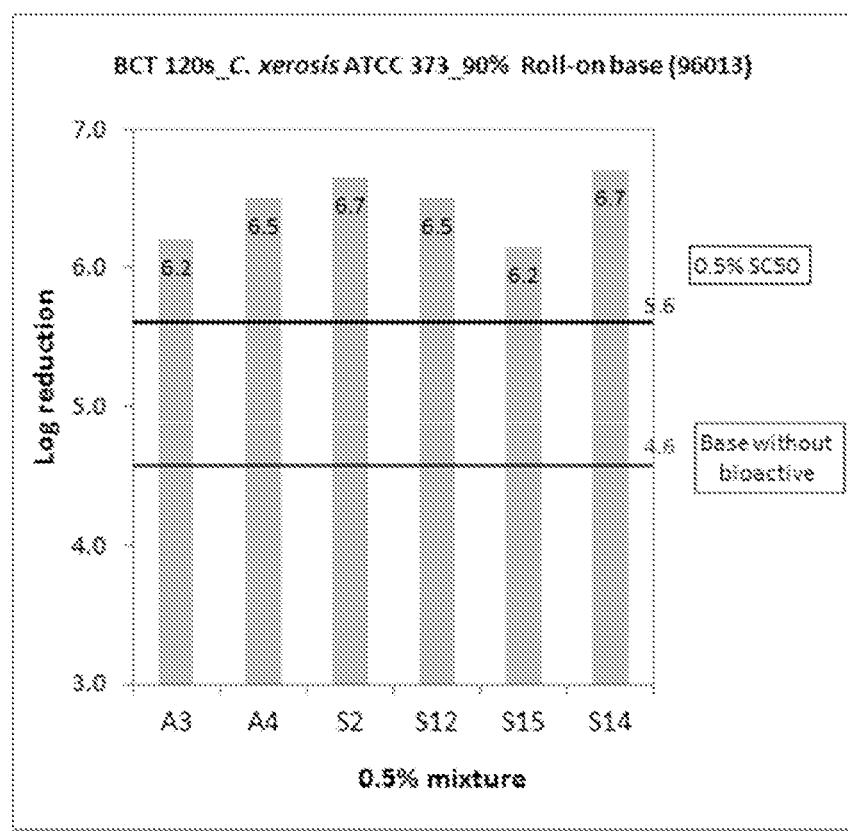
FIG. 1 shows the effect of deodorant formulations comprising compositions according to some embodiments of the present disclosure on the reduction of growth of the bacterial strain *C. xerosis*, as determined using the BCT test according to the methods described in Examples 1 and 2.

In the following description, reference is made to specific embodiments which may be practiced, which is shown by way of illustration. These embodiments are described in detail to enable those skilled in the art to practice the invention described herein, and it is to be understood that other embodiments may be utilized and that logical changes may be made without departing from the scope of the aspects presented herein. The following description of example embodiments is, therefore, not to be taken in a limited sense, and the scope of the various aspects presented herein is defined by the appended claims.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

As shown in the examples below, the compositions presented herein demonstrate an antimicrobial effect. In some aspects, the antimicrobial effect is bactericidal, wherein bacterial cells are inactivated or killed. Alternatively, in some aspects, the antimicrobial effect is bacteriostatic, wherein the growth rate of bacterial cells is reduced, arrested, or inhibited.

According to a particular aspect, the compositions provide a synergistic antimicrobial effect; i.e. an effect which is superior to the simple sum or addition of the antimicrobial effect expected when the ingredients of the composition would have been admixed in the desired concentration. In other words, in such cases, antibacterial activity of the combination of combined ingredients is greater than the sum of activities of the individual ingredients.

Referring to the Examples 1 to 3 below, the synergistic effect of the perfume ingredients in the antimicrobial combinations presented herein was discovered by testing a wide range of concentrations (doses) of individual perfume ingredients and mixtures, and observing the bactericidal effect against the noted microbial strains (*Corynebacterium xerosis*, *Pseudomonas aeruginosa*, *Salmonella enterica*, *Staphylococcus haemolyticus*, *Staphylococcus aureus* and *Escherichia coli*). A determination of the synergistic effect of compositions comprising three or more perfume ingredients was made using the combination index (CI) method for multi-drug systems, described by Chou, T., in Pharmaceutical Reviews 58:621-681 (2006). The CI method determines synergism or antagonism based on the mass-action law principle.

The dose-effect relationship for each drug is described in the below median-effect equation:

$$D=D_m[f_a/(1-f_a)]^{1/m}$$

Where:
D is a dose that has any given degree of effect ($f_a$);
$D_m$ is the median-effect dose;
m is the is the coefficient signifying the shape of the dose-effect relationship.

The general equation for the combination index (CI) for n-drug combination at x % effect is as below:

$$^n(CI)_x = \sum_j^{n=1} \frac{Dj}{D}$$

Where
D is drug j "alone" that has effect of x %,
Dj is the dose of drug j 'in combination' that has effect of x %

The table below denotes the CI values associated with antagonism, additive effects, and synergistic effects.

| Description of synergism or antagonism in drug combination studies analyzed with the combination index method | |
|---|---|
| Range of CI | Description |
| <0.1 | Very strong synergism |
| 0.1-0.3 | Strong synergism |
| 0.3-0.7 | Synergism |
| 0.7-0.85 | Moderate Synergism |
| 0.85-0.90 | Slight synergism |
| 0.90-1.10 | Nearly additive |
| 1.10-1.20 | Slight antagonism |
| 1.20-1.45 | Moderate antagonism |
| 1.45-3.3 | Antagonism |
| 3.3-10 | Strong antagonism |
| >10 | Very strong antagonism |

The use of the compositions as defined here-in is particularly advantageous to inactivate microorganisms such as bacteria. The antimicrobial effect is one of the main requirements of hygiene products such as body care or home care products. The antimicrobial effect of the compositions provided herein may be determined using any method readily selected by one of ordinary skill in the art. One example of a method for determining the antimicrobial effect of the compositions provided herein is the determination of the effect of the inactivation of bacteria, following contacting the bacteria with an antimicrobial composition (referred to herein as a bacterial contact time (BCT) test). Examples 1 to 3 below describe the BCT test utilized.

In some aspects, the present disclosure provides a composition containing perfume ingredients, wherein the composition is selected from the group consisting of:
i. heliopropanal, nerol, phenylhexanol, and tetralinol;
ii. anisic aldehyde, heliotropin, and terpineol;
iii. anisic aldehyde, heliotropin, terpineol, and heliopropanal;
iv. decal, isoeugenol, perycorolle, and tetralinol;
v. phenylhexanol, terpineol, and isoeugenol;
vi. phenylhexanol, terpineol, isoeugenol, and coumarine;
vii. eugenol F, phenylhexanol, and carbinol muguet; and
viii. eugenol F, phenylhexanol, carbinol muguet, and benzyl acetate,
  wherein the perfume ingredients are present in the composition in an amount sufficient to provide an antimicrobial effect.

In some aspects, the individual ingredients themselves possess an antimicrobial activity; however, the amount sufficient to provide the antimicrobial effect for the individual ingredient when combined in the composition is less than the amount sufficient to provide the antimicrobial effect of a given individual ingredient used separately.

In some aspects, the amount sufficient to provide an antimicrobial effect has no impact on the overall odor profile of the composition.

In some aspects, the composition of the present disclosure, or the use thereof, enables the amount of other bioactive ingredients such as, for example, triclosan, to be reduced, without impacting the overall perfume profile as the antimicrobial effect of the composition is obtained at low dosages.

In some aspects the present disclosure provides a use, or a method of use of a composition containing perfume ingredients, wherein the composition is selected from the group consisting of:
i. heliopropanal, nerol, phenylhexanol, and tetralinol;
ii. anisic aldehyde, heliotropin, and terpineol;
iii. anisic aldehyde, heliotropin, terpineol, and heliopropanal;
iv. decal, isoeugenol, perycorolle, and tetralinol;
v. phenylhexanol, terpineol, and isoeugenol;
vi. phenylhexanol, terpineol, isoeugenol, and coumarine;
vii. eugenol F, phenylhexanol, and carbinol muguet; and viii. eugenol F, phenylhexanol, carbinol muguet, and benzyl acetate, wherein the perfume ingredients are present in the composition in an amount sufficient to provide an antimicrobial effect.

In some aspects, the composition provides the antimicrobial effect by inactivating bacterial cells. In one aspect, bacterial cells comprise a bacterial strain selected from the group consisting of: *Corynebacterium xerosis*, *Pseudomonas aeruginosa*, *Salmonella enterica*, *Staphylococcus haemolyticus*, *Staphylococcus aureus* and *Escherichia coli*.

In some aspects, the present invention provides a method, comprising treating a substrate comprising microbes with a composition according to some aspects of the present disclosure, in an amount effective to provide an antimicrobial effect.

By "terpineol", it is meant the normal meaning in the art; i.e. α-terpineol, β-terpineol, γ-terpineol, terpinen-4-ol or mixture thereof. Alternatively the terpineol presents in the composition is α-terpineol or terpinen-4-ol. Alternatively, terpineol presents in the composition is α-terpineol. In some aspects, the compound has the following structure:

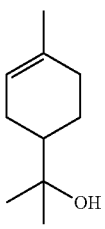

The perfume ingredient 4-methoxybenzaldehyde is also known as anisic aldeyhde, or the compound having the structure:

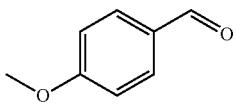

The perfume ingredient 1,3-benzodioxole-5-carbaldehyde is also known as heliotropine, or the compound having the structure:

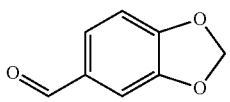

The perfume ingredient gamma-dodecalactone is also known as decal, or the compound having the structure:

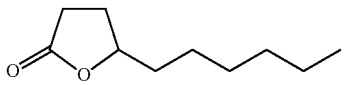

The perfume ingredient (Z)-3,7-dimethyl-2,6-octadien-1-ol is also known as nerol, or the compound having the structure:

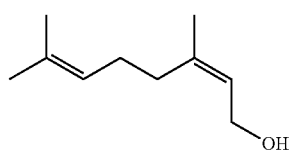

The perfume ingredient 2-Methoxy-4-(prop-1-en-1-yl)phenol is also known as isoeugenol, or the compound having the structure:

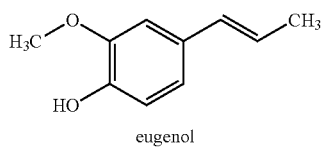

eugenol

The perfume ingredient 2H-chromen-2-one is also known as coumarine, or the compound having the structure:

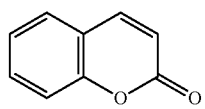

The perfume ingredient 2-Methoxy-4-(prop-2-en-1-yl)phenol is also known as eugenol F, or the compound having the structure:

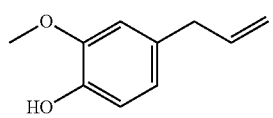

The perfume ingredient dimethyl phenyl ethyl carbinol is also known as carbinol muguet, or the compound having the structure:

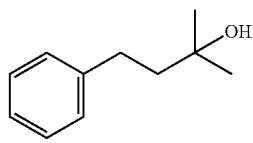

The perfume ingredient (S)-(−)-(4-Isopropenyl-1-cyclohexenyl)methanol is also known as perycorolle, or the compound having the structure:

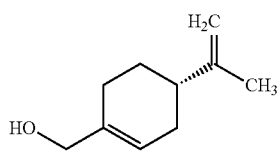

The perfume ingredient 3-(1,3-Benzodioxol-5-yl)-2-methylpropanal is also known as heliopropanal, or the compound having the structure:

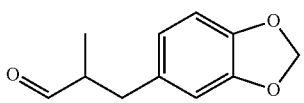

The perfume ingredient 3-methyl-5-phenyl-1-pentanol is also known as phenylhexanol, or the compound having the structure:

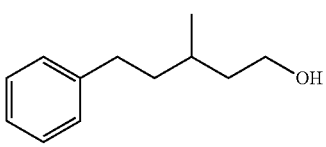

The perfume ingredient 3,7-Dimethyl-3-octanol is also known as tetralinol, or the compound having the structure:

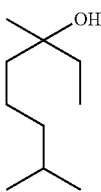

The perfume ingredient benzyl acetate, or the compound having the structure:

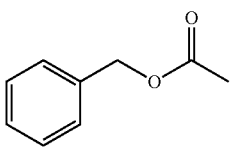

According to any one of the above aspects, the composition is used as an antibacterial agent. A non-limiting list of bacteria for which the composition are particularly effective includes *Escherichia coli* (ATCC 10536), *Corynebacterium xerosis* (ATCC 373), *Pseudomonas aeruginosa* (ATCC 15442), *Salmonella enterica* (ATCC 10708), *Staphylococcus haemolyticus* (ATCC 114126), or *Staphylococcus aureus* (ATCC 6538).

By the term "antimicrobial agent", it is meant the normal meaning in the art; i.e. an agent which kills microorganism or inhibits their growth.

In some aspects, the present disclosure provides an antimicrobial composition comprising heliopropanal, nerol, phenylhexanol, and tetralinol.

Alternatively, in some aspects, the present disclosure provides the use of an antimicrobial composition comprising heliopropanal, nerol, phenylhexanol, and tetralinol.

Alternatively, the present disclosure provides a non-therapeutic method of affecting microbial activity, the method comprising treating a substrate comprising microbes with a composition comprising heliopropanal, nerol, phenylhexanol, and tetralinol, wherein the substrate is treated with the composition in an amount effective to provide an antimicrobial effect.

In some aspects, the present disclosure provides an antimicrobially active consumer product comprising heliopropanal, nerol, phenylhexanol, and tetralinol.

Alternatively, in some aspects, the present disclosure provides the use, or a method of using an antimicrobial composition comprising heliopropanal, nerol, phenylhexanol, and tetralinol for the preparation of an antimicrobially active consumer product.

In some aspects, the present disclosure provides a non-therapeutic method of affecting microbial activity, the method comprising treating a substrate comprising microbes with the antimicrobially active consumer product comprising heliopropanal, nerol, phenylhexanol, and tetralinol, wherein the substrate is treated with the composition in an amount effective to provide an antimicrobial effect.

By the expression "antimicrobially active consumer product" it is meant the normal meaning in the art: i.e. a consumer product which is expected to inhibit the growth of microorganism or to kill the microorganism present on the surface to which it is applied (e.g. skin, hair, textile, or home surface).

In some aspects, the ratio of the perfume ingredients provides a synergistic antimicrobial effect and is capable of imparting a desirable, balanced, and/or appealing hedonic performance. In some aspects, the ratio of the heliopropanal, nerol, phenylhexanol, and tetralinol in the antimicrobial composition is 6:3:5:6. Alternatively, in some aspects, the ratio of the heliopropanal, nerol, phenylhexanol, and tetralinol in the antimicrobial composition is 1:12:5:2. Alternatively, in some aspects, the ratio of the heliopropanal, nerol, phenylhexanol, and tetralinol in the antimicrobial composition is 1:3:5:1. Alternatively, in some aspects, the ratio of the heliopropanal, nerol, phenylhexanol, and tetralinol in the antimicrobial composition is 6:1:1:2. Alternatively, in some aspects, the ratio of the heliopropanal, nerol, phenylhexanol, and tetralinol in the antimicrobial composition is 4:6:7:3.

In some aspects, the effective amount of the antimicrobial composition to provide an antimicrobial effect is 0.05 to 0.5% w/v. Alternatively, in some aspects, the effective amount of the antimicrobial composition to provide an antimicrobial effect is 0.05 to 0.49% w/v. Alternatively, in some aspects, the effective amount of the antimicrobial composition to provide an antimicrobial effect is 0.05 to 0.48% w/v. Alternatively, in some aspects, the effective amount of the antimicrobial composition to provide an antimicrobial effect is 0.05 to 0.47% w/v. Alternatively, in some aspects, the effective amount of the antimicrobial composition to provide an antimicrobial effect is 0.05 to 0.46% w/v. Alternatively, in some aspects, the effective amount of the antimicrobial composition to provide an antimicrobial effect is 0.05 to 0.45% w/v. Alternatively, in some aspects, the effective amount of the antimicrobial composition to provide an antimicrobial effect is 0.05 to 0.44% w/v. Alternatively, in some aspects, the effective amount of the antimicrobial composition to provide an antimicrobial effect is 0.05 to 0.43% w/v. Alternatively, in some aspects, the effective amount of the antimicrobial composition to provide an antimicrobial effect is 0.05 to 0.42% w/v. Alternatively, in some aspects, the effective amount of the antimicrobial composition to provide an antimicrobial effect is 0.05 to 0.41% w/v. Alternatively, in some aspects, the effective amount of the antimicrobial composition to provide an antimicrobial effect is 0.05 to 0.4% w/v. Alternatively, in some aspects, the effective amount of the antimicrobial composition to provide an antimicrobial effect is 0.05 to 0.39% w/v. Alternatively, in some aspects, the effective amount of the antimicrobial composition to provide an antimicrobial effect is 0.05 to 0.38% w/v. Alternatively, in some aspects, the effective amount of the antimicrobial composition to provide an antimicrobial effect is 0.05 to 0.37% w/v. Alternatively, in some aspects, the effective amount of the antimicrobial composition to provide an antimicrobial effect is 0.05 to 0.36% w/v. Alternatively, in some aspects, the effective amount of the antimicrobial composition to provide an antimicrobial effect is 0.05 to 0.35% w/v. Alternatively, in some aspects, the effective amount of the antimicrobial composition to provide an antimicrobial effect is 0.05 to 0.34% w/v. Alternatively, in some aspects, the effective amount of the antimicrobial composition to provide an antimicrobial effect is 0.05 to 0.33% w/v. Alternatively, in some aspects, the effective amount of the antimicrobial composition to provide an antimicrobial effect is 0.05 to 0.32% w/v. Alternatively, in some aspects, the effective amount of the antimicrobial composition to provide an antimicrobial effect is 0.05 to 0.31% w/v. Alternatively, in some aspects, the effective amount of the antimicrobial composition to provide an antimicrobial effect is 0.05 to 0.3% w/v. Alternatively, in some aspects, the effective amount of the antimicrobial composition to provide an antimicrobial effect is 0.05 to 0.29% w/v. Alternatively, in some aspects, the effective amount of the antimicrobial composition to provide an antimicrobial effect is 0.05 to 0.28% w/v. Alternatively, in some aspects, the effective amount of the antimicrobial composition to provide an antimicrobial effect is 0.05 to 0.27% w/v. Alternatively, in some aspects, the effective amount of the antimicrobial composition to provide an antimicrobial effect is 0.05 to 0.26% w/v. Alternatively, in some aspects, the effective amount of the antimicrobial composition to provide an antimicrobial effect is 0.05 to 0.25% w/v. Alternatively, in some aspects, the effective amount of the antimicrobial composition to provide an antimicrobial effect is 0.05 to 0.24% w/v. Alternatively, in some aspects, the effective amount of the antimicrobial composition to provide an antimicrobial effect is 0.05 to 0.23% w/v. Alternatively, in some aspects, the effective amount of the antimicrobial composition to provide an antimicrobial effect is 0.05 to 0.22% w/v. Alternatively, in some aspects, the effective amount of the antimicrobial composition to provide an antimicrobial effect is 0.05 to 0.21% w/v. Alternatively, in some aspects, the effective amount of the antimicrobial composition to provide an antimicrobial effect is 0.05 to 0.2% w/v. Alternatively, in some aspects, the effective amount of the antimicrobial composition to provide an antimicrobial effect is 0.05 to 0.19% w/v. Alternatively, in some aspects, the effective amount of the antimicrobial composition to provide an antimicrobial effect is 0.05 to 0.18% w/v. Alternatively, in some aspects, the effective amount of the antimicrobial composition to provide an antimicrobial effect is 0.05 to 0.17% w/v. Alternatively, in some aspects, the effective amount of the antimicrobial composition to provide an antimicrobial effect is 0.05 to 0.16% w/v. Alternatively, in some aspects, the effective amount of the antimicrobial composition to provide an antimicrobial effect is 0.05 to 0.15% w/v. Alternatively, in some aspects, the effective amount of the antimicrobial composition to provide an antimicrobial effect is 0.05 to 0.14% w/v. Alternatively, in some aspects, the effective amount of the antimicrobial composition to provide an antimicrobial effect is 0.05 to 0.13% w/v. Alternatively, in some aspects, the effective amount of the antimicrobial composition to provide an antimicrobial effect is 0.05 to 0.12% w/v. Alternatively, in some aspects, the effective amount of the antimicrobial composition to provide an antimicrobial effect is 0.05 to 0.11% w/v. Alternatively, in some aspects, the effective amount of the antimicrobial composition to provide an antimicrobial effect is 0.05 to 0.1% w/v. Alternatively, in some aspects, the effective amount of the antimicrobial composition to provide an antimicrobial effect is 0.05 to 0.09% w/v. Alternatively, in some aspects, the effective amount of the antimicrobial composition to provide an antimicrobial effect is 0.05 to 0.08% w/v. Alternatively, in some aspects, the effective amount of the antimicrobial composition to provide an antimicrobial effect is 0.05 to 0.07% w/v. Alternatively, in some aspects, the effective amount of the antimicrobial composition to provide an antimicrobial effect is 0.05 to 0.06% w/v.

Alternatively, in some aspects, the effective amount of the antimicrobial composition to provide an antimicrobial effect is 0.06 to 0.5% w/v. Alternatively, in some aspects, the effective amount of the antimicrobial composition to provide an antimicrobial effect is 0.07 to 0.5% w/v. Alternatively, in some aspects, the effective amount of the antimicrobial composition to provide an antimicrobial effect is 0.08 to 0.5% w/v. Alternatively, in some aspects, the effective amount of the antimicrobial composition to provide an antimicrobial effect is 0.09 to 0.5% w/v. Alternatively, in some aspects, the effective amount of the antimicrobial composition to provide an antimicrobial effect is 0.1 to 0.5% w/v. Alternatively, in some aspects, the effective amount of the antimicrobial composition to provide an antimicrobial effect is 0.11 to 0.5% w/v. Alternatively, in some aspects, the effective amount of the antimicrobial composition to provide an antimicrobial effect is 0.12 to 0.5% w/v. Alternatively, in some aspects, the effective amount of the antimicrobial composition to provide an antimicrobial effect is 0.13 to 0.5% w/v. Alternatively, in some aspects, the effective amount of the antimicrobial composition to provide an antimicrobial effect is 0.14 to 0.5% w/v. Alternatively, in some aspects, the effective amount of the antimicrobial composition to provide an antimicrobial effect is 0.15 to 0.5% w/v. Alternatively, in some aspects, the effective amount of the antimicrobial composition to provide an antimicrobial effect is 0.16 to 0.5% w/v. Alternatively, in some aspects, the effective amount of the antimicrobial composition to provide an antimicrobial effect is 0.17 to 0.5% w/v. Alternatively, in some aspects, the effective amount of the antimicrobial composition to provide an antimicrobial effect is 0.18 to 0.5% w/v. Alternatively, in some aspects, the effective amount of the antimicrobial composition to provide an antimicrobial effect is 0.19 to 0.5% w/v. Alternatively, in some aspects, the effective amount of the antimicrobial composition to provide an antimicrobial effect is 0.19 to 0.5% w/v. Alternatively, in some aspects, the effective amount of the antimicrobial composition to provide an antimicrobial effect is 0.20 to 0.5% w/v. Alternatively, in some aspects, the effective amount of the antimicrobial composition to provide an antimicrobial effect is 0.21 to 0.5% w/v. Alternatively, in some aspects, the effective amount of the antimicrobial composition to provide an antimicrobial effect is 0.22 to 0.5% w/v. Alternatively, in some aspects, the effective amount of the antimicrobial composition to provide an antimicrobial effect is 0.23 to 0.5% w/v. Alternatively, in some aspects, the effective amount of the antimicrobial composition to provide an antimicrobial effect is 0.24 to 0.5% w/v. Alternatively, in some aspects, the effective amount of the antimicrobial composition to provide an antimicrobial effect is 0.25 to 0.5% w/v. Alternatively, in some aspects, the effective amount of the antimicrobial composition to provide an antimicrobial effect is 0.26 to 0.5% w/v. Alternatively, in some aspects, the effective amount of the antimicrobial composition to provide an antimicrobial effect is 0.27 to 0.5% w/v. Alternatively, in some aspects, the effective amount of the antimicrobial composition to provide an antimicrobial effect is 0.28 to 0.5% w/v. Alternatively, in some aspects, the effective amount of the antimicrobial composition to provide an antimicrobial effect is 0.29 to 0.5% w/v. Alternatively, in some aspects, the effective amount of the antimicrobial composition to provide an antimicrobial effect is 0.30 to 0.5% w/v. Alternatively, in some aspects, the effective amount of the antimicrobial composition to provide an antimicrobial effect is 0.31 to 0.5% w/v. Alternatively, in some aspects, the effective amount of the antimicrobial composition to provide an antimicrobial effect is 0.32 to 0.5% w/v. Alternatively, in some aspects, the effective amount of the antimicrobial composition to provide an antimicrobial effect is 0.33 to 0.5% w/v. Alternatively, in some aspects, the effective amount of the antimicrobial composition to provide an antimicrobial effect is 0.34 to 0.5% w/v. Alternatively, in some aspects, the effective amount of the antimicrobial composition to provide an antimicrobial effect is 0.35 to 0.5% w/v. Alternatively, in some aspects, the effective amount of the antimicrobial composition to provide an antimicrobial effect is 0.36 to 0.5% w/v. Alternatively, in some aspects, the effective amount of the antimicrobial composition to provide an antimicrobial effect is 0.37 to 0.5% w/v. Alternatively, in some aspects, the effective amount of the antimicrobial composition to provide an antimicrobial effect is 0.38 to 0.5% w/v. Alternatively, in some aspects, the effective amount of the antimicrobial composition to provide an antimicrobial effect is 0.39 to 0.5% w/v. Alternatively, in some aspects, the effective amount of the antimicrobial composition to provide an antimicrobial effect is 0.40 to 0.5% w/v. Alternatively, in some aspects, the effective amount of the antimicrobial composition to provide an antimicrobial effect is 0.41 to 0.5% w/v. Alternatively, in some aspects, the effective amount of the antimicrobial composition to provide an antimicrobial effect is 0.42 to 0.5% w/v. Alternatively, in some aspects, the effective amount of the antimicrobial composition to provide an antimicrobial effect is 0.43 to 0.5% w/v. Alternatively, in some aspects, the effective amount of the antimicrobial composition to provide an antimicrobial effect is 0.44 to 0.5% w/v. Alternatively, in some aspects, the effective amount of the antimicrobial composition to provide an antimicrobial effect is 0.45 to 0.5% w/v. Alternatively, in some aspects, the effective amount of the antimicrobial composition to provide an antimicrobial effect is 0.46 to 0.5% w/v. Alternatively, in some aspects, the effective amount of the antimicrobial composition to provide an antimicrobial effect is 0.47 to 0.5% w/v. Alternatively, in some aspects, the effective amount of the antimicrobial composition to provide an antimicrobial effect is 0.48 to 0.5% w/v. Alternatively, in some aspects, the effective amount of the antimicrobial composition to provide an antimicrobial effect is 0.49 to 0.5% w/v.

In some aspects, the effective amount of the antimicrobial composition to provide an antimicrobial effect is 0.05, or 0.06, or 0.07, or 0.08, or 0.08, or 0.1, or 0.11, or, 0.12, or, 0.13, or, 0.14, or, 0.15, or, 0.16, or, 0.17, or 0.18, or 0.19, or 0.2, or 0.21, or, 0.22, or, 0.23, or, 0.24, or, or, 0.26, or, 0.27, or 0.28, or 0.29, or 0.3, or 0.31, or, 0.32, or, 0.33, or, 0.34, or, 0.35, or, or, 0.37, or 0.38, or 0.39, or 0.4, or 0.41, or, 0.42, or, 0.43, or, 0.44, or, 0.45, or, 0.46, or, or 0.48, or 0.49, or 0.5% w/v.

In some aspects, the present disclosure provides an antimicrobial composition comprising anisic aldehyde, heliotropin, and terpineol.

Alternatively, in some aspects, the present disclosure provides the use of an antimicrobial composition comprising anisic aldehyde, heliotropin, and terpineol.

Alternatively, the present disclosure provides a non-therapeutic method of affecting microbial activity, the method comprising treating a substrate comprising microbes with a composition comprising anisic aldehyde, heliotropin, and terpineol, wherein the substrate is treated with the composition in an amount effective to provide an antimicrobial effect.

In some aspects, the present disclosure provides an antimicrobially active consumer product comprising anisic aldehyde, heliotropin, and terpineol.

Alternatively, in some aspects, the present disclosure provides the use, or a method of using an antimicrobial composition comprising anisic aldehyde, heliotropin, and terpineol for the preparation of an antimicrobially active consumer product.

In some aspects, the present disclosure provides a non-therapeutic method of affecting microbial activity, the method comprising treating a substrate comprising microbes with the antimicrobially active consumer product comprising anisic aldehyde, heliotropin, and terpineol, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the anisic aldehyde, heliotropin, and terpineol is 13:20:3. Alternatively, in some aspects, the ratio of the anisic aldehyde, heliotropin, and terpineol is 1:2:7. Alternatively, in some aspects, the ratio of the anisic aldehyde, heliotropin, and terpineol is 5:8:7. Alternatively, in some aspects, the ratio of the anisic aldehyde, heliotropin, and terpineol is 8:1:9. Alternatively, in some aspects, the ratio of the anisic aldehyde, heliotropin, and terpineol is 1:6:13.

In some aspects, the effective amount of the composition to provide an antimicrobial effect is 0.3 to 0.6% w/v. Alternatively, in some aspects, the effective amount of the composition to provide an antimicrobial effect is 0.4 to 0.6% w/v. Alternatively, in some aspects, the effective amount of the composition to provide an antimicrobial effect is 0.5 to 0.6% w/v.

Alternatively, in some aspects, the effective amount of the composition to provide an antimicrobial effect is 0.3 to 0.5% w/v. Alternatively, in some aspects, the effective amount of the composition to provide an antimicrobial effect is 0.3 to 0.4% w/v.

In some aspects, the effective amount of the antimicrobial composition to provide an antimicrobial effect is 0.3, or 0.4, or 0.5, or 0.6% w/v.

In some aspects, the present disclosure provides an antimicrobial composition comprising anisic aldehyde, heliotropin, terpineol, and heliopropanal.

Alternatively, in some aspects, the present disclosure provides the use of an antimicrobial composition comprising anisic aldehyde, heliotropin, terpineol, and heliopropanal.

Alternatively, the present disclosure provides a non-therapeutic method of affecting microbial activity, the method comprising treating a substrate comprising microbes with a composition comprising anisic aldehyde, heliotropin, terpineol, and heliopropanal, wherein the substrate is treated with the composition in an amount effective to provide an antimicrobial effect.

In some aspects, the present disclosure provides an antimicrobially active consumer product comprising anisic aldehyde, heliotropin, terpineol, and heliopropanal.

Alternatively, in some aspects, the present disclosure provides the use, or a method of using an antimicrobial composition comprising anisic aldehyde, heliotropin, terpineol, and heliopropanal for the preparation of an antimicrobially active consumer product.

In some aspects, the present disclosure provides a non-therapeutic method of affecting microbial activity, the method comprising treating a substrate comprising microbes with the antimicrobially active consumer product comprising anisic aldehyde, heliotropin, terpineol, and heliopropanal, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the anisic aldehyde, heliotropin, terpineol, and heliopropanal is 13:20:3:20. Alternatively, in some aspects, the ratio of the anisic aldehyde, heliotropin, terpineol, and heliopropanal is 3:1:3:3. Alternatively, in some aspects, the ratio of the anisic aldehyde, heliotropin, terpineol, and heliopropanal is 3:4:10:3. Alternatively, in some aspects, the ratio of the anisic aldehyde, heliotropin, terpineol, and heliopropanal is 8:4:5:3. Alternatively, in some aspects, the ratio of the anisic aldehyde, heliotropin, terpineol, and heliopropanal is 2:4:13:1.

In some aspects, the effective amount of the composition to provide an antimicrobial effect is 0.2 to 0.5% w/v. Alternatively, in some aspects, the effective amount of the composition to provide an antimicrobial effect is 0.2 to 0.4% w/v. Alternatively, in some aspects, the effective amount of the composition to provide an antimicrobial effect is 0.2 to 0.3% w/v.

In some aspects, the effective amount of the composition to provide an antimicrobial effect is 0.3 to 0.5% w/v. Alternatively, in some aspects, the effective amount of the composition to provide an antimicrobial effect is 0.3 to 0.4% w/v.

In some aspects, the effective amount of the antimicrobial composition to provide an antimicrobial effect is 0.2, or 0.3, or 0.4, or 0.5% w/v.

In some aspects, the present disclosure provides an antimicrobial composition comprising decal, isoeugenol, perycorolle, and tetralinol.

In some aspects, the present disclosure provides an antimicrobial composition comprising decal, isoeugenol, perycorolle, and tetralinol.

Alternatively, in some aspects, the present disclosure provides the use of an antimicrobial composition comprising decal, isoeugenol, perycorolle, and tetralinol.

Alternatively, the present disclosure provides a non-therapeutic method of affecting microbial activity, the method comprising treating a substrate comprising microbes with a composition comprising decal, isoeugenol, perycorolle, and tetralinol, wherein the substrate is treated with the composition in an amount effective to provide an antimicrobial effect.

In some aspects, the present disclosure provides an antimicrobially active consumer product comprising decal, isoeugenol, perycorolle, and tetralinol.

Alternatively, in some aspects, the present disclosure provides the use, or a method of using an antimicrobial composition comprising decal, isoeugenol, perycorolle, and tetralinol for the preparation of an antimicrobially active consumer product.

In some aspects, the present disclosure provides a non-therapeutic method of affecting microbial activity, the method comprising treating a substrate comprising microbes with the antimicrobially active consumer product comprising decal, isoeugenol, perycorolle, and tetralinol, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the decal, isoeugenol, perycorolle, and tetralinol is 2:1:5:2. Alternatively, in some aspects, the ratio of the decal, isoeugenol, perycorolle, and tetralinol is 2:2:1:5. Alternatively, in some aspects, the ratio of the decal, isoeugenol, perycorolle, and tetralinol is 4:2:2:2. Alternatively, in some aspects, the ratio of the decal, isoeugenol, perycorolle, and tetralinol is 1:7:4:8. Alternatively, in some aspects, the ratio of the decal, isoeugenol, perycorolle, and tetralinol is 1:3:3:3.

In some aspects, the effective amount of the composition to provide an antimicrobial effect is 0.05 to 0.5% w/v. Alternatively, in some aspects, the effective amount of the composition to provide an antimicrobial effect is 0.06 to 0.5% w/v. Alternatively, in some aspects, the effective amount of the composition to provide an antimicrobial effect is 0.07 to 0.5% w/v. Alternatively, in some aspects, the effective amount of the composition to provide an antimicrobial effect is 0.08 to 0.5% w/v. Alternatively, in some aspects, the effective amount of the composition to provide an antimicrobial effect is 0.09 to 0.5% w/v. Alternatively, in some aspects, the effective amount of the composition to provide an antimicrobial effect is 0.10 to 0.5% w/v. Alternatively, in some aspects, the effective amount of the composition to provide an antimicrobial effect is 0.11 to 0.5% w/v. Alternatively, in some aspects, the effective amount of the composition to provide an antimicrobial effect is 0.12 to 0.5% w/v. Alternatively, in some aspects, the effective amount of the composition to provide an antimicrobial effect is 0.13 to 0.5% w/v. Alternatively, in some aspects, the effective amount of the composition to provide an antimicrobial effect is 0.14 to 0.5% w/v. Alternatively, in some aspects, the effective amount of the composition to provide an antimicrobial effect is 0.15 to 0.5% w/v. Alternatively, in some aspects, the effective amount of the composition to provide an antimicrobial effect is 0.16 to 0.5% w/v. Alternatively, in some aspects, the effective amount of the composition to provide an antimicrobial effect is 0.17 to 0.5% w/v. Alternatively, in some aspects, the effective amount of the composition to provide an antimicrobial effect is 0.18 to 0.5% w/v. Alternatively, in some aspects, the effective amount of the composition to provide an antimicrobial effect is 0.19 to 0.5% w/v. Alternatively, in some aspects, the effective amount of the composition to provide an antimicrobial effect is 0.20 to 0.5% w/v. Alternatively, in some aspects, the effective amount of the composition to provide an antimicrobial effect is 0.21 to 0.5% w/v. Alternatively, in some aspects, the effective amount of the composition to provide an antimicrobial effect is 0.22 to 0.5% w/v. Alternatively, in some aspects, the effective amount of the composition to provide an antimicrobial effect is 0.23 to 0.5% w/v. Alternatively, in some aspects, the effective amount of the composition to provide an antimicrobial effect is 0.24 to 0.5% w/v. Alternatively, in some aspects, the effective amount of the composition to provide an antimicrobial effect is 0.25 to 0.5% w/v. Alternatively, in some aspects, the effective amount of the composition to provide an antimicrobial effect is 0.26 to 0.5% w/v. Alternatively, in some aspects, the effective amount of the composition to provide an antimicrobial effect is 0.27 to 0.5% w/v. Alternatively, in some aspects, the effective amount of the composition to provide an antimicrobial effect is 0.28 to 0.5% w/v. Alternatively, in some aspects, the effective amount of the composition to provide an antimicrobial effect is 0.29 to 0.5% w/v. Alternatively, in some aspects, the effective amount of the composition to provide an antimicrobial effect is 0.30 to 0.5% w/v. Alternatively, in some aspects, the effective amount of the composition to provide an antimicrobial effect is 0.31 to 0.5% w/v. Alternatively, in some aspects, the effective amount of the composition to provide an antimicrobial effect is 0.32 to 0.5% w/v. Alternatively, in some aspects, the effective amount of the composition to provide an antimicrobial effect is 0.33 to 0.5% w/v. Alternatively, in some aspects, the effective amount of the composition to provide an antimicrobial effect is 0.34 to 0.5% w/v. Alternatively, in some aspects, the effective amount of the composition to provide an antimicrobial effect is 0.35 to 0.5% w/v. Alternatively, in some aspects, the effective amount of the composition to provide an antimicrobial effect is 0.36 to 0.5% w/v. Alternatively, in some aspects, the effective amount of the composition to provide an antimicrobial effect is 0.37 to 0.5% w/v. Alternatively, in some aspects, the effective amount of the composition to provide an antimicrobial effect is 0.38 to 0.5% w/v. Alternatively, in some aspects, the effective amount of the composition to provide an antimicrobial effect is 0.39 to 0.5% w/v. Alternatively, in some aspects, the effective amount of the composition to provide an antimicrobial effect is 0.40 to 0.5% w/v. Alternatively, in some aspects, the effective amount of the composition to provide an antimicrobial effect is 0.41 to 0.5% w/v. Alternatively, in some aspects, the effective amount of the composition to provide an antimicrobial effect is 0.42 to 0.5% w/v. Alternatively, in some aspects, the effective amount of the composition to provide an antimicrobial effect is 0.43 to 0.5% w/v. Alternatively, in some aspects, the effective amount of the composition to provide an antimicrobial effect is 0.44 to 0.5% w/v. Alternatively, in some aspects, the effective amount of the composition to provide an antimicrobial effect is 0.45 to 0.5% w/v. Alternatively, in some aspects, the effective amount of the composition to provide an antimicrobial effect is 0.46 to 0.5% w/v. Alternatively, in some aspects, the effective amount of the composition to provide an antimicrobial effect is 0.47 to 0.5% w/v. Alternatively, in some aspects, the effective amount of the composition to provide an antimicrobial effect is 0.48 to 0.5% w/v. Alternatively, in some aspects, the effective amount of the composition to provide an antimicrobial effect is 0.49 to 0.5% w/v.

Alternatively, in some aspects, the effective amount of the composition to provide an antimicrobial effect is 0.05 to 0.49% w/v. Alternatively, in some aspects, the effective amount of the composition to provide an antimicrobial effect is 0.05 to 0.48% w/v. Alternatively, in some aspects, the effective amount of the composition to provide an antimicrobial effect is 0.05 to 0.47% w/v. Alternatively, in some aspects, the effective amount of the composition to provide an antimicrobial effect is 0.05 to 0.46% w/v. Alternatively, in some aspects, the effective amount of the composition to provide an antimicrobial effect is 0.05 to 0.45% w/v. Alternatively, in some aspects, the effective amount of the composition to provide an antimicrobial effect is 0.02 to 0.44% w/v. Alternatively, in some aspects, the effective amount of the composition to provide an antimicrobial effect is 0.05 to 0.43% w/v. Alternatively, in some aspects, the effective amount of the composition to provide an antimicrobial effect is 0.05 to 0.42% w/v. Alternatively, in some aspects, the effective amount of the composition to provide an antimicrobial effect is 0.05 to 0.41% w/v. Alternatively, in some aspects, the effective amount of the composition to provide an antimicrobial effect is 0.05 to 0.40% w/v. Alternatively, in some aspects, the effective amount of the composition to provide an antimicrobial effect is 0.05 to 0.39% w/v. Alternatively, in some aspects, the effective amount of the composition to provide an antimicrobial effect is 0.05 to 0.38% w/v. Alternatively, in some aspects, the effective amount of the composition to provide an antimicrobial effect is 0.05 to 0.37% w/v. Alternatively, in some aspects, the effective amount of the composition to provide an antimicrobial effect is 0.05 to 0.36% w/v. Alternatively, in some aspects, the effective amount of the composition to provide an antimicrobial effect is 0.05 to 0.35% w/v. Alternatively, in some aspects, the effective amount of the composition to provide an antimicrobial effect is 0.02 to 0.34% w/v. Alternatively, in some aspects, the effective amount of the composition to provide an antimicrobial effect is 0.05 to 0.33% w/v. Alternatively, in some aspects, the effective amount of the composition to provide an antimicrobial effect is 0.05 to 0.32% w/v. Alternatively, in some aspects, the effective amount of the composition to provide an antimicrobial effect is 0.05 to 0.31% w/v. Alternatively, in some aspects, the effective amount of the composition to provide an antimicrobial effect is 0.05 to 0.30% w/v. Alternatively, in some aspects, the effective amount of the composition to provide an antimicrobial effect is 0.05 to 0.29% w/v. Alternatively, in some aspects, the effective amount of the composition to provide an antimicrobial effect is 0.05 to 0.28% w/v. Alternatively, in some aspects, the effective amount of the composition to provide an antimicrobial effect is 0.05 to 0.27% w/v. Alternatively, in some aspects, the effective amount of the composition to provide an antimicrobial effect is 0.05 to 0.26% w/v. Alternatively, in some aspects, the effective amount of the composition to provide an antimicrobial effect is 0.05 to 0.25% w/v. Alternatively, in some aspects, the effective amount of the composition to provide an antimicrobial effect is 0.05 to 0.24% w/v. Alternatively, in some aspects, the effective amount of the composition to provide an antimicrobial effect is 0.05 to 0.23% w/v. Alternatively, in some aspects, the effective amount of the composition to provide an antimicrobial effect is 0.05 to 0.22% w/v. Alternatively, in some aspects, the effective amount of the composition to provide an antimicrobial effect is 0.05 to 0.21% w/v. Alternatively, in some aspects, the effective amount of the composition to provide an antimicrobial effect is 0.05 to 0.20% w/v. Alternatively, in some aspects, the effective amount of the composition to provide an antimicrobial effect is 0.05 to 0.19% w/v. Alternatively, in some aspects, the effective amount of the composition to provide an antimicrobial effect is 0.05 to 0.18% w/v. Alternatively, in some aspects, the effective amount of the composition to provide an antimicrobial effect is 0.05 to 0.17% w/v. Alternatively, in some aspects, the effective amount of the composition to provide an antimicrobial effect is 0.05 to 0.16% w/v. Alternatively, in some aspects, the effective amount of the composition to provide an antimicrobial effect is 0.05 to 0.15% w/v. Alternatively, in some aspects, the effective amount of the composition to provide an antimicrobial effect is 0.02 to 0.14% w/v. Alternatively, in some aspects, the effective amount of the composition to provide an antimicrobial effect is 0.05 to 0.13% w/v. Alternatively, in some aspects, the effective amount of the composition to provide an antimicrobial effect is 0.05 to 0.12% w/v. Alternatively, in some aspects, the effective amount of the composition to provide an antimicrobial effect is 0.05 to 0.11% w/v. Alternatively, in some aspects, the effective amount of the composition to provide an antimicrobial effect is 0.05 to 0.10% w/v. Alternatively, in some aspects, the effective amount of the composition to provide an antimicrobial effect is 0.05 to 0.09% w/v. Alternatively, in some aspects, the effective amount of the composition to provide an antimicrobial effect is 0.05 to 0.08% w/v. Alternatively, in some aspects, the effective amount of the composition to provide an antimicrobial effect is 0.05 to 0.07% w/v. Alternatively, in some aspects, the effective amount of the composition to provide an antimicrobial effect is 0.05 to 0.06% w/v.

In some aspects, the effective amount of the antimicrobial composition to provide an antimicrobial effect is 0.05, or 0.06, or 0.07, or 0.08, or 0.08, or 0.1, or 0.11, or, 0.12, or, 0.13, or, 0.14, or, 0.15, or, 0.16, or, 0.17, or 0.18, or 0.09, or 0.2, or 0.21, or, 0.22, or, 0.23, or, 0.24, or, or, 0.26, or, 0.27, or 0.28, or 0.29, or 0.3, or 0.31, or, 0.32, or, 0.33, or, 0.34, or, 0.35, or, or, 0.37, or 0.38, or 0.39, or 0.4, or 0.41, or, 0.42, or, 0.43, or, 0.44, or, 0.45, or, 0.46, or, or 0.48, or 0.49, or 0.5% w/v.

In some aspects, the present disclosure provides an antimicrobial composition comprising phenylhexanol, terpineol, and isoeugeneol.

Alternatively, in some aspects, the present disclosure provides the use of an antimicrobial composition comprising phenylhexanol, terpineol, and isoeugenol.

Alternatively, the present disclosure provides a non-therapeutic method of affecting microbial activity, the method comprising treating a substrate comprising microbes with a composition comprising phenylhexanol, terpineol, and isoeugenol, wherein the substrate is treated with the composition in an amount effective to provide an antimicrobial effect.

In some aspects, the present disclosure provides an antimicrobially active consumer product comprising phenylhexanol, terpineol, and isoeugenol.

Alternatively, in some aspects, the present disclosure provides the use, or a method of using an antimicrobial composition comprising phenylhexanol, terpineol, and isoeugenol for the preparation of an antimicrobially active consumer product.

In some aspects, the present disclosure provides a non-therapeutic method of affecting microbial activity, the method comprising treating a substrate comprising microbes with the antimicrobially active consumer product comprising phenylhexanol, terpineol, and isoeugenol, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the phenylhexanol, terpineol, and isoeugenol is 2:5:5. Alternatively, in some aspects, the ratio of the phenylhexanol, terpineol, and isoeugenol is 1:14:5. Alternatively, in some aspects, the ratio of the phenylhexanol, terpineol, and isoeugenol is 2:1:7. Alternatively, in some aspects, the ratio of the phenylhexanol, terpineol, and isoeugenol is 8:9:3. Alternatively, in some aspects, the ratio of the phenylhexanol, terpineol, and isoeugenol is 12:7:1.

In some aspects, the effective amount of the composition to provide an antimicrobial effect is 0.06 to 0.5% w/v. Alternatively, in some aspects, the effective amount of the composition to provide an antimicrobial effect is 0.07 to 0.5% w/v. Alternatively, in some aspects, the effective amount of the composition to provide an antimicrobial effect is 0.08 to 0.5% w/v. Alternatively, in some aspects, the effective amount of the composition to provide an antimicrobial effect is 0.09 to 0.5% w/v. Alternatively, in some aspects, the effective amount of the composition to provide an antimicrobial effect is 0.10 to 0.5% w/v. Alternatively, in some aspects, the effective amount of the composition to provide an antimicrobial effect is 0.11 to 0.5% w/v. Alternatively, in some aspects, the effective amount of the composition to provide an antimicrobial effect is 0.12 to 0.5% w/v. Alternatively, in some aspects, the effective amount of the composition to provide an antimicrobial effect is 0.13 to 0.5% w/v. Alternatively, in some aspects, the effective amount of the composition to provide an antimicrobial effect is 0.14 to 0.5% w/v. Alternatively, in some aspects, the effective amount of the composition to provide an antimicrobial effect is 0.15 to 0.5% w/v. Alternatively, in some aspects, the effective amount of the composition to provide an antimicrobial effect is 0.16 to 0.5% w/v. Alternatively, in some aspects, the effective amount of the composition to provide an antimicrobial effect is 0.17 to 0.5% w/v. Alternatively, in some aspects, the effective amount of the composition to provide an antimicrobial effect is 0.18 to 0.5% w/v. Alternatively, in some aspects, the effective amount of the composition to provide an antimicrobial effect is 0.19 to 0.5% w/v. Alternatively, in some aspects, the effective amount of the composition to provide an antimicrobial effect is 0.20 to 0.5% w/v. Alternatively, in some aspects, the effective amount of the composition to provide an antimicrobial effect is 0.21 to 0.5% w/v. Alternatively, in some aspects, the effective amount of the composition to provide an antimicrobial effect is 0.22 to 0.5% w/v. Alternatively, in some aspects, the effective amount of the composition to provide an antimicrobial effect is 0.23 to 0.5% w/v. Alternatively, in some aspects, the effective amount of the composition to provide an antimicrobial effect is 0.24 to 0.5% w/v. Alternatively, in some aspects, the effective amount of the composition to provide an antimicrobial effect is 0.25 to 0.5% w/v. Alternatively, in some aspects, the effective amount of the composition to provide an antimicrobial effect is 0.26 to 0.5% w/v. Alternatively, in some aspects, the effective amount of the composition to provide an antimicrobial effect is 0.27 to 0.5% w/v. Alternatively, in some aspects, the effective amount of the composition to provide an antimicrobial effect is 0.28 to 0.5% w/v. Alternatively, in some aspects, the effective amount of the composition to provide an antimicrobial effect is 0.29 to 0.5% w/v. Alternatively, in some aspects, the effective amount of the composition to provide an antimicrobial effect is 0.30 to 0.5% w/v. Alternatively, in some aspects, the effective amount of the composition to provide an antimicrobial effect is 0.31 to 0.5% w/v. Alternatively, in some aspects, the effective amount of the composition to provide an antimicrobial effect is 0.32 to 0.5% w/v. Alternatively, in some aspects, the effective amount of the composition to provide an antimicrobial effect is 0.33 to 0.5% w/v. Alternatively, in some aspects, the effective amount of the composition to provide an antimicrobial effect is 0.34 to 0.5% w/v. Alternatively, in some aspects, the effective amount of the composition to provide an antimicrobial effect is 0.35 to 0.5% w/v. Alternatively, in some aspects, the effective amount of the composition to provide an antimicrobial effect is 0.36 to 0.5% w/v. Alternatively, in some aspects, the effective amount of the composition to provide an antimicrobial effect is 0.37 to 0.5% w/v. Alternatively, in some aspects, the effective amount of the composition to provide an antimicrobial effect is 0.38 to 0.5% w/v. Alternatively, in some aspects, the effective amount of the composition to provide an antimicrobial effect is 0.39 to 0.5% w/v. Alternatively, in some aspects, the effective amount of the composition to provide an antimicrobial effect is 0.40 to 0.5% w/v. Alternatively, in some aspects, the effective amount of the composition to provide an antimicrobial effect is 0.41 to 0.5% w/v. Alternatively, in some aspects, the effective amount of the composition to provide an antimicrobial effect is 0.42 to 0.5% w/v. Alternatively, in some aspects, the effective amount of the composition to provide an antimicrobial effect is 0.43 to 0.5% w/v. Alternatively, in some aspects, the effective amount of the composition to provide an antimicrobial effect is 0.44 to 0.5% w/v. Alternatively, in some aspects, the effective amount of the composition to provide an antimicrobial effect is 0.45 to 0.5% w/v. Alternatively, in some aspects, the effective amount of the composition to provide an antimicrobial effect is 0.46 to 0.5% w/v. Alternatively, in some aspects, the effective amount of the composition to provide an antimicrobial effect is 0.47 to 0.5% w/v. Alternatively, in some aspects, the effective amount of the composition to provide an antimicrobial effect is 0.48 to 0.5% w/v. Alternatively, in some aspects, the effective amount of the composition to provide an antimicrobial effect is 0.49 to 0.5% w/v.

Alternatively, in some aspects, the effective amount of the composition to provide an antimicrobial effect is 0.06 to 0.49% w/v. Alternatively, in some aspects, the effective amount of the composition to provide an antimicrobial effect is 0.06 to 0.48% w/v. Alternatively, in some aspects, the effective amount of the composition to provide an antimicrobial effect is 0.06 to 0.47% w/v. Alternatively, in some aspects, the effective amount of the composition to provide an antimicrobial effect is 0.06 to 0.46% w/v. Alternatively, in some aspects, the effective amount of the composition to provide an antimicrobial effect is 0.06 to 0.45% w/v. Alternatively, in some aspects, the effective amount of the composition to provide an antimicrobial effect is 0.06 to 0.44% w/v. Alternatively, in some aspects, the effective amount of the composition to provide an antimicrobial effect is 0.06 to 0.43% w/v. Alternatively, in some aspects, the effective amount of the composition to provide an antimicrobial effect is 0.06 to 0.42% w/v. Alternatively, in some aspects, the effective amount of the composition to provide an antimicrobial effect is 0.06 to 0.41% w/v. Alternatively, in some aspects, the effective amount of the composition to provide an antimicrobial effect is 0.06 to 0.40% w/v. Alternatively, in some aspects, the effective amount of the composition to provide an antimicrobial effect is 0.06 to 0.39% w/v. Alternatively, in some aspects, the effective amount of the composition to provide an antimicrobial effect is 0.06 to 0.38% w/v. Alternatively, in some aspects, the effective amount of the composition to provide an antimicrobial effect is 0.06 to 0.37% w/v. Alternatively, in some aspects, the effective amount of the composition to provide an antimicrobial effect is 0.06 to 0.36% w/v. Alternatively, in some aspects, the effective amount of the composition to provide an antimicrobial effect is 0.06 to 0.35% w/v. Alternatively, in some aspects, the effective amount of the composition to provide an antimicrobial effect is 0.06 to 0.34% w/v. Alternatively, in some aspects, the effective amount of the composition to provide an antimicrobial effect is 0.06 to 0.33% w/v. Alternatively, in some aspects, the effective amount of the composition to provide an antimicrobial effect is 0.06 to 0.32% w/v. Alternatively, in some aspects, the effective amount of the composition to provide an antimicrobial effect is 0.06 to 0.31% w/v. Alternatively, in some aspects, the effective amount of the composition to provide an antimicrobial effect is 0.06 to 0.30% w/v. Alternatively, in some aspects, the effective amount of the composition to provide an antimicrobial effect is 0.06 to 0.29% w/v. Alternatively, in some aspects, the effective amount of the composition to provide an antimicrobial effect is 0.06 to 0.28% w/v. Alternatively, in some aspects, the effective amount of the composition to provide an antimicrobial effect is 0.06 to 0.27% w/v. Alternatively, in some aspects, the effective amount of the composition to provide an antimicrobial effect is 0.06 to 0.26% w/v. Alternatively, in some aspects, the effective amount of the composition to provide an antimicrobial effect is 0.06 to 0.25% w/v. Alternatively, in some aspects, the effective amount of the composition to provide an antimicrobial effect is 0.06 to 0.24% w/v. Alternatively, in some aspects, the effective amount of the composition to provide an antimicrobial effect is 0.06 to 0.23% w/v. Alternatively, in some aspects, the effective amount of the composition to provide an antimicrobial effect is 0.06 to 0.22% w/v. Alternatively, in some aspects, the effective amount of the composition to provide an antimicrobial effect is 0.06 to 0.21% w/v. Alternatively, in some aspects, the effective amount of the composition to provide an antimicrobial effect is 0.06 to 0.20% w/v. Alternatively, in some aspects, the effective amount of the composition to provide an antimicrobial effect is 0.06 to 0.19% w/v. Alternatively, in some aspects, the effective amount of the composition to provide an antimicrobial effect is 0.06 to 0.18% w/v. Alternatively, in some aspects, the effective amount of the composition to provide an antimicrobial effect is 0.06 to 0.17% w/v. Alternatively, in some aspects, the effective amount of the composition to provide an antimicrobial effect is 0.06 to 0.16% w/v. Alternatively, in some aspects, the effective amount of the composition to provide an antimicrobial effect is 0.06 to 0.15% w/v. Alternatively, in some aspects, the effective amount of the composition to provide an antimicrobial effect is 0.06 to 0.14% w/v. Alternatively, in some aspects, the effective amount of the composition to provide an antimicrobial effect is 0.06 to 0.13% w/v. Alternatively, in some aspects, the effective amount of the composition to provide an antimicrobial effect is 0.06 to 0.12% w/v. Alternatively, in some aspects, the effective amount of the composition to provide an antimicrobial effect is 0.06 to 0.11% w/v. Alternatively, in some aspects, the effective amount of the composition to provide an antimicrobial effect is 0.06 to 0.10% w/v. Alternatively, in some aspects, the effective amount of the composition to provide an antimicrobial effect is 0.06 to 0.09% w/v. Alternatively, in some aspects, the effective amount of the composition to provide an antimicrobial effect is 0.06 to 0.08% w/v. Alternatively, in some aspects, the effective amount of the composition to provide an antimicrobial effect is 0.06 to 0.07% w/v.

In some aspects, the effective amount of the antimicrobial composition to provide an antimicrobial effect is 0.06, or 0.07, or 0.08, or 0.08, or 0.1, or 0.11, or, 0.12, or, 0.13, or, 0.14, or, 0.14, or, 0.16, or, 0.17, or 0.18, or 0.09, or 0.2, or 0.21, or, 0.22, or, 0.23, or, 0.24, or, 0.25, or, or, 0.27, or 0.28, or 0.29, or 0.3 or 0.31, or, 0.32, or, 0.33, or, 0.34, or, 0.35, or, 0.36, or, or 0.38, or 0.39, or 0.4 or 0.41, or, 0.42, or, 0.43, or, 0.44, or, 0.45, or, 0.46, or, 0.47, or or 0.49, or 0.5% w/v.

In some aspects, the present disclosure provides an antimicrobial composition comprising phenylhexanol, terpineol, isoeugenol, and coumarine.

Alternatively, in some aspects, the present disclosure provides the use of an antimicrobial composition comprising phenylhexanol, terpineol, isoeugenol, and coumarine.

Alternatively, the present disclosure provides a non-therapeutic method of affecting microbial activity, the method comprising treating a substrate comprising microbes with a composition comprising phenylhexanol, terpineol, isoeugenol, and coumarine, wherein the substrate is treated with the composition in an amount effective to provide an antimicrobial effect.

In some aspects, the present disclosure provides an antimicrobially active consumer product comprising phenylhexanol, terpineol, isoeugenol, and coumarine.

Alternatively, in some aspects, the present disclosure provides the use, or a method of using an antimicrobial composition comprising phenylhexanol, terpineol, isoeugenol, and coumarine for the preparation of an antimicrobially active consumer product.

In some aspects, the present disclosure provides a non-therapeutic method of affecting microbial activity, the method comprising treating a substrate comprising microbes with the antimicrobially active consumer product comprising phenylhexanol, terpineol, isoeugenol, and coumarine, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the phenylhexanol, terpineol, isoeugenol, and coumarine is 5:1:1:2. Alternatively, in some aspects, the ratio of the phenylhexanol, terpineol, isoeugenol, and coumarine is 2:2:2:4. Alternatively, in some aspects, the ratio of the phenylhexanol, terpineol, isoeugenol, and coumarine is 3.2:3.1:2.6:0.5. Alternatively, in some aspects, the ratio of the phenylhexanol, terpineol, isoeugenol, and coumarine is 1:5:3:1. Alternatively, in some aspects, the ratio of the phenylhexanol, terpineol, isoeugenol, and coumarine is 1:7:1:1.

In some aspects, the effective amount of the composition to provide an antimicrobial effect is 0.03 to 0.5% w/v. Alternatively, in some aspects, the effective amount of the composition to provide an antimicrobial effect is 0.04 to 0.5% w/v. Alternatively, in some aspects, the effective amount of the composition to provide an antimicrobial effect is 0.05 to 0.5% w/v. Alternatively, in some aspects, the effective amount of the composition to provide an antimicrobial effect is 0.06 to 0.5% w/v. Alternatively, in some aspects, the effective amount of the composition to provide an antimicrobial effect is 0.07 to 0.5% w/v. Alternatively, in some aspects, the effective amount of the composition to provide an antimicrobial effect is 0.08 to 0.5% w/v. Alternatively, in some aspects, the effective amount of the composition to provide an antimicrobial effect is 0.09 to 0.5% w/v. Alternatively, in some aspects, the effective amount of the composition to provide an antimicrobial effect is 0.10 to 0.5% w/v. Alternatively, in some aspects, the effective amount of the composition to provide an antimicrobial effect is 0.11 to 0.5% w/v. Alternatively, in some aspects, the effective amount of the composition to provide an antimicrobial effect is 0.12 to 0.5% w/v. Alternatively, in some aspects, the effective amount of the composition to provide an antimicrobial effect is 0.13 to 0.5% w/v. Alternatively, in some aspects, the effective amount of the composition to provide an antimicrobial effect is 0.14 to 0.5% w/v. Alternatively, in some aspects, the effective amount of the composition to provide an antimicrobial effect is 0.15 to 0.5% w/v. Alternatively, in some aspects, the effective amount of the composition to provide an antimicrobial effect is 0.16 to 0.5% w/v. Alternatively, in some aspects, the effective amount of the composition to provide an antimicrobial effect is 0.17 to 0.5% w/v. Alternatively, in some aspects, the effective amount of the composition to provide an antimicrobial effect is 0.18 to 0.5% w/v. Alternatively, in some aspects, the effective amount of the composition to provide an antimicrobial effect is 0.19 to 0.5% w/v. Alternatively, in some aspects, the effective amount of the composition to provide an antimicrobial effect is 0.20 to 0.5% w/v. Alternatively, in some aspects, the effective amount of the composition to provide an antimicrobial effect is 0.21 to 0.5% w/v. Alternatively, in some aspects, the effective amount of the composition to provide an antimicrobial effect is 0.22 to 0.5% w/v. Alternatively, in some aspects, the effective amount of the composition to provide an antimicrobial effect is 0.23 to 0.5% w/v. Alternatively, in some aspects, the effective amount of the composition to provide an antimicrobial effect is 0.24 to 0.5% w/v. Alternatively, in some aspects, the effective amount of the composition to provide an antimicrobial effect is 0.25 to 0.5% w/v. Alternatively, in some aspects, the effective amount of the composition to provide an antimicrobial effect is 0.26 to 0.5% w/v. Alternatively, in some aspects, the effective amount of the composition to provide an antimicrobial effect is 0.27 to 0.5% w/v. Alternatively, in some aspects, the effective amount of the composition to provide an antimicrobial effect is 0.28 to 0.5% w/v. Alternatively, in some aspects, the effective amount of the composition to provide an antimicrobial effect is 0.29 to 0.5% w/v. Alternatively, in some aspects, the effective amount of the composition to provide an antimicrobial effect is 0.30 to 0.5% w/v. Alternatively, in some aspects, the effective amount of the composition to provide an antimicrobial effect is 0.31 to 0.5% w/v. Alternatively, in some aspects, the effective amount of the composition to provide an antimicrobial effect is 0.32 to 0.5% w/v. Alternatively, in some aspects, the effective amount of the composition to provide an antimicrobial effect is 0.33 to 0.5% w/v. Alternatively, in some aspects, the effective amount of the composition to provide an antimicrobial effect is 0.34 to 0.5% w/v. Alternatively, in some aspects, the effective amount of the composition to provide an antimicrobial effect is 0.35 to 0.5% w/v. Alternatively, in some aspects, the effective amount of the composition to provide an antimicrobial effect is 0.36 to 0.5% w/v. Alternatively, in some aspects, the effective amount of the composition to provide an antimicrobial effect is 0.37 to 0.5% w/v. Alternatively, in some aspects, the effective amount of the composition to provide an antimicrobial effect is 0.38 to 0.5% w/v. Alternatively, in some aspects, the effective amount of the composition to provide an antimicrobial effect is 0.39 to 0.5% w/v. Alternatively, in some aspects, the effective amount of the composition to provide an antimicrobial effect is 0.40 to 0.5% w/v. Alternatively, in some aspects, the effective amount of the composition to provide an antimicrobial effect is 0.41 to 0.5% w/v. Alternatively, in some aspects, the effective amount of the composition to provide an antimicrobial effect is 0.42 to 0.5% w/v. Alternatively, in some aspects, the effective amount of the composition to provide an antimicrobial effect is 0.43 to 0.5% w/v. Alternatively, in some aspects, the effective amount of the composition to provide an antimicrobial effect is 0.44 to 0.5% w/v. Alternatively, in some aspects, the effective amount of the composition to provide an antimicrobial effect is 0.45 to 0.5% w/v. Alternatively, in some aspects, the effective amount of the composition to provide an antimicrobial effect is 0.46 to 0.5% w/v. Alternatively, in some aspects, the effective amount of the composition to provide an antimicrobial effect is 0.47 to 0.5% w/v. Alternatively, in some aspects, the effective amount of the composition to provide an antimicrobial effect is 0.48 to 0.5% w/v. Alternatively, in some aspects, the effective amount of the composition to provide an antimicrobial effect is 0.49 to 0.5% w/v.

Alternatively, in some aspects, the effective amount of the composition to provide an antimicrobial effect is 0.03 to 0.49% w/v. Alternatively, in some aspects, the effective amount of the composition to provide an antimicrobial effect is 0.03 to 0.48% w/v. Alternatively, in some aspects, the effective amount of the composition to provide an antimicrobial effect is 0.03 to 0.47% w/v. Alternatively, in some aspects, the effective amount of the composition to provide an antimicrobial effect is 0.03 to 0.46% w/v. Alternatively, in some aspects, the effective amount of the composition to provide an antimicrobial effect is 0.03 to 0.45% w/v. Alternatively, in some aspects, the effective amount of the composition to provide an antimicrobial effect is 0.03 to 0.44% w/v. Alternatively, in some aspects, the effective amount of the composition to provide an antimicrobial effect is 0.03 to 0.43% w/v. Alternatively, in some aspects, the effective amount of the composition to provide an antimicrobial effect is 0.03 to 0.42% w/v. Alternatively, in some aspects, the effective amount of the composition to provide an antimicrobial effect is 0.03 to 0.41% w/v. Alternatively, in some aspects, the effective amount of the composition to provide an antimicrobial effect is 0.03 to 0.40% w/v. Alternatively, in some aspects, the effective amount of the composition to provide an antimicrobial effect is 0.03 to 0.39% w/v. Alternatively, in some aspects, the effective amount of the composition to provide an antimicrobial effect is 0.03 to 0.38% w/v. Alternatively, in some aspects, the effective amount of the composition to provide an antimicrobial effect is 0.03 to 0.37% w/v. Alternatively, in some aspects, the effective amount of the composition to provide an antimicrobial effect is 0.03 to 0.36% w/v. Alternatively, in some aspects, the effective amount of the composition to provide an antimicrobial effect is 0.03 to 0.35% w/v. Alternatively, in some aspects, the effective amount of the composition to provide an antimicrobial effect is 0.03 to 0.34% w/v. Alternatively, in some aspects, the effective amount of the composition to provide an antimicrobial effect is 0.03 to 0.33% w/v. Alternatively, in some aspects, the effective amount of the composition to provide an antimicrobial effect is 0.03 to 0.32% w/v. Alternatively, in some aspects, the effective amount of the composition to provide an antimicrobial effect is 0.03 to 0.31% w/v.

In some aspects, the effective amount of the antimicrobial composition to provide an antimicrobial effect is 0.03, or 0.04, or 0.05, or 0.06, or 0.07, or 0.08, or 0.08, or 0.1, or 0.11, or, or, 0.13, or, 0.14, or, 0.14, or, 0.16, or, 0.17, or 0.18, or 0.09, or 0.2, or 0.21, or, 0.22, or, or, 0.24, or, 0.25, or, 0.26, or, 0.27, or 0.28, or 0.29, or 0.3 or 0.31, or, 0.32, or, 0.33, or, or, 0.35, or, 0.36, or, 0.37, or 0.38, or 0.39, or 0.4, or 0.41, or, 0.42, or, 0.43, or, 0.44, or, or, 0.46, or, 0.47, or 0.48, or 0.49, or 0.5% w/v.

In some aspects, the present disclosure provides an antimicrobial composition comprising eugenol F, phenylhexanol, and carbinol muguet.

Alternatively, in some aspects, the present disclosure provides the use of an antimicrobial composition comprising eugenol F, phenylhexanol, and carbinol muguet.

Alternatively, the present disclosure provides a non-therapeutic method of affecting microbial activity, the method comprising treating a substrate comprising microbes with a composition comprising eugenol F, phenylhexanol, and carbinol muguet, wherein the substrate is treated with the composition in an amount effective to provide an antimicrobial effect.

In some aspects, the present disclosure provides an antimicrobially active consumer product comprising eugenol F, phenylhexanol, and carbinol muguet.

Alternatively, in some aspects, the present disclosure provides the use, or a method of using an antimicrobial composition comprising eugenol F, phenylhexanol, and carbinol muguet for the preparation of an antimicrobially active consumer product.

In some aspects, the present disclosure provides a non-therapeutic method of affecting microbial activity, the method comprising treating a substrate comprising microbes with the antimicrobially active consumer product comprising eugenol F, phenylhexanol, and carbinol muguet, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the eugenol F, phenylhexanol, and carbinol muguet is 1:5:10. Alternatively, in some aspects, the ratio of the eugenol F, phenylhexanol, and carbinol muguet is 1:10:9. Alternatively, in some aspects, the ratio of the eugenol F, phenylhexanol, and carbinol muguet is 2:5:3. Alternatively, in some aspects, the ratio of the eugenol F, phenylhexanol, and carbinol muguet is 5:3:2. Alternatively, in some aspects, the ratio of the eugenol F, phenylhexanol, and carbinol muguet is 3:3:4.

In some aspects, the effective amount of the composition to provide an antimicrobial effect is 0.06 to 0.5% w/v. Alternatively, in some aspects, the effective amount of the composition to provide an antimicrobial effect is 0.07 to 0.5% w/v. Alternatively, in some aspects, the effective amount of the composition to provide an antimicrobial effect is 0.08 to 0.5% w/v. Alternatively, in some aspects, the effective amount of the composition to provide an antimicrobial effect is 0.09 to 0.5% w/v. Alternatively, in some aspects, the effective amount of the composition to provide an antimicrobial effect is 0.10 to 0.5% w/v. Alternatively, in some aspects, the effective amount of the composition to provide an antimicrobial effect is 0.11 to 0.5% w/v. Alternatively, in some aspects, the effective amount of the composition to provide an antimicrobial effect is 0.12 to 0.5% w/v. Alternatively, in some aspects, the effective amount of the composition to provide an antimicrobial effect is 0.13 to 0.5% w/v. Alternatively, in some aspects, the effective amount of the composition to provide an antimicrobial effect is 0.14 to 0.5% w/v. Alternatively, in some aspects, the effective amount of the composition to provide an antimicrobial effect is 0.15 to 0.5% w/v. Alternatively, in some aspects, the effective amount of the composition to provide an antimicrobial effect is 0.16 to 0.5% w/v. Alternatively, in some aspects, the effective amount of the composition to provide an antimicrobial effect is 0.17 to 0.5% w/v. Alternatively, in some aspects, the effective amount of the composition to provide an antimicrobial effect is 0.18 to 0.5% w/v. Alternatively, in some aspects, the effective amount of the composition to provide an antimicrobial effect is 0.19 to 0.5% w/v. Alternatively, in some aspects, the effective amount of the composition to provide an antimicrobial effect is 0.20 to 0.5% w/v. Alternatively, in some aspects, the effective amount of the composition to provide an antimicrobial effect is 0.21 to 0.5% w/v. Alternatively, in some aspects, the effective amount of the composition to provide an antimicrobial effect is 0.22 to 0.5% w/v. Alternatively, in some aspects, the effective amount of the composition to provide an antimicrobial effect is 0.23 to 0.5% w/v. Alternatively, in some aspects, the effective amount of the composition to provide an antimicrobial effect is 0.24 to 0.5% w/v. Alternatively, in some aspects, the effective amount of the composition to provide an antimicrobial effect is 0.25 to 0.5% w/v. Alternatively, in some aspects, the effective amount of the composition to provide an antimicrobial effect is 0.26 to 0.5% w/v. Alternatively, in some aspects, the effective amount of the composition to provide an antimicrobial effect is 0.27 to 0.5% w/v. Alternatively, in some aspects, the effective amount of the composition to provide an antimicrobial effect is 0.28 to 0.5% w/v. Alternatively, in some aspects, the effective amount of the composition to provide an antimicrobial effect is 0.29 to 0.5% w/v. Alternatively, in some aspects, the effective amount of the composition to provide an antimicrobial effect is 0.30 to 0.5% w/v. Alternatively, in some aspects, the effective amount of the composition to provide an antimicrobial effect is 0.31 to 0.5% w/v. Alternatively, in some aspects, the effective amount of the composition to provide an antimicrobial effect is 0.32 to 0.5% w/v. Alternatively, in some aspects, the effective amount of the composition to provide an antimicrobial effect is 0.33 to 0.5% w/v. Alternatively, in some aspects, the effective amount of the composition to provide an antimicrobial effect is 0.34 to 0.5% w/v. Alternatively, in some aspects, the effective amount of the composition to provide an antimicrobial effect is 0.35 to 0.5% w/v. Alternatively, in some aspects, the effective amount of the composition to provide an antimicrobial effect is 0.36 to 0.5% w/v. Alternatively, in some aspects, the effective amount of the composition to provide an antimicrobial effect is 0.37 to 0.5% w/v. Alternatively, in some aspects, the effective amount of the composition to provide an antimicrobial effect is 0.38 to 0.5% w/v. Alternatively, in some aspects, the effective amount of the composition to provide an antimicrobial effect is 0.39 to 0.5% w/v. Alternatively, in some aspects, the effective amount of the composition to provide an antimicrobial effect is 0.40 to 0.5% w/v. Alternatively, in some aspects, the effective amount of the composition to provide an antimicrobial effect is 0.41 to 0.5% w/v. Alternatively, in some aspects, the effective amount of the composition to provide an antimicrobial effect is 0.42 to 0.5% w/v. Alternatively, in some aspects, the effective amount of the composition to provide an antimicrobial effect is 0.43 to 0.5% w/v. Alternatively, in some aspects, the effective amount of the composition to provide an antimicrobial effect is 0.44 to 0.5% w/v. Alternatively, in some aspects, the effective amount of the composition to provide an antimicrobial effect is 0.45 to 0.5% w/v. Alternatively, in some aspects, the effective amount of the composition to provide an antimicrobial effect is 0.46 to 0.5% w/v. Alternatively, in some aspects, the effective amount of the composition to provide an antimicrobial effect is 0.47 to 0.5% w/v. Alternatively, in some aspects, the effective amount of the composition to provide an antimicrobial effect is 0.48 to 0.5% w/v. Alternatively, in some aspects, the effective amount of the composition to provide an antimicrobial effect is 0.49 to 0.5% w/v.

Alternatively, in some aspects, the effective amount of the composition to provide an antimicrobial effect is 0.06 to 0.49% w/v. Alternatively, in some aspects, the effective amount of the composition to provide an antimicrobial effect is 0.06 to 0.48% w/v. Alternatively, in some aspects, the effective amount of the composition to provide an antimicrobial effect is 0.06 to 0.47% w/v. Alternatively, in some aspects, the effective amount of the composition to provide an antimicrobial effect is 0.06 to 0.46% w/v. Alternatively, in some aspects, the effective amount of the composition to provide an antimicrobial effect is 0.06 to 0.45% w/v. Alternatively, in some aspects, the effective amount of the composition to provide an antimicrobial effect is 0.06 to 0.44% w/v. Alternatively, in some aspects, the effective amount of the composition to provide an antimicrobial effect is 0.06 to 0.43% w/v. Alternatively, in some aspects, the effective amount of the composition to provide an antimicrobial effect is 0.06 to 0.42% w/v. Alternatively, in some aspects, the effective amount of the composition to provide an antimicrobial effect is 0.06 to 0.41% w/v. Alternatively, in some aspects, the effective amount of the composition to provide an antimicrobial effect is 0.06 to 0.40% w/v. Alternatively, in some aspects, the effective amount of the composition to provide an antimicrobial effect is 0.06 to 0.39% w/v. Alternatively, in some aspects, the effective amount of the composition to provide an antimicrobial effect is 0.06 to 0.38% w/v. Alternatively, in some aspects, the effective amount of the composition to provide an antimicrobial effect is 0.06 to 0.37% w/v. Alternatively, in some aspects, the effective amount of the composition to provide an antimicrobial effect is 0.06 to 0.36% w/v. Alternatively, in some aspects, the effective amount of the composition to provide an antimicrobial effect is 0.06 to 0.35% w/v. Alternatively, in some aspects, the effective amount of the composition to provide an antimicrobial effect is 0.06 to 0.34% w/v. Alternatively, in some aspects, the effective amount of the composition to provide an antimicrobial effect is 0.06 to 0.33% w/v. Alternatively, in some aspects, the effective amount of the composition to provide an antimicrobial effect is 0.06 to 0.32% w/v. Alternatively, in some aspects, the effective amount of the composition to provide an antimicrobial effect is 0.06 to 0.31% w/v. Alternatively, in some aspects, the effective amount of the composition to provide an antimicrobial effect is 0.06 to 0.30% w/v. Alternatively, in some aspects, the effective amount of the composition to provide an antimicrobial effect is 0.06 to 0.29% w/v. Alternatively, in some aspects, the effective amount of the composition to provide an antimicrobial effect is 0.06 to 0.28% w/v. Alternatively, in some aspects, the effective amount of the composition to provide an antimicrobial effect is 0.06 to 0.27% w/v. Alternatively, in some aspects, the effective amount of the composition to provide an antimicrobial effect is 0.06 to 0.26% w/v. Alternatively, in some aspects, the effective amount of the composition to provide an antimicrobial effect is 0.06 to 0.25% w/v. Alternatively, in some aspects, the effective amount of the composition to provide an antimicrobial effect is 0.06 to 0.24% w/v. Alternatively, in some aspects, the effective amount of the composition to provide an antimicrobial effect is 0.06 to 0.23% w/v. Alternatively, in some aspects, the effective amount of the composition to provide an antimicrobial effect is 0.06 to 0.22% w/v. Alternatively, in some aspects, the effective amount of the composition to provide an antimicrobial effect is 0.06 to 0.21% w/v. Alternatively, in some aspects, the effective amount of the composition to provide an antimicrobial effect is 0.06 to 0.20% w/v. Alternatively, in some aspects, the effective amount of the composition to provide an antimicrobial effect is 0.06 to 0.19% w/v. Alternatively, in some aspects, the effective amount of the composition to provide an antimicrobial effect is 0.06 to 0.18% w/v. Alternatively, in some aspects, the effective amount of the composition to provide an antimicrobial effect is 0.06 to 0.17% w/v. Alternatively, in some aspects, the effective amount of the composition to provide an antimicrobial effect is 0.06 to 0.16% w/v. Alternatively, in some aspects, the effective amount of the composition to provide an antimicrobial effect is 0.06 to 0.15% w/v. Alternatively, in some aspects, the effective amount of the composition to provide an antimicrobial effect is 0.06 to 0.14% w/v. Alternatively, in some aspects, the effective amount of the composition to provide an antimicrobial effect is 0.06 to 0.13% w/v. Alternatively, in some aspects, the effective amount of the composition to provide an antimicrobial effect is 0.06 to 0.12% w/v. Alternatively, in some aspects, the effective amount of the composition to provide an antimicrobial effect is 0.06 to 0.11% w/v. Alternatively, in some aspects, the effective amount of the composition to provide an antimicrobial effect is 0.06 to 0.10% w/v. Alternatively, in some aspects, the effective amount of the composition to provide an antimicrobial effect is 0.06 to 0.09% w/v. Alternatively, in some aspects, the effective amount of the composition to provide an antimicrobial effect is 0.06 to 0.08% w/v. Alternatively, in some aspects, the effective amount of the composition to provide an antimicrobial effect is 0.06 to 0.07% w/v.

In some aspects, the effective amount of the antimicrobial composition to provide an antimicrobial effect is 0.06, or 0.07, or 0.08, or 0.09, or 0.1, or 0.11, or, 0.12, or, 0.13, or, 0.14, or, 0.15, or, 0.16, or, 0.17, or 0.18, or 0.19, or 0.2, or 0.21, or, 0.22, or, 0.23, or, 0.24, or, 0.25, or, or, 0.27, or 0.28, or 0.29, or 0.3, or 0.31, or, 0.32, or, 0.33, or, 0.34, or, 0.35, or, 0.36, or, or 0.38, or 0.39, or 0.4, or 0.41, or, 0.42, or, 0.43, or, 0.44, or, 0.45, or, 0.46, or, 0.47, or or 0.49, or 0.5% w/v.

In some aspects, the present disclosure provides an antimicrobial composition comprising eugenol F, phenylhexanol, carbinol muguet, and benzyl acetate.

Alternatively, in some aspects, the present disclosure provides the use of an antimicrobial composition comprising eugenol F, phenylhexanol, carbinol muguet, and benzyl acetate.

Alternatively, the present disclosure provides a non-therapeutic method of affecting microbial activity, the method comprising treating a substrate comprising microbes with a composition comprising eugenol F, phenylhexanol, carbinol muguet, and benzyl acetate, wherein the substrate is treated with the composition in an amount effective to provide an antimicrobial effect.

In some aspects, the present disclosure provides an antimicrobially active consumer product comprising eugenol F, phenylhexanol, carbinol muguet, and benzyl acetate.

Alternatively, in some aspects, the present disclosure provides the use, or a method of using an antimicrobial composition comprising eugenol F, phenylhexanol, carbinol muguet, and benzyl acetate for the preparation of an antimicrobially active consumer product.

In some aspects, the present disclosure provides a non-therapeutic method of affecting microbial activity, the method comprising treating a substrate comprising microbes with the antimicrobially active consumer product comprising eugenol F, phenylhexanol, carbinol muguet, and benzyl acetate, wherein the substrate is treated with the composition in an amount effective to provide an antimicrobial effect.

In some aspects, the ratio of the perfume ingredients provides a synergistic antimicrobial effect and is capable of imparting a desirable, balanced, and/or appealing hedonic performance. In some aspects, the ratio of the eugenol F, phenylhexanol, carbinol muguet, and benzyl acetate is 1:5:10:10. Alternatively, in some aspects, the ratio of the eugenol F, phenylhexanol, carbinol muguet, and benzyl acetate is 1:8:8:3. Alternatively, in some aspects, the ratio of the eugenol F, phenylhexanol, carbinol muguet, and benzyl acetate is 3:1:2:4. Alternatively, in some aspects, the ratio of the eugenol F, phenylhexanol, carbinol muguet, and benzyl acetate is 2:6:1:1. Alternatively, in some aspects, the ratio of the eugenol F, phenylhexanol, carbinol muguet, and benzyl acetate is 1:2:6:1.

In some aspects, the effective amount of the composition to provide an antimicrobial effect is 0.10 to 0.6% w/v. Alternatively, in some aspects, the effective amount of the composition to provide an antimicrobial effect is 0.11 to 0.6% w/v. Alternatively, in some aspects, the effective amount of the composition to provide an antimicrobial effect is 0.12 to 0.6% w/v. Alternatively, in some aspects, the effective amount of the composition to provide an antimicrobial effect is 0.13 to 0.6% w/v. Alternatively, in some aspects, the effective amount of the composition to provide an antimicrobial effect is 0.14 to 0.6% w/v. Alternatively, in some aspects, the effective amount of the composition to provide an antimicrobial effect is 0.15 to 0.6% w/v. Alternatively, in some aspects, the effective amount of the composition to provide an antimicrobial effect is 0.16 to 0.6% w/v. Alternatively, in some aspects, the effective amount of the composition to provide an antimicrobial effect is 0.17 to 0.6% w/v. Alternatively, in some aspects, the effective amount of the composition to provide an antimicrobial effect is 0.18 to 0.6% w/v. Alternatively, in some aspects, the effective amount of the composition to provide an antimicrobial effect is 0.19 to 0.6% w/v. Alternatively, in some aspects, the effective amount of the composition to provide an antimicrobial effect is 0.20 to 0.6% w/v. Alternatively, in some aspects, the effective amount of the composition to provide an antimicrobial effect is 0.21 to 0.6% w/v. Alternatively, in some aspects, the effective amount of the composition to provide an antimicrobial effect is 0.22 to 0.6% w/v. Alternatively, in some aspects, the effective amount of the composition to provide an antimicrobial effect is 0.23 to 0.6% w/v. Alternatively, in some aspects, the effective amount of the composition to provide an antimicrobial effect is 0.24 to 0.6% w/v. Alternatively, in some aspects, the effective amount of the composition to provide an antimicrobial effect is 0.25 to 0.6% w/v. Alternatively, in some aspects, the effective amount of the composition to provide an antimicrobial effect is 0.26 to 0.6% w/v. Alternatively, in some aspects, the effective amount of the composition to provide an antimicrobial effect is 0.27 to 0.6% w/v. Alternatively, in some aspects, the effective amount of the composition to provide an antimicrobial effect is 0.28 to 0.6% w/v. Alternatively, in some aspects, the effective amount of the composition to provide an antimicrobial effect is 0.29 to 0.6% w/v. Alternatively, in some aspects, the effective amount of the composition to provide an antimicrobial effect is 0.30 to 0.6% w/v. Alternatively, in some aspects, the effective amount of the composition to provide an antimicrobial effect is 0.31 to 0.6% w/v. Alternatively, in some aspects, the effective amount of the composition to provide an antimicrobial effect is 0.32 to 0.6% w/v. Alternatively, in some aspects, the effective amount of the composition to provide an antimicrobial effect is 0.33 to 0.6% w/v. Alternatively, in some aspects, the effective amount of the composition to provide an antimicrobial effect is 0.34 to 0.6% w/v. Alternatively, in some aspects, the effective amount of the composition to provide an antimicrobial effect is 0.35 to 0.6% w/v. Alternatively, in some aspects, the effective amount of the composition to provide an antimicrobial effect is 0.36 to 0.6% w/v. Alternatively, in some aspects, the effective amount of the composition to provide an antimicrobial effect is 0.37 to 0.6% w/v. Alternatively, in some aspects, the effective amount of the composition to provide an antimicrobial effect is 0.38 to 0.6% w/v. Alternatively, in some aspects, the effective amount of the composition to provide an antimicrobial effect is 0.39 to 0.6% w/v. Alternatively, in some aspects, the effective amount of the composition to provide an antimicrobial effect is 0.40 to 0.6% w/v. Alternatively, in some aspects, the effective amount of the composition to provide an antimicrobial effect is 0.41 to 0.6% w/v. Alternatively, in some aspects, the effective amount of the composition to provide an antimicrobial effect is 0.42 to 0.6% w/v. Alternatively, in some aspects, the effective amount of the composition to provide an antimicrobial effect is 0.43 to 0.6% w/v. Alternatively, in some aspects, the effective amount of the composition to provide an antimicrobial effect is 0.44 to 0.6% w/v. Alternatively, in some aspects, the effective amount of the composition to provide an antimicrobial effect is 0.45 to 0.6% w/v. Alternatively, in some aspects, the effective amount of the composition to provide an antimicrobial effect is 0.46 to 0.6% w/v. Alternatively, in some aspects, the effective amount of the composition to provide an antimicrobial effect is 0.47 to 0.6% w/v. Alternatively, in some aspects, the effective amount of the composition to provide an antimicrobial effect is 0.48 to 0.6% w/v. Alternatively, in some aspects, the effective amount of the composition to provide an antimicrobial effect is 0.49 to 0.6% w/v. Alternatively, in some aspects, the effective amount of the composition to provide an antimicrobial effect is 0.50 to 0.6% w/v. Alternatively, in some aspects, the effective amount of the composition to provide an antimicrobial effect is 0.51 to 0.6% w/v. Alternatively, in some aspects, the effective amount of the composition to provide an antimicrobial effect is 0.52 to 0.6% w/v. Alternatively, in some aspects, the effective amount of the composition to provide an antimicrobial effect is 0.53 to 0.6% w/v. Alternatively, in some aspects, the effective amount of the composition to provide an antimicrobial effect is 0.54 to 0.6% w/v. Alternatively, in some aspects, the effective amount of the composition to provide an antimicrobial effect is 0.55 to 0.6% w/v. Alternatively, in some aspects, the effective amount of the composition to provide an antimicrobial effect is 0.56 to 0.6% w/v. Alternatively, in some aspects, the effective amount of the composition to provide an antimicrobial effect is 0.57 to 0.6% w/v. Alternatively, in some aspects, the effective amount of the composition to provide an antimicrobial effect is 0.58 to 0.6% w/v. Alternatively, in some aspects, the effective amount of the composition to provide an antimicrobial effect is 0.59 to 0.6% w/v.

Alternatively, in some aspects, the effective amount of the composition to provide an antimicrobial effect is 0.1 to 0.59% w/v. Alternatively, in some aspects, the effective amount of the composition to provide an antimicrobial effect is 0.1 to 0.58% w/v. Alternatively, in some aspects, the effective amount of the composition to provide an antimicrobial effect is 0.1 to 0.57% w/v. Alternatively, in some aspects, the effective amount of the composition to provide an antimicrobial effect is 0.1 to 0.56% w/v. Alternatively, in some aspects, the effective amount of the composition to provide an antimicrobial effect is 0.1 to 0.55% w/v. Alternatively, in some aspects, the effective amount of the composition to provide an antimicrobial effect is 0.1 to 0.54% w/v. Alternatively, in some aspects, the effective amount of the composition to provide an antimicrobial effect is 0.1 to 0.53% w/v. Alternatively, in some aspects, the effective amount of the composition to provide an antimicrobial effect is 0.1 to 0.52% w/v. Alternatively, in some aspects, the effective amount of the composition to provide an antimicrobial effect is 0.1 to 0.51% w/v. Alternatively, in some aspects, the effective amount of the composition to provide an antimicrobial effect is 0.1 to 0.50% w/v. Alternatively, in some aspects, the effective amount of the composition to provide an antimicrobial effect is 0.1 to 0.49% w/v. Alternatively, in some aspects, the effective amount of the composition to provide an antimicrobial effect is 0.1 to 0.48% w/v. Alternatively, in some aspects, the effective amount of the composition to provide an antimicrobial effect is 0.1 to 0.47% w/v. Alternatively, in some aspects, the effective amount of the composition to provide an antimicrobial effect is 0.1 to 0.46% w/v. Alternatively, in some aspects, the effective amount of the composition to provide an antimicrobial effect is 0.1 to 0.45% w/v. Alternatively, in some aspects, the effective amount of the composition to provide an antimicrobial effect is 0.1 to 0.44% w/v. Alternatively, in some aspects, the effective amount of the composition to provide an antimicrobial effect is 0.1 to 0.43% w/v. Alternatively, in some aspects, the effective amount of the composition to provide an antimicrobial effect is 0.1 to 0.42% w/v. Alternatively, in some aspects, the effective amount of the composition to provide an antimicrobial effect is 0.1 to 0.41% w/v. Alternatively, in some aspects, the effective amount of the composition to provide an antimicrobial effect is 0.1 to 0.40% w/v. Alternatively, in some aspects, the effective amount of the composition to provide an antimicrobial effect is 0.1 to 0.39% w/v. Alternatively, in some aspects, the effective amount of the composition to provide an antimicrobial effect is 0.1 to 0.38% w/v. Alternatively, in some aspects, the effective amount of the composition to provide an antimicrobial effect is 0.1 to 0.37% w/v. Alternatively, in some aspects, the effective amount of the composition to provide an antimicrobial effect is 0.1 to 0.36% w/v. Alternatively, in some aspects, the effective amount of the composition to provide an antimicrobial effect is 0.1 to 0.35% w/v. Alternatively, in some aspects, the effective amount of the composition to provide an antimicrobial effect is 0.1 to 0.34% w/v. Alternatively, in some aspects, the effective amount of the composition to provide an antimicrobial effect is 0.1 to 0.33% w/v. Alternatively, in some aspects, the effective amount of the composition to provide an antimicrobial effect is 0.1 to 0.32% w/v. Alternatively, in some aspects, the effective amount of the composition to provide an antimicrobial effect is 0.1 to 0.31% w/v. Alternatively, in some aspects, the effective amount of the composition to provide an antimicrobial effect is 0.1 to 0.30% w/v. Alternatively, in some aspects, the effective amount of the composition to provide an antimicrobial effect is 0.1 to 0.29% w/v. Alternatively, in some aspects, the effective amount of the composition to provide an antimicrobial effect is 0.1 to 0.28% w/v. Alternatively, in some aspects, the effective amount of the composition to provide an antimicrobial effect is 0.1 to 0.27% w/v. Alternatively, in some aspects, the effective amount of the composition to provide an antimicrobial effect is 0.1 to 0.26% w/v. Alternatively, in some aspects, the effective amount of the composition to provide an antimicrobial effect is 0.1 to 0.25% w/v. Alternatively, in some aspects, the effective amount of the composition to provide an antimicrobial effect is 0.1 to 0.24% w/v. Alternatively, in some aspects, the effective amount of the composition to provide an antimicrobial effect is 0.1 to 0.23% w/v. Alternatively, in some aspects, the effective amount of the composition to provide an antimicrobial effect is 0.1 to 0.22% w/v. Alternatively, in some aspects, the effective amount of the composition to provide an antimicrobial effect is 0.1 to 0.21% w/v. Alternatively, in some aspects, the effective amount of the composition to provide an antimicrobial effect is 0.1 to 0.20% w/v. Alternatively, in some aspects, the effective amount of the composition to provide an antimicrobial effect is 0.1 to 0.19% w/v. Alternatively, in some aspects, the effective amount of the composition to provide an antimicrobial effect is 0.1 to 0.18% w/v. Alternatively, in some aspects, the effective amount of the composition to provide an antimicrobial effect is 0.1 to 0.17% w/v. Alternatively, in some aspects, the effective amount of the composition to provide an antimicrobial effect is 0.1 to 0.16% w/v. Alternatively, in some aspects, the effective amount of the composition to provide an antimicrobial effect is 0.1 to 0.15% w/v. Alternatively, in some aspects, the effective amount of the composition to provide an antimicrobial effect is 0.1 to 0.14% w/v. Alternatively, in some aspects, the effective amount of the composition to provide an antimicrobial effect is 0.1 to 0.13% w/v. Alternatively, in some aspects, the effective amount of the composition to provide an antimicrobial effect is 0.1 to 0.12% w/v. Alternatively, in some aspects, the effective amount of the composition to provide an antimicrobial effect is 0.1 to 0.11% w/v.

In some aspects, the effective amount of the antimicrobial composition to provide an antimicrobial effect is 0.1, or 0.11, or, 0.12, or, 0.13, or, 0.14, or, 0.14, or, 0.16, or, 0.17, or 0.18, or 0.09, or 0.2, or 0.21, or, 0.22, or, 0.23, or, 0.24, or, 0.25, or, 0.26, or, 0.27, or 0.28, or 0.29, or or 0.31, or, 0.32, or, 0.33, or, 0.34, or, 0.35, or, 0.36, or, 0.37, or 0.38, or 0.39, or 0.4, or 0.41, or, 0.42, or, 0.43, or, 0.44, or, 0.45, or, 0.46, or, 0.47, or 0.48, or 0.49, or 0.5 or 0.51, or, 0.52, or, or, 0.54, or, 0.55, or, 0.56, or, 0.57, or 0.58, or 0.59, or 0.6% w/v.

In some aspects, the present disclosure provides an antimicrobial composition comprising phenylhexanol and at least one perfume ingredient selected from the group consisting of: heliopropanal, nerol, tetralinol, isoeugenol, terpineol, coumarine, eugenol F, carbinol muguet, and benzyl acetate.

Alternatively, in some aspects, the present disclosure provides the use of an antimicrobial composition comprising phenylhexanol and at least one perfume ingredient selected from the group consisting of: heliopropanal, nerol, tetralinol, isoeugenol, terpineol, coumarine, eugenol F, carbinol muguet, and benzyl acetate.

Alternatively, the present disclosure provides a non-therapeutic method of affecting microbial activity, the method comprising treating a substrate comprising microbes with a composition comprising phenylhexanol and at least one perfume ingredient selected from the group consisting of: heliopropanal, nerol, tetralinol, isoeugenol, terpineol, coumarine, eugenol F, carbinol muguet, and benzyl acetate, wherein the substrate is treated with the composition in an amount effective to provide an antimicrobial effect.

In some aspects, the present disclosure provides an antimicrobially active consumer product comprising phenylhexanol and at least one perfume ingredient selected from the group consisting of: heliopropanal, nerol, tetralinol, isoeugenol, terpineol, coumarine, eugenol F, carbinol muguet, and benzyl acetate.

Alternatively, in some aspects, the present disclosure provides the use, or a method of using an antimicrobial composition comprising phenylhexanol and at least one perfume ingredient selected from the group consisting of: heliopropanal, nerol, tetralinol, isoeugenol, terpineol, coumarine, eugenol F, carbinol muguet, and benzyl acetate for the preparation of an antimicrobially active consumer product.

In some aspects, the present disclosure provides a non-therapeutic method of affecting microbial activity, the method comprising treating a substrate comprising phenylhexanol and at least one perfume ingredient selected from the group consisting of: heliopropanal, nerol, tetralinol, isoeugenol, terpineol, coumarine, eugenol F, carbinol muguet, and benzyl acetate, wherein the substrate is treated with the composition in an amount effective to provide an antimicrobial effect.

In some aspects, the present disclosure provides an antimicrobial composition comprising anisic aldehyde and at least one perfume ingredient selected from the group consisting of: heliotropin, terpineol, and heliopropanal.

Alternatively, in some aspects, the present disclosure provides the use of an antimicrobial composition comprising anisic aldehyde and at least one perfume ingredient selected from the group consisting of: heliotropin, terpineol, and heliopropanal.

Alternatively, the present disclosure provides a non-therapeutic method of affecting microbial activity, the method comprising treating a substrate comprising microbes with a composition comprising anisic aldehyde and at least one perfume ingredient selected from the group consisting of: heliotropin, terpineol, and heliopropanal, wherein the substrate is treated with the composition in an amount effective to provide an antimicrobial effect.

In some aspects, the present disclosure provides an antimicrobially active consumer product comprising anisic aldehyde and at least one perfume ingredient selected from the group consisting of: heliotropin, terpineol, and heliopropanal.

Alternatively, in some aspects, the present disclosure provides the use, or a method of using an antimicrobial composition comprising anisic aldehyde and at least one perfume ingredient selected from the group consisting of: heliotropin, terpineol, and heliopropanal for the preparation of an antimicrobially active consumer product.

In some aspects, the present disclosure provides a non-therapeutic method of affecting microbial activity, the method comprising treating a substrate comprising anisic aldehyde and at least one perfume ingredient selected from the group consisting of: heliotropin, terpineol, and heliopropanal, wherein the substrate is treated with the composition in an amount effective to provide an antimicrobial effect.

In some aspects, the amount effective of the phenylhexanol in the antimicrobial composition is from 500 to 6000 ppm. Alternatively, in some aspects, the amount effective of the phenylhexanol in the antimicrobial composition is from 1000 to 6000 ppm. Alternatively, in some aspects, the amount effective of the phenylhexanol in the antimicrobial composition is from 1500 to 6000 ppm. Alternatively, in some aspects, the amount effective of the phenylhexanol in the antimicrobial composition is from 2000 to 6000 ppm. Alternatively, in some aspects, the amount effective of the phenylhexanol in the antimicrobial composition is from 2500 to 6000 ppm. Alternatively, in some aspects, the amount effective of the phenylhexanol in the antimicrobial composition is from 3000 to 6000 ppm. Alternatively, in some aspects, the amount effective of the phenylhexanol in the antimicrobial composition is from 3500 to 6000 ppm. Alternatively, in some aspects, the amount effective of the phenylhexanol in the antimicrobial composition is from 4000 to 6000 ppm. Alternatively, in some aspects, the amount effective of the phenylhexanol in the antimicrobial composition is from 4500 to 6000 ppm. Alternatively, in some aspects, the amount effective of the phenylhexanol in the antimicrobial composition is from 5000 to 6000 ppm. Alternatively, in some aspects, the amount effective of the phenylhexanol in the antimicrobial composition is from 5500 to 6000 ppm.

Alternatively, in some aspects, the amount effective of the phenylhexanol in the antimicrobial composition is from 500 to 5500 ppm. Alternatively, in some aspects, the amount effective of the phenylhexanol in the antimicrobial composition is from 500 to 5000 ppm. Alternatively, in some aspects, the amount effective of the phenylhexanol in the antimicrobial composition is from 500 to 4500 ppm. Alternatively, in some aspects, the amount effective of the phenylhexanol in the antimicrobial composition is from 500 to 4000 ppm. Alternatively, in some aspects, the amount effective of the phenylhexanol in the antimicrobial composition is from 500 to 3500 ppm. Alternatively, in some aspects, the amount effective of the phenylhexanol in the antimicrobial composition is from 500 to 3000 ppm. Alternatively, in some aspects, the amount effective of the phenylhexanol in the antimicrobial composition is from 500 to 2500 ppm. Alternatively, in some aspects, the amount effective of the phenylhexanol in the antimicrobial composition is from 500 to 2000 ppm. Alternatively, in some aspects, the amount effective of the phenylhexanol in the antimicrobial composition is from 500 to 1500 ppm. Alternatively, in some aspects, the amount effective of the phenylhexanol in the antimicrobial composition is from 500 to 1000 ppm.

In some aspects, the amount effective of the phenylhexanol in the antimicrobial composition is 500, or 1000, or 1500, or 2000, or 2500, or 3000, or 3500, or 4000, or 4500, or 5000, or 5500, or 6000% w/v.

In some aspects, the amount effective of the heliopropanal in the antimicrobial composition is from 2000 to 6000 ppm. Alternatively, in some aspects, the amount effective of the heliopropanal in the antimicrobial composition is from 2500 to 6000 ppm. Alternatively, in some aspects, the amount effective of the heliopropanal in the antimicrobial composition is from 3000 to 6000 ppm. Alternatively, in some aspects, the amount effective of the heliopropanal in the antimicrobial composition is from 3500 to 6000 ppm. Alternatively, in some aspects, the amount effective of the heliopropanal in the antimicrobial composition is from 4000 to 6000 ppm. Alternatively, in some aspects, the amount effective of the heliopropanal in the antimicrobial composition is from 4500 to 6000 ppm. Alternatively, in some aspects, the amount effective of the heliopropanal in the antimicrobial composition is from 5000 to 6000 ppm. Alternatively, in some aspects, the amount effective of the heliopropanal in the antimicrobial composition is from 5500 to 6000 ppm.

Alternatively, in some aspects, the amount effective of the heliopropanal in the antimicrobial composition is from 2000 to 5500 ppm. Alternatively, in some aspects, the amount effective of the heliopropanal in the antimicrobial composition is from 2000 to 5000 ppm. Alternatively, in some aspects, the amount effective of the heliopropanal in the antimicrobial composition is from 2000 to 4500 ppm. Alternatively, in some aspects, the amount effective of the heliopropanal in the antimicrobial composition is from 2000 to 4000 ppm. Alternatively, in some aspects, the amount effective of the heliopropanal in the antimicrobial composition is from 2000 to 3500 ppm. Alternatively, in some aspects, the amount effective of the heliopropanal in the antimicrobial composition is from 2000 to 3000 ppm. Alternatively, in some aspects, the amount effective of the heliopropanal in the antimicrobial composition is from 2000 to 2500 ppm.

In some aspects, the amount effective of the heliopropanal in the antimicrobial composition is 2000, or 2500, or 3000, or 3500, or 4000, or 4500, or 5000, or 5500, or 6000 ppm.

In some aspects, the amount effective of the tetralinol in the antimicrobial composition is from 1000 to 4000 ppm. Alternatively, in some aspects, the amount effective of the tetralinol in the antimicrobial composition is from 1500 to 4000 ppm. Alternatively, in some aspects, the amount effective of the tetralinol in the antimicrobial composition is from 2000 to 4000 ppm. Alternatively, in some aspects, the amount effective of the tetralinol in the antimicrobial composition is from 2500 to 4000 ppm. Alternatively, in some aspects, the amount effective of the tetralinol in the antimicrobial composition is from 3000 to 4000 ppm. Alternatively, in some aspects, the amount effective of the tetralinol in the antimicrobial composition is from 3500 to 4000 ppm.

Alternatively, in some aspects, the amount effective of the tetralinol in the antimicrobial composition is from 1000 to 3500 ppm. Alternatively, in some aspects, the amount effective of the tetralinol in the antimicrobial composition is from 1000 to 3000 ppm. Alternatively, in some aspects, the amount effective of the tetralinol in the antimicrobial composition is from 1000 to 2500 ppm. Alternatively, in some aspects, the amount effective of the tetralinol in the antimicrobial composition is from 1000 to 2000 ppm. Alternatively, in some aspects, the amount effective of the tetralinol in the antimicrobial composition is from 1000 to 1500 ppm.

In some aspects, the amount effective of the tetralinol in the antimicrobial composition is 1000, or 1500, or 2000, or 2500, or 3000, or 3500, or 4000 ppm.

In some aspects, the amount effective of the isoeugenol in the antimicrobial composition is from 500 to 3000 ppm. Alternatively, in some aspects, the amount effective of the isoeugenol in the antimicrobial composition is from 1000 to 3000 ppm. Alternatively, in some aspects, the amount effective of the isoeugenol in the antimicrobial composition is from 1500 to 3000 ppm. Alternatively, in some aspects, the amount effective of the isoeugenol in the antimicrobial composition is from 2000 to 3000 ppm. Alternatively, in some aspects, the amount effective of the isoeugenol in the antimicrobial composition is from 2500 to 3000 ppm.

Alternatively, in some aspects, the amount effective of the isoeugenol in the antimicrobial composition is from 500 to 2500 ppm. Alternatively, in some aspects, the amount effective of the isoeugenol in the antimicrobial composition is from 500 to 2000 ppm. Alternatively, in some aspects, the amount effective of the isoeugenol in the antimicrobial composition is from 500 to 1500 ppm. Alternatively, in some aspects, the amount effective of the isoeugenol in the antimicrobial composition is from 500 to 1000 ppm.

In some aspects, the amount effective of the isoeugenol in the antimicrobial composition is 500, or 1000, or 1500, or 2000, or 2500, or 3000 ppm.

In some aspects, the amount effective of the terpineol in the antimicrobial composition is from 500 to 3000 ppm. Alternatively, in some aspects, the amount effective of the terpineol in the antimicrobial composition is from 1000 to 3000 ppm. Alternatively, in some aspects, the amount effective of the terpineol in the antimicrobial composition is from 1500 to 3000 ppm. Alternatively, in some aspects, the amount effective of the terpineol in the antimicrobial composition is from 2000 to 3000 ppm. Alternatively, in some aspects, the amount effective of the terpineol in the antimicrobial composition is from 2500 to 3000 ppm.

Alternatively, in some aspects, the amount effective of the terpineol in the antimicrobial composition is from 500 to 2500 ppm. Alternatively, in some aspects, the amount effective of the terpineol in the antimicrobial composition is from 500 to 2000 ppm. Alternatively, in some aspects, the amount effective of the terpineol in the antimicrobial composition is from 500 to 1500 ppm. Alternatively, in some aspects, the amount effective of the terpineol in the antimicrobial composition is from 500 to 1000 ppm.

In some aspects, the amount effective of the terpineol in the antimicrobial composition is 500, or 1000, or 1500, or 2000, or 2500, or 3000 ppm.

In some aspects, the amount effective of the coumarine in the antimicrobial composition is from 1000 to 3000 ppm. Alternatively, in some aspects, the amount effective of the coumarine in the antimicrobial composition is from 1500 to 3000 ppm. Alternatively, in some aspects, the amount effective of the coumarine in the antimicrobial composition is from 2000 to 3000 ppm. Alternatively, in some aspects, the amount effective of the coumarine in the antimicrobial composition is from 2500 to 3000 ppm.

Alternatively, in some aspects, the amount effective of the coumarine in the antimicrobial composition is from 1000 to 2500 ppm. Alternatively, in some aspects, the amount effective of the coumarine in the antimicrobial composition is from 1000 to 2000 ppm. Alternatively, in some aspects, the amount effective of the coumarine in the antimicrobial composition is from 1000 to 1500 ppm.

In some aspects, the amount effective of the coumarine in the antimicrobial composition is 1000, or 1500, or 2000, or 2500, or 3000 ppm.

In some aspects, the amount effective of the eugenol F in the antimicrobial composition is from 200 to 1000 ppm. Alternatively, in some aspects, the amount effective of the eugenol F in the antimicrobial composition is from 300 to 1000 ppm. Alternatively, in some aspects, the amount effective of the eugenol F in the antimicrobial composition is from 400 to 1000 ppm. Alternatively, in some aspects, the amount effective of the eugenol F in the antimicrobial composition is from 500 to 1000 ppm. Alternatively, in some aspects, the amount effective of the eugenol F in the antimicrobial composition is from 600 to 1000 ppm. Alternatively, in some aspects, the amount effective of the eugenol F in the antimicrobial composition is from 700 to 1000 ppm. Alternatively, in some aspects, the amount effective of the eugenol F in the antimicrobial composition is from 800 to 1000 ppm. Alternatively, in some aspects, the amount effective of the eugenol F in the antimicrobial composition is from 900 to 1000 ppm.

Alternatively, in some aspects, the amount effective of the eugenol F in the antimicrobial composition is from 200 to 900 ppm. Alternatively, in some aspects, the amount effective of the eugenol F in the antimicrobial composition is from 200 to 800 ppm. Alternatively, in some aspects, the amount effective of the eugenol F in the antimicrobial composition is from 200 to 700 ppm. Alternatively, in some aspects, the amount effective of the eugenol F in the antimicrobial composition is from 200 to 600 ppm. Alternatively, in some aspects, the amount effective of the eugenol F in the antimicrobial composition is from 200 to 500 ppm. Alternatively, in some aspects, the amount effective of the eugenol F in the antimicrobial composition is from 200 to 400 ppm. Alternatively, in some aspects, the amount effective of the eugenol F in the antimicrobial composition is from 200 to 300 ppm.

In some aspects, the amount effective of the eugenol F in the antimicrobial composition is 200, or 300, or 400, or 500, or 600, or 700, or 800, or 900, or 1000 ppm.

In some aspects, the amount effective of the carbinol muguet in the antimicrobial composition is from 4000 to 7000 ppm. Alternatively, in some aspects, the amount effective of the carbinol muguet in the antimicrobial composition is from 4500 to 7000 ppm. Alternatively, in some aspects, the amount effective of the carbinol muguet in the antimicrobial composition is from 5000 to 7000 ppm. Alternatively, in some aspects, the amount effective of the carbinol muguet in the antimicrobial composition is from 5500 to 7000 ppm. Alternatively, in some aspects, the amount effective of the carbinol muguet in the antimicrobial composition is from 6000 to 7000 ppm. Alternatively, in some aspects, the amount effective of the carbinol muguet in the antimicrobial composition is from 6500 to 7000 ppm.

Alternatively, in some aspects, the amount effective of the carbinol muguet in the antimicrobial composition is from 4000 to 6500 ppm. Alternatively, in some aspects, the amount effective of the carbinol muguet in the antimicrobial composition is from 4000 to 6000 ppm. Alternatively, in some aspects, the amount effective of the carbinol muguet in the antimicrobial composition is from 4000 to 5500 ppm. Alternatively, in some aspects, the amount effective of the carbinol muguet in the antimicrobial composition is from 4000 to 5000 ppm. Alternatively, in some aspects, the amount effective of the carbinol muguet in the antimicrobial composition is from 4000 to 4500 ppm.

In some aspects, the amount effective of the carbinol muguet in the antimicrobial composition is 4000, or 4500, or 5000, or 5500, or 6000 ppm.

In some aspects, the amount effective of the benzyl acetate in the antimicrobial composition is from 4000 to 6000 ppm. Alternatively, in some aspects, the amount effective of the benzyl acetate in the antimicrobial composition is from 4500 to 6000 ppm. Alternatively, in some aspects, the amount effective of the benzyl acetate in the antimicrobial composition is from 5000 to 6000 ppm. Alternatively, in some aspects, the amount effective of the benzyl acetate in the antimicrobial composition is from 5500 to 6000 ppm.

Alternatively, in some aspects, the amount effective of the benzyl acetate in the antimicrobial composition is from 4000 to 5500 ppm. Alternatively, in some aspects, the amount effective of the benzyl acetate in the antimicrobial composition is from 4000 to 5000 ppm. Alternatively, in some aspects, the amount effective of the benzyl acetate in the antimicrobial composition is from 4000 to 4500 ppm.

In some aspects, the amount effective of the benzyl acetate in the antimicrobial composition is 4000, or 4500, or 5000, or 5500, or 6000 ppm.

In some aspects, the amount effective of the anisic aldehyde in the antimicrobial composition is from 2500 to 4500 ppm. Alternatively, in some aspects, the amount effective of the anisic aldehyde in the antimicrobial composition is from 3000 to 4500 ppm. Alternatively, in some aspects, the amount effective of the anisic aldehyde in the antimicrobial composition is from 3500 to 4500 ppm. Alternatively, in some aspects, the amount effective of the anisic aldehyde in the antimicrobial composition is from 4000 to 4500 ppm.

Alternatively, in some aspects, the amount effective of the anisic aldehyde in the antimicrobial composition is from 2500 to 4000 ppm. Alternatively, in some aspects, the amount effective of the anisic aldehyde in the antimicrobial composition is from 2500 to 3500 ppm. Alternatively, in some aspects, the amount effective of the anisic aldehyde in the antimicrobial composition is from 2500 to 3000 ppm.

In some aspects, the amount effective of the anisic aldehyde in the antimicrobial composition is 2500, or 3000, or 3500, or 4000, or 4500 ppm.

In some aspects, the amount effective of the heliotropin in the antimicrobial composition is from 4000 to 6000 ppm. Alternatively, in some aspects, the amount effective of the heliotropin in the antimicrobial composition is from 4500 to 6000 ppm. Alternatively, in some aspects, the amount effective of the heliotropin in the antimicrobial composition is from 5000 to 6000 ppm. Alternatively, in some aspects, the amount effective of the heliotropin in the antimicrobial composition is from 5500 to 6000 ppm.

Alternatively, in some aspects, the amount effective of the heliotropin in the antimicrobial composition is from 4000 to 5500 ppm. Alternatively, in some aspects, the amount effective of the heliotropin in the antimicrobial composition is from 4000 to 5000 ppm. Alternatively, in some aspects, the amount effective of the heliotropin in the antimicrobial composition is from 4000 to 4500 ppm.

In some aspects, the amount effective of the heliotropin in the antimicrobial composition is 4000, or 4500, or 5000, or 5500, or 6000 ppm.

In some aspects, the amount effective of the decal in the antimicrobial composition is from 1000 to 3000 ppm. Alternatively, in some aspects, the amount effective of the decal in the antimicrobial composition is from 1500 to 3000 ppm. Alternatively, in some aspects, the amount effective of the decal in the antimicrobial composition is from 2000 to 3000 ppm. Alternatively, in some aspects, the amount effective of the decal in the antimicrobial composition is from 2500 to 3000 ppm.

Alternatively, in some aspects, the amount effective of the decal in the antimicrobial composition is from 1000 to 2500 ppm. Alternatively, in some aspects, the amount effective of the decal in the antimicrobial composition is from 1000 to 2000 ppm. Alternatively, in some aspects, the amount effective of the decal in the antimicrobial composition is from 1000 to 1500 ppm.

In some aspects, the amount effective of the decal in the antimicrobial composition is 1000, or 1500, or 2000, or 2500, or 3000 ppm.

In some aspects, the amount effective of the perycorolle in the antimicrobial composition is from 4000 to 6000 ppm. Alternatively, in some aspects, the amount effective of the perycorolle in the antimicrobial composition is from 4500 to 6000 ppm. Alternatively, in some aspects, the amount effective of the perycorolle in the antimicrobial composition is from 5000 to 6000 ppm. Alternatively, in some aspects, the amount effective of the perycorolle in the antimicrobial composition is from 5500 to 6000 ppm.

Alternatively, in some aspects, the amount effective of the perycorolle in the antimicrobial composition is from 4000 to 5500 ppm. Alternatively, in some aspects, the amount effective of the perycorolle in the antimicrobial composition is from 4000 to 5000 ppm. Alternatively, in some aspects, the amount effective of the perycorolle in the antimicrobial composition is from 4000 to 4500 ppm.

In some aspects, the amount effective of the perycorolle in the antimicrobial composition is 4000, or 4500, or 5000, or 5500, or 6000 ppm.

In some aspects, the composition further comprises at least one ingredient selected from the group consisting of a perfumery carrier, a perfuming co-ingredient and mixtures thereof; and optionally at least one perfumery adjuvant.

In some aspects, the composition is formulated as a consumer product, wherein the consumer product is a perfume, a fabric care product, a body-care product, a cosmetic preparation, a skin-care product, an air care product or a home care product. In one aspect, the consumer product is a fine perfume, a splash or eau de perfume, a cologne, an shave or after-shave lotion, a liquid or solid detergent, a fabric softener, a fabric refresher, an ironing water, a paper, a bleach, a carpet cleaners, curtain-care products a shampoo, a coloring preparation, a color care product, a hair shaping product, a dental care product, a disinfectant, an intimate care product, a hair spray, a vanishing cream, a deodorant or antiperspirant, hair remover, tanning or sun product, nail products, skin cleansing, a makeup, a perfumed soap, shower or bath mousse, oil or gel, or a foot/hand care products, a hygiene product, an air freshener, a "ready to use" powdered air freshener, a mold remover, furnisher care, wipe, a dish detergent or hard-surface detergent, a leather care product, a car care product.

By "perfumery carrier" it is meant a material which is practically neutral from a perfumery point of view, i.e. which does not significantly alter the organoleptic properties of perfuming ingredients. The carrier may be a liquid or a solid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples solvents such as butylene or propylene glycols, glycerol, dipropyleneglycol and its monoether, 1,2,3-propanetriyl triacetate, dimethyl glutarate, dimethyl adipate 1,3-diacetyloxypropan-2-yl acetate, diethyl phthalate, isopropyl myristate, benzyl benzoate, benzyl alcohol, 2-(2-ethoxyethoxy)-1-ethano, tri-ethyl citrate or mixtures thereof, which are the most commonly used. For the compositions which comprise both a perfumery carrier and a perfumery co-ingredient, other suitable perfumery carriers than those previously specified, can be also ethanol, water/ethanol mixtures, limonene or other terpenes, isoparaffins such as those known under the trademark Isopar (origin: Exxon Chemical) or glycol ethers and glycol ether esters such as those known under the trademark Dowanol (origin: Dow Chemical Company), or hydrogenated castors oils such as those known under the trademark Cremophor RH 40 (origin: BASF).

As solid carrier it is meant a material where the perfuming composition or some element of the perfuming composition can be chemically or physically bound. In general such solid carrier are employed either to stabilize the composition, either to control the rate of evaporation of the compositions or of some ingredients. The employment of solid carrier is of current use in the art and a person skilled in the art knows how to reach the desired effect. However by way of non-limiting example as solid carriers one may cite absorbing gums or polymers or inorganic material, such as porous polymers, cyclodextrines, wood based materials, organic or inorganic gels, clays, gypsum talc or zeolites.

As other non-limiting example of solid carrier one may cite encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs- and Geliermittel in Lebensmitteln, Band 2 der Schriftenreihe Lebensmittelchemie, Lebensmittelqualitat, Behr's Verlag GmbH & Co., Hamburg, 1996. The encapsulation is a well-known process to a person skilled in the art, and may be performed, for instance, using techniques such as spray-drying, agglomeration or yet extrusion; or consists of a coating encapsulation, including coacervation and complex coacervation technique. As non-limiting examples one may cite in particular the core-shell encapsulation with resins of the aminoplast, polyamide, polyester, polyurea or polyurethane type or a mixture thereof (all of the resins are well known to a person skilled in the art) using techniques like phase separation process induced by polymerization, by interfacial polymerization, by coacervation or altogether (all of the techniques are have been described in the prior art), and optionally in presence of polymeric stabilizer or a cationic copolymer.

In particular, as resins one may cite the ones produced by the polycondensation of an aldehyde (e.g. formaldehyde, 2,2-dimethoxyethanal, glyoxal, glyoxylic acid or glycolaldehyde and mixtures thereof) with an amine, namely urea, benzoguanamine, glycoluryl, melamine, methylol melamine, methylated methylol melamine, guanazole and the like, as well as mixtures thereof. Alternatively one may use preformed resins alkylolated polyamines such as those commercially available under the trademark Urac® (origin: Cytec Technology Corp.), Cymel® (origin: Cytec Technology Corp.), Urecoll® or Luracoll® (origin: BASF).

In particular, as resins one may cite the ones produced by the polycondensation of an a polyol, like glycerol, and a polyisocyanate, like a trimer of hexamethylene diisocyanate, a trimer of isophorone diisocyanate or xylylene diisocyanate or a Biuret of hexamethylene diisocyanate or a trimer of xylylene diisocyanate with trimethylolpropane (known with the tradename of Takenate®, origin: Mitsui Chemicals), among which a trimer of xylylene diisocyanate with trimethylolpropane and a Biuret of hexamethylene diisocyanate.

Some of the seminal literature related to the encapsulation of perfumes by polycondensation of amino resins, namely melamine based resins, with aldehydes is represented by articles such as those published by K. Dietrich et al. in Acta Polymerica, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. U.S. Pat. No. 4,396,670, to the Wiggins Teape Group Limited is a pertinent early example of the latter. Since then, many other authors and creators have enriched the literature in this field and it would be impossible to cover all published developments here, but the general knowledge in this type of encapsulation is very significant. More recent publications of pertinence, which also address the suitable uses of such microcapsules, are represented for example by the article of H. Y. Lee et al. in Journal of Microencapsulation, 2002, vol. 19, pages 559-569, international patent publication WO 01/41915 or yet the article of S. Bône et al. in Chimia, 2011, vol. 65, pages 177-181.

Perfuming co-ingredients, when present in the perfuming composition, are other than nona-2,6-dien-1-ol, 3-neopentylpyridine, 2-methylhexan-3-one oxime, terpineol or 2-isopropyl-Moreover, by "perfuming co-ingredient" it is meant here a compound, which is used in a perfuming preparation or a composition to impart a hedonic effect. In other words such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients do not warrant a more detailed description here, which in any case would not be exhaustive, the skilled person being able to select them on the basis of his general knowledge and according to intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and the perfuming co-ingredients can be of natural or synthetic origin.

In particular one may cite perfuming co-ingredients which are commonly used in perfume formulations, such as:

Aldehydic ingredients: decanal, dodecanal, 2-methyl-undecanal, 10-undecenal, octanal and/or nonenal;

Aromatic-herbal ingredients: *eucalyptus* oil, camphor, eucalyptol, menthol and/or alpha-pinene;

Balsamic ingredients: coumarine, ethylvanillin and/or vanillin;

Citrus ingredients: dihydromyrcenol, citral, orange oil, linalyl acetate, citronellyl nitrile, orange terpenes, limonene, 1-P-menthen-8-yl acetate and/or 1,4(8)-P-menthadiene;

Floral ingredients: Methyl dihydrojasmonate, linalool, Citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino)benzoate, (E)-3-methyl-4-(2,6,6-trimethyl-2-cyclohex en-1-yl)-3-buten-2-one, hexyl salicylate, 3,7-dimethyl-1,6-nonadien-3-ol, 3-(4-isopropylphenyl)-2-methylpropanal, verdyl acetate, geraniol, P-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-P-menthanol, Propyl (S)-2-(1,1-dimethylpropoxy)propanoate, 2-methoxynaphthalene, 2,2,2-trichloro-1-phenyl ethyl acetate, 4/3-(4-hydroxy-4-methylpentyl)-3-cyclohexene-1-carbaldehyde, amylcinnamic aldehyde, 4-phenyl-2-butanone, isononyle acetate, 4-(1,1-diméthyléthyl)-1-cyclohexyl acetate, verdyl isobutyrate and/or mixture of methyl-ionones isomers;

Fruity ingredients: gamma ungamma-dodecalactoneactone, 4-decanolide, ethyl 2-methyl-pentanoate, hexyl acetate, ethyl 2-methylbutanoate, gamma nonalactone, allyl heptanoate, 2-phenoxyethyl isobutyrate, ethyl 2-methyl-1,3-dioxolane-2-acetate and/or diethyl 1,4-cyclohexane dicarboxylate;

Green ingredients: 2,4-Dimethyl-3-cyclohexene-1-carb aldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5, 5-dimethyl-1-cyclohexen-1-yl)-4-penten-1-one;

Musk ingredients: 1,4-dioxa-5,17-cycloheptadecanedione, pentadecenolide, 3-Methyl-5-cyclopentadecen-1-one, 1,3,4,6,7,8-hexahydro-4,6,6,7,8,8-hexamethyl-cyclopenta-g-2-benzopyrane, (1 S,1'R)-2-[1-(3',3 '-dimethyl-1'-cyclohexyl)ethoxy]-2-methylpropyl propanoate, pentadecanolide and/or (1 S,1'R)-[1-(3',3'-Dimethyl-1'-cyclohexyl)ethoxycarbonyl]methyl propanoate;

Woody ingredients: 1-(octahydro-2,3,8,8-tetramethyl-2-naphtalenyl)-1-ethanone, patchouli oil, terpenes fractions of patchouli oil, (1'R,E)-2-ethyl-4-(2',2',3'-trimethyl-3'-cyclopenten-1'-yl)-2-buten-1-ol, 2-ethyl-4-(2, 2,3-trimethyl-3-cyclopenten-1-yl)-2-buten-1-ol, Methyl cedryl ketone, 5-(2,2,3-trimethyl-3-cyclopentenyl)-3-methylpentan-2-ol, 1-(2,3,8,8-tetramethyl-1,2,3, 4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1, 3-benzodioxol-5-yl)-2-methylprop anal and/or 3-(3-isopropyl-1-phenyl)butanal.

Perfuming co-ingredients may not be limited to the above mentioned, and many other of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that the co-ingredients may also be compounds known to release in a controlled manner various types of perfuming compounds.

By "perfumery adjuvant" what is meant is an ingredient capable of imparting additional added benefit such as a color, a particular light resistance, chemical stability, etc. A detailed description of the nature and type of adjuvant commonly used in perfumery cannot be exhaustive, but it has to be mentioned that the ingredients are well known to a person skilled in the art. However, one may cite as specific non-limiting examples the following: viscosity agents (e.g. surfactants, thickeners, gelling and/or rheology modifiers), stabilizing agents (e.g. preservatives, antioxidant, heat/light and or buffers or chelating agents, such as BHT), color agents (e.g. dyes and/or pigments), preservative (e.g. antibacterial or antimicrobial or antifungi or anti irritant agents), abrasives, skin cooling agents, fixatives, insect repellants, ointments, vitamins and mixture thereof.

It is understood that a person skilled in the art is perfectly able to design optimal formulations for the desired effect by admixing the above mentioned components of a perfuming composition, simply by applying the standard knowledge of the art as well as by trial and error methodologies.

A perfuming composition consisting of at least one antimicrobial composition as defined above and at least one perfumery carrier represents a particular aspect of the disclosure as well as a perfuming composition comprising at least one antimicrobial composition as defined above, at least one perfumery carrier, at least one perfumery co-ingredient, and optionally at least one perfumery adjuvant.

For the sake of clarity, it is also understood that any mixture resulting directly from a chemical synthesis, e.g. a reaction medium without an adequate purification, in which the compound of the present disclosure would be involved as a starting, intermediate or end-product could not be considered as a perfuming composition according to the disclosure as far as the mixture does not provide the inventive compound in a suitable form for perfumery. Thus, unpurified reaction mixtures are generally excluded from the present disclosure unless otherwise specified.

Furthermore, the antimicrobial composition, as defined above, can also be advantageously used in all the fields of modern perfumery, i.e. fine or functional perfumery, to positively impart or modify the odor of a consumer product into which the antimicrobial composition is added. Consequently, another object of the present disclosure is represented by a perfuming consumer product comprising, at least one antimicrobial composition as described herein.

The above-composition can be added as such or as part of the present disclosure's perfuming composition.

For the sake of clarity, it has to be mentioned that, by "perfuming consumer product" it is meant a consumer product which is expected to deliver at least a pleasant perfuming effect to the surface to which it is applied (e.g. skin, hair, textile, or home surface) or in the air. In other words, a perfuming consumer product according to the disclosure is a perfumed consumer product which comprises the functional formulation, as well as optionally additional benefit agents, corresponding to the desired consumer product, e.g. a detergent or an air freshener, and an olfactive effective amount of at least one disclosure's compound. For the sake of clarity, the perfuming consumer product is a non-edible product.

The nature and type of the constituents of the perfuming consumer product do not warrant a more detailed description here, which in any case would not be exhaustive, the skilled person being able to select them on the basis of his general knowledge and according to the nature and the desired effect of the product.

Non-limiting examples of suitable perfuming consumer product can be a perfume, such as a fine perfume, a splash or eau de perfume, a cologne or a shave or after-shave lotion; a fabric care product, such as a liquid or solid detergent, a fabric softener, a fabric refresher, an ironing water, a paper, or a bleach, carpet cleaners, curtain-care products; a body-care product, such as a hair care product (e.g. a shampoo, a coloring preparation or a hair spray, a color care product, hair shaping product, a dental care product), a disinfectant, an intimate care product; a cosmetic preparation (e.g. a skin cream or lotion, a vanishing cream or a deodorant or antiperspirant (e.g. a spray or roll on), hair remover, tanning or sun or after sun product, nail products, skin cleansing, a makeup); or a skin-care product (e.g. a perfumed soap, shower or bath mousse, oil or gel, or a hygiene product or a foot/hand care products); an air care product, such as an air freshener or a "ready to use" powdered air freshener which can be used in the home space (rooms, refrigerators, cupboards, shoes or car) and/or in a public space (halls, hotels, malls, etc.); or a home care product, such as a mold remover, furnisher care, wipe, a dish detergent or hard-surface (e.g. a floor, bath, sanitary or a windows) detergent; a leather care product; a car care product, such as a polish, waxes or a plastic cleaners. Alternatively, in some aspects, the consumer products are body care or home care products.

Some of the above-mentioned perfuming consumer products may represent an aggressive medium for the disclosure's composition, so that it may be necessary to protect the latter from premature decomposition, for example by encapsulation or by chemically binding it to another chemical which is suitable to release the disclosure's ingredient upon a suitable external stimulus, such as an enzyme, light, heat or a change of pH.

The proportions in which the composition according to the disclosure can be incorporated into the various aforementioned products or compositions vary within a wide range of values. These values are dependent on the nature of the article to be perfumed and on the desired organoleptic effect as well as on the nature of the co-ingredients when the compounds according to the disclosure are mixed with perfuming co-ingredients, solvents or additives commonly used in the art.

For example, in the case of perfuming compositions, typical concentrations are in the order of 0.001% to 10% by weight, or even more, of the disclosure's composition based on the weight of the composition into which they are incorporated. Concentrations lower than these, such as in the order of 0.01% to 1% by weight, can be used when these compounds are incorporated into perfuming consumer products, percentage being relative to the weight of the article.

In some aspects, the present disclosure provides particular methods of use including counteracting microbial activity in a perfuming or consumer product in particular by circumventing the presence of chlorinated biocides in such products. These methods comprise adding to or incorporating in such products an antimicrobial composition as described herein, wherein the antimicrobial composition provides an antimicrobial effect. Thus, the use of chlorinated biocides can be avoided or eliminated.

The present invention is best illustrated but is not limited to the following examples.

EXAMPLES

Example 1: Preparation of Bacterial Suspensions and the BCT Test

*C. xerosis*: Suspensions of the *C. xerosis* ATCC 373 strain were prepared as follows: Stock cultures (stored at −80° C.) were thawed and subcultured onto Tryptic Soy Agar media with Tween 80 (TSA-TW80), and incubated at 37° C. for 48 h. The primary cultures were subcultured onto TSA-TW80 again, to prepare the secondary cultures. Single colonies of the secondary cultures were selected and used to inoculate 30 ml brain heart infusion broth with Tween 80 (BHI-TW80). The inoculated broth was incubated at 37° C. at 180 rpm for 24 h. Aliquots (1 ml) of the 24 h culture were inoculated into 30 ml of fresh BHI-TW80 broth media, and incubated at 37° C. at 180 rpm for 48 h. Aliquots (2-3 ml) of the 48 h culture were inoculated into four 50 ml of fresh BHI-TW80 broth media, and incubated at 37° C. 180 rpm for 4-6 hrs. When the OD 600 nm reached the target value of 1.6, cells were harvested by centrifugation at 5000 rpm for 10 min, and then resuspended in the same fresh BHI-TW80 at a concentration of $10^9$ to $10^{10}$ cfu/mL. This suspension was used as the bacterial suspension for the BCT test.

*S. haemolyticus*: Suspensions of the *S. haemolyticus* 114126 strain, isolated from skin, were prepared as follows: Stock cultures (stored at −80° C.) were thawed and sub-cultured onto TSA-TW80 agar plate media, and incubated at 37° C. for 24 h to obtain single colonies. Single colonies of the primary cultures were streaked onto fresh TSA-TW80 plates and incubated at 37° C. for 24 h to prepare secondary cultures. Single colonies of secondary cultures were picked and used to inoculate 50 mL of BHI-TW80 broth. The inoculated broth was incubated at 37° C. at 180 rpm for 18 h. Aliquots (0.5 ml) of the 18 h culture were inoculated into 50 ml of fresh BHI-TW80 broth, and incubated at 37° C. at 180 rpm for approximately 3 hours. When the OD 600 nm value of the broth reached 1-2, cells were harvested by centrifugation at 5000 rpm for 10 min, and then resuspended in fresh BHI-TW80 broth at a concentration of 1-5×10 8 CFU/mL. This suspension was used as the bacterial suspension for the BCT test.

*E. coli, S. aureus, P. aeruginosa,* and *S. enterica*: Separate suspensions of the *E. coli* ATCC 10536 strain, *S. aureus* ATCC 6538 strain, *Pseudomonas aeruginosa* ATCC 15442 strain, and the *Salmonella enterica* ATCC 10708 strain were prepared as follows: Stock cultures (stored at −80° C.) were thawed and sub-cultured onto Tryptic Soy Agar (TSA) agar plate media, and incubated at 37° C. for 24 h to obtain single colonies. Single colonies of the primary cultures were streaked onto TSA plates and incubated at 37° for 24 h to generate secondary cultures. Single colonies of secondary cultures picked and used to inoculate into 50 mL of TSB broth. The inoculated TSB broth was incubated at 37° C. at 180 rpm for 18 h. Aliquots (0.5 ml) of the 18 h culture were inoculated into 50 ml of fresh TSB broth, and incubated at 37° C. at 180 rpm for 2-3 hours. When the $OD_{600\ nm}$ value of the broth reached 1-2, cells were harvested by centrifugation at 5000 rpm for 10 min, and then resuspended in fresh TSB broth at a concentration of 1-5×10 8 CFU/mL. These suspensions were used as the bacterial suspensions for the BCT test.

BCT Test: Test compositions at a range of concentrations (either combinations of more than one perfume ingredient, and comparative compositions comprising the single perfume ingredients) were prepared in ethanol. Five replicates of each test composition were added into 96-well microtiter plates (120 µl per well), with row B containing control compositions containing the ethanol solution alone. 120 µl of bacterial cell suspensions at a concentration of approximately 1×10 8 bacteria per mL (as prepared above) were added to each well of the microtiter plate. The bacterial suspensions were incubated with the test solutions for 45, 60, or 120 seconds. Following the incubation of the bacterial suspensions with the test solutions, serial dilutions of the bacterial suspensions were generated (three serial 1:10 dilutions, followed by 17 serial 1:2 dilutions), in multiwell microtiter plates.

Each plate was sealed and incubated at 37° C. under agitation (180 rpm). After incubation, the turbidity of the wells ($OD_{600\ nm}$) was determined using a Tecan microplate reader. Turbid wells were regarded as positive growth, due to the presence of viable cells. The total number of viable cells (log CFU) for each sample was calculated. And the log reduction for each test composition at the final concentration (dose) was calculated against the control sample of the ethanol solution. The degree of effect ($f_a$) observed from a specific concentration of a test composition was calculated by dividing the log reduction of each sample by the log CFU value of the control sample (referred to herein as the effect fraction).

Determination of Synergy via the Combination Index (CI): The CI was calculated using Compusyn software (ComboSyn, Inc., as created by Dr. Dorothy Chou in 2005), according to the manufacturer's instructions. The concentration of each test composition (combinations of more than one perfume ingredient, and comparative compositions comprising the single perfume ingredients used to generate the combination) and their corresponding effect fraction was entered, and the corresponding CI calculated.

When the calculated CI values were less than 0.9, the combination of perfume ingredients was regarded as having synergistic effect. When the calculated CI was between 1.0 a 0.9, the combination of perfume ingredients was regarded as having an additive effect. When the calculated CI was greater than 1.0, the combination of perfume ingredients was regarded as having an antagonistic effect.

Tables 1 to 53 show the dose effect of the compositions according to the various aspects presented herein, and the corresponding individual perfume ingredients, on inactivating bacterial cells. Stock of compositions were prepared in 100% ethanol, then diluted in MilliQ water to obtain 2× final concentration in 40% ethanol or 50% ethanol. The experiments were designed with various target bacterial strains and contact times to reflect various applications: deodorant (Tables 1 to 14); soap (Tables 15 to 24); and surface cleaner (Tables 25 to 53).

Tables 54 to 56 show the log reduction and calculated CI of the tested compositions, using the data in Tables 1-53, against various strains for various applications. Highlighted cells indicates a calculated synergistic effect of a particular combination of perfume ingredients. The table below summarizes the data in Tables 54 to 56, listing the various synergistic compositions generated according to some aspects presented herein.

| Target strains | BCT contact time | Synergistic mixtures |
| --- | --- | --- |
| *Corynebacterium xerosis* ATCC 373 | 120 s | A4, S12, S15, S2 |
| *Staphylococcus haemolyticus* 114126 | 120 s | A4, S12, S15, S2 |
| *Escherichia coli* ATCC 10536 | 45 s | A4 |
| *Staphylococcus aureus* ATCC 6538 | 60 s | S12, S15, S2, S1 |
| *Pseudomonas aeruginosa* ATCC 15442 | 60 s | S12, S2, S1, A3, S11 |
| *Salmonella enterica* ATCC 10708 | 60 s | A4, S12, S15, S2, A3, S5 |

The tables below describe the perfume ingredients (PRM) constituting compositions A3, A4, S1, S2, S5, S11, S12, and S15 at a specified concentration, listing the amount of the perfume ingredient in the composition in ppm.

| 1% A3 PRM | PPM |
| --- | --- |
| Decal | 2000 |
| Isoeugenol | 1000 |
| Perycorolle | 5000 |
| Tetralinol | 2000 |

| 1% A4 PRM | PPM |
| --- | --- |
| Heliopropanal | 3000 |
| Nerol | 1500 |
| Phenylhexanol | 2500 |
| Tetralinol | 3000 |

| 0.9% S1 PRM | PPM |
| --- | --- |
| Aldehyde Anisic | 3250 |
| Heliotropine | 5000 |
| Terpineol | 750 |

| 0.6% S2 PRM | PPM |
| --- | --- |
| Phenylhexanol | 1000 |
| Terpineol | 2500 |
| Isoeugenol | 2500 |

| 0.96% S5 | PPM |
| --- | --- |
| Eugenol | 600 |
| Phenilhexanol | 3000 |
| Carbinol muguet | 6000 |

| 1.4% S11 | ppm |
| --- | --- |
| Aldehyde Anisic | 3250 |
| Heliotropine | 5000 |
| Terpineol | 750 |
| Heliopropanal | 5000 |

| 0.9% S12 PRM | PPM |
| --- | --- |
| Phenylhexanol | 5000 |
| Terpineol | 1000 |
| Isoeugenol | 1000 |
| Coumarine | 2000 |

| 1.3% S15 PRM | PPM |
| --- | --- |
| Eugenol | 500 |
| Phenylhexanol | 2500 |
| Carbinol muguet | 5000 |
| Benzyl acetate | 5000 |

Example 2: In Vitro Efficacy of the Compositions According to Some Aspects Presented Herein in a Roll-on Deodorant Base Test deodorant formulations comprising either antimicrobial compositions A3, A4, S2, S5, S12, S14, and S15 were generated as follows: 50 mg of the antimicrobial composition was added to 300 mg Cremphor (BASF) and 9.57 g of deodorant base. The combined mixture was stirred for 10 min, using a magnetic stirrer. Control deodorant formulations were also generated, comprising either the deodorant base without an antimicrobial composition, or ethylhexylglycerin.

A 900 mg sample of the test deodorant, or control deodorant formulations were added to suspensions of *C. xerosis* ATCC 373 cells that were generated according to the methods described in Example 1 above. The test and control deodorant formulations were contacted with the bacterial suspensions for 120 seconds, during which time the samples were mixed as follows: 2× (mixed 30 s by vortex, then rested for 10 s), then mixed again for 20 s. At the end of the contact time, a 9 ml aliquot of brain heart infusion broth (BHI) was added to each sample, resulting in a $10^{-1}$ dilution of the sample. Further dilutions ($10^{-2}$-$10^{-7}$) were made in 900 µl BHI. Aliquots (100 µl) of each dilution were plated onto duplicate plates of TSA+0.5% Tween media. After incubation at 37° C. for 3 days, colonies on plates were counted. Log reduction of viable cells was calculated against the control sample of BHI media. The results are shown in FIG. 1.

Test deodorant formulations comprising either antimicrobial compositions A3, A4, S2, S5, S12, S14, and S15 showed a greater log reduction of bacterial growth than both control deodorant formulations, including the benchmark antimicrobial agent ethylhexylglycerin (lower and upper lines on FIG. 1, respectively).

Example 3: In Vivo Efficacy of the Composition Designated "A4" in a Deodorant Base Next, the antimicrobial composition A4 was selected and incorporated into a roll-on deodorant base, according to the methods described in Example 2. Referring to the table below, antimicrobial composition A4 was selected as the prototype for a roll-on product because antimicrobial composition A4 contains ingredients, such as, heliopropanal and phenylhexanol, which have lower evaporation rates. Lower evaporation rates may prolong the antimicrobial activity of the deodorant formulation.

| Predicted concentration of ingredients in ethanol over 8 h | | | | |
|---|---|---|---|---|
| Ingredients | 0 min | 60 min | 4 h | 8 h |
| Heliopropanal | 0.015 | 0.0149 | 0.0095 | 0.0017 |
| Nerol | 0.0075 | 0.0068 | 0.0000 | 0.0000 |
| Phenylhexanol | 0.0125 | 0.0125 | 0.0083 | 0.0015 |
| Tetralinol | 0.015 | 0.0117 | 0.0000 | 0.0000 |
| Carbinol muguet | 0.01923 | 0.0178 | 0.0000 | NT |
| Benzyl acetate | 0.01923 | 0.0000 | 0.0000 | NT |

Test subjects were asked to evaluate the ability of the test deodorant formulation to reduce sweat malodor, at four and 8 hours after application. In addition, the ability of the test deodorant formulation to reduce the bacterial population on the subjects' skin was also evaluated.

Evaluation of Efficacy Four Hours After Application: Referring to the table below, forty subjects followed the following protocol: For the first six days of the study, the subjects were instructed to use a perfume-free soap for washing and to abstain from the use of deodorants and antiperspirants. After this initial six day wash-out phase, the subjects performed a standardized washing of their axillae with perfume-free soap, and 24 hours after washing, four odor judges assessed sweat odor to approve the validity of 20 subjects. The next day, the eligible 20 subjects performed another standardized washing. Assessment of sweat odor was repeated and microbial swabs were taken for a 0-hour-evaluation (Baseline). Afterwards, the test deodorant formulation (400 mg) was randomly applied onto one axilla per person. Four hours after product application, the assessment of sweat odor was repeated, microbial swabs were taken again from both axilla. The results are shown in FIG. 2.

| Day | 1 until 6 | 7 | 8 | 9 |
|---|---|---|---|---|
| Wash-Out-Phase with Perfume-Free Soap | X | | | |
| Shaving of Axillary Hair | X | | | |
| (By the subjects themselves on Day6, at home) | | | | |
| Standardized Washing at the Study Site | | X | X | |
| Assessment of Baseline Sweat Odor | | X | | |
| (24 h after Standardized Washing of 40 subjects) | | | | |
| Assessment of Baseline Sweat Odor | | | X | |
| (0 h after Standardized Washing = Prescreening) | | | | |
| Taking of microbiological swabs | | | X | |
| (0 h after Standardized Washing of 20 subjects) | | | | |
| Application of Test Products | | | | X |
| Repeat of Sweat Odor Assessment | | | | X |
| (4 h after Application of Test Products) | | | | |
| Taking of microbiological swabs | | | | X |
| (4 h after Standardized Washing of 20 subjects) | | | | |

Figure 2:
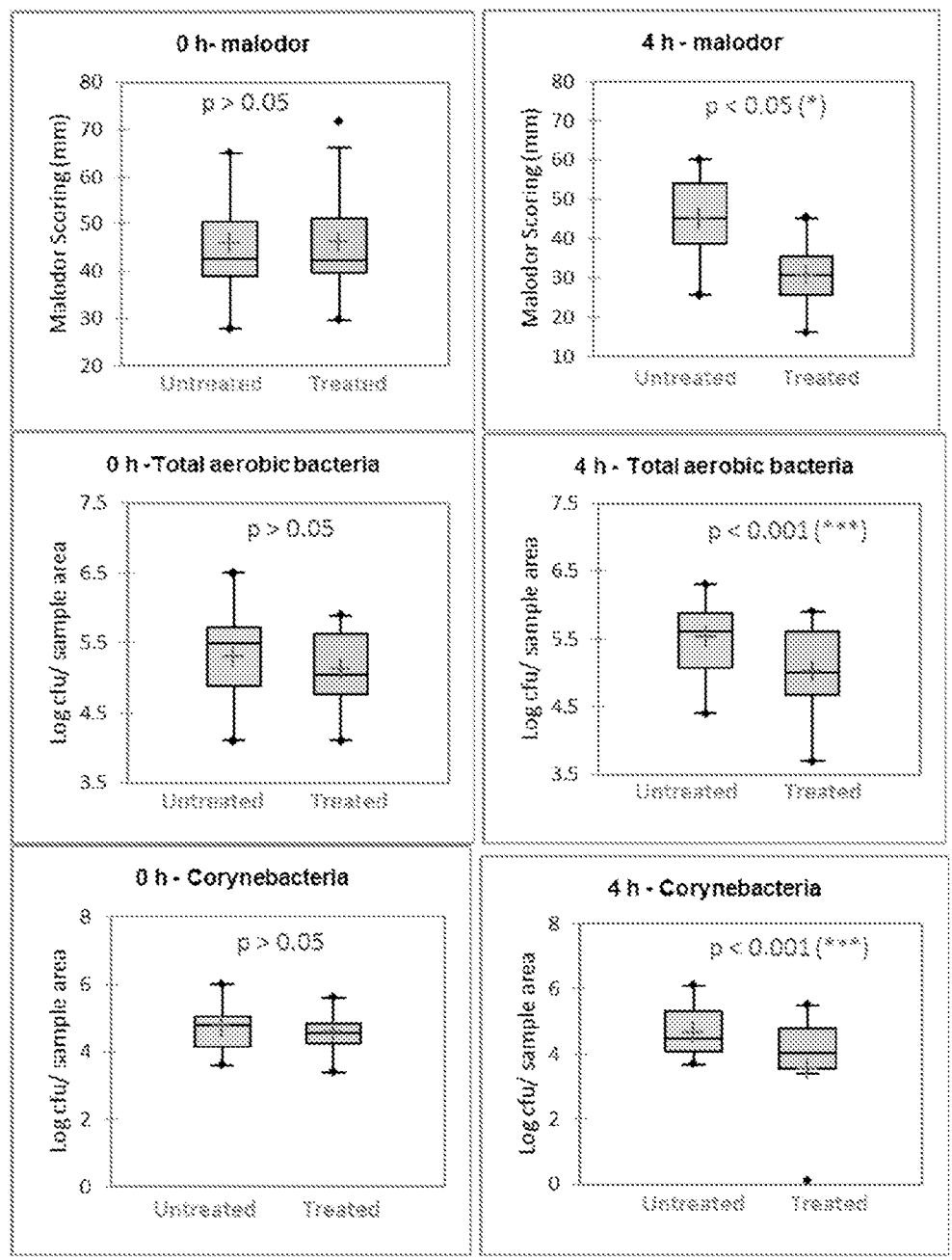
FIG. 2 shows the in vivo efficacy of a test deodorant formulation comprising compositions according to some embodiments of the present disclosure on malodor formation and bacterial growth, four hours after application to subjects' skin.

Referring to FIG. 2, no significant difference between the treated and untreated axilla ($p>0.05$) at the 0 hour baseline were observed. However, after four hours, the treated axilla had significantly lower reported malodor values, total bacterial counts and Corynebacteria counts ($p<0.05$). Taken together, these data suggest that the test deodorant formulation was able to control sweat malodor.

Evaluation of Efficacy Eight Hours After Application: Referring to the table below, forty subjects followed the following protocol: For the first seven days of the study, the subjects were instructed to use a perfume-free soap for washing and to abstain from the use of deodorants and antiperspirants. After this initial sis day wash-out phase, the subjects performed a standardized washing of their axillae with perfume-free soap, and 24 hours after washing, four odor judges assessed sweat odor to approve the validity of 20 subjects. The next day, the subjects performed another standardized washing. Assessment of sweat odor was repeated and microbial swabs were taken for a 0-hour-evaluation (Baseline). Afterwards, the test deodorant formulation (400 mg) was applied randomly onto one axilla per person. Eight hours after product application, the assessment of sweat odor was repeated, microbial swabs were taken again for both axilla. The results are shown in FIG. 3.

| Day | 1-7 | 8 | 9 | 10 |
|---|---|---|---|---|
| Wash-out-phase with perfume-free soap | X | | | |
| Shaving of axillary hair | X | | | |
| (by the subjects themselves on Day 7, at home) | | | | |
| Standardized washing at the Study Site | | X | X | X |
| Assessment of sweat odor | | | X | |
| (24 h after standardized washing = pre-screening of 40 subjects) | | | | |
| Assessment of Baseline sweat odor | | | | X |
| (0 h (= directly) after standardized washing of 20 subjects) | | | | |
| Taking of microbial swabs | | | | X |
| (0 h (= directly) after standardized washing, of 20 subjects) | | | | |
| Application of test products | | | | X |
| Repeat of sweat odor assessment | | | | X |
| (8 h after application of test products) | | | | |
| Taking of microbial swabs | | | | X |
| (8 h after standardized washing, of 20 subjects) | | | | |

Figure 3:
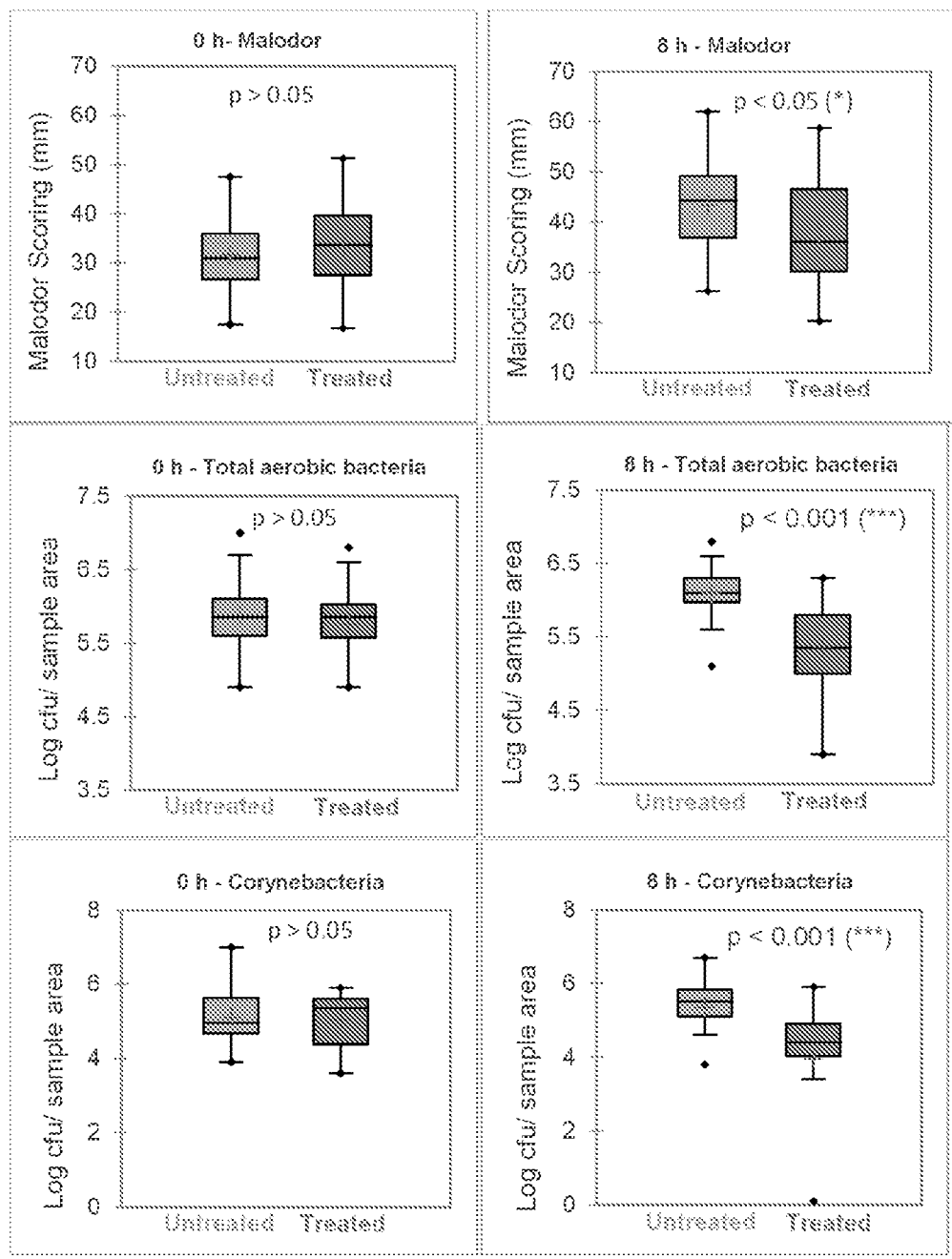
FIG. 3 shows the in vivo efficacy of a test deodorant formulation comprising compositions according to some embodiments of the present disclosure on malodor formation and bacterial growth, eight hours after application to subjects' skin.

Referring to FIG. 3, no significant difference between the treated and untreated axilla ($p>0.05$) at the 0 hour baseline were observed. However, after eight hours, the treated axilla had significantly lower reported malodor values, total bacterial counts and Corynebacteria counts ($p<0.05$). Taken together, these data suggest that the test deodorant formulation was able to control sweat malodor.

TABLE 1

Dose response of A3 mixture and compositions against *C. xerosis* ATCC 373

| Code | Sample name | | BCT_120 s_*C. xerosis* ATCC 373 in 25% EtOH | | | | |
|---|---|---|---|---|---|---|---|
| | A3 mixture (Decal: | Dose (% w/v) | 0.100 | 0.150 | 0.200 | 0.250 | 0.300 |
| | Isoeugenol: | Log reduction | 0.3 | 3.5 | 6.0 | 6.5 | 7.0 |
| | Perycorolle: | Effect fraction | 0.04 | 0.49 | 0.86 | 0.91 | 1.00 |
| | Tetralinol = 2:1:5:2) | | | | | | |
| | Decal | Dose (% w/v) | 0.100 | 0.150 | 0.200 | 0.250 | 0.300 |
| | | Log reduction | 0.1 | 2.2 | 4.6 | 5.4 | 6.1 |
| | | Effect fraction | 0.00 | 0.32 | 0.65 | 0.77 | 0.86 |
| | Isoeugenol | Dose (% w/v) | 0.250 | 0.300 | 0.400 | 0.500 | 0.600 |
| | | Log reduction | 2.4 | 3.4 | 5.0 | 6.3 | 6.6 |
| | | Effect fraction | 0.35 | 0.48 | 0.71 | 0.89 | 1.00 |
| | Perycorolle | Dose (% w/v) | 0.100 | 0.150 | 0.200 | 0.250 | 0.300 |
| | | Log reduction | 0.2 | 3.4 | 4.8 | 6.5 | 6.4 |
| | | Effect fraction | 0.04 | 0.53 | 0.75 | 1.00 | 1.00 |
| | Tetralinol | Dose (% w/v) | 0.050 | 0.100 | 0.200 | 0.250 | 0.300 |
| | | Log reduction | 0.1 | 4.0 | 5.7 | 6.4 | 6.5 |
| | | Effect fraction | −0.02 | 0.63 | 0.88 | 1.00 | 1.00 |

TABLE 2

Dose response of A4 mixture and compositions against *C. xerosis* ATCC 373

| Code | Sample name | | BCT_120 s_*C. xerosis* ATCC 373 in 25% EtOH | | | | |
|---|---|---|---|---|---|---|---|
| | A4 mixture | Dose (% w/v) | 0.1 | 0.125 | 0.15 | 0.175 | 0.2 |
| | (Heliopropanal:Nerol: | Log reduction | −0.1 | 1.2 | 3.2 | 3.7 | 5.0 |
| | Phenylhexanol: | Effect fraction | −0.02 | 0.16 | 0.43 | 0.50 | 0.67 |
| | Tetralinol = 6:3:5:6) | | | | | | |
| | Heliopropanal | Dose (% w/v) | 0.2 | 0.250 | 0.300 | 0.350 | 0.400 |
| | | Log reduction | 0.1 | 0.3 | 1.4 | 1.8 | 2.2 |
| | | Effect fraction | 0.01 | 0.04 | 0.19 | 0.25 | 0.29 |
| | Nerol | Dose (% w/v) | 0.080 | 0.100 | 0.120 | 0.140 | 0.160 |
| | | Log reduction | −0.1 | 0.5 | 2.6 | 4.9 | 7.2 |
| | | Effect fraction | −0.01 | 0.07 | 0.36 | 0.66 | 0.97 |
| | Phenylhexanol | Dose (% w/v) | 0.100 | 0.150 | 0.200 | 0.300 | |
| | | Log reduction | 0.1 | 2.5 | 4.2 | 5.9 | |
| | | Effect fraction | 0.02 | 0.35 | 0.59 | 0.83 | |
| | Tetralinol | Dose (% w/v) | 0.050 | 0.100 | 0.200 | 0.250 | 0.300 |
| | | Log reduction | 0.1 | 1.7 | 3.8 | 4.5 | 5.7 |
| | | Effect fraction | 0.01 | 0.24 | 0.54 | 0.64 | 0.80 |

TABLE 3

Dose response of S15 mixture and compositions against *C. xerosis* ATCC 373

| Code | Sample name | | BCT_120 s_*C. xerosis* ATCC 373 in 25% EtOH | | | | |
|---|---|---|---|---|---|---|---|
| | S15 mixture | Dose (% w/v) | 0.260 | 0.325 | 0.390 | 0.520 | 0.650 |
| | (EugenolF: | Log reduction | 2.6 | 4.0 | 4.7 | 5.9 | 6.3 |
| | Phenylhexanol: | Effect fraction | 0.39 | 0.6 | 0.7 | 0.88 | 0.94 |
| | Carbinol muguet: | | | | | | | |
| | Benzyl acetate = | | | | | | | |
| | 1:5:10:10) | | | | | | | |
| | Eugenol F | Dose (% w/v) | 0.200 | 0.250 | 0.300 | 0.400 | 0.500 |
| | | Log reduction | 0.4 | 1.8 | 2.7 | 5.1 | 6.3 |
| | | Effect fraction | 0.06 | 0.26 | 0.39 | 0.76 | 0.94 |
| | Phenylhexanol | Dose (% w/v) | 0.100 | 0.150 | 0.200 | 0.250 | 0.300 |
| | | Log reduction | 0.7 | 3.4 | 4.7 | 5.1 | 6.3 |
| | | Effect fraction | 0.11 | 0.51 | 0.7 | 0.76 | 0.94 |
| | Carbinol muguet | Dose (% w/v) | 0.300 | 0.400 | 0.500 | 0.600 | 0.700 |
| | | Log reduction | 0.5 | 2.4 | 3.7 | 5.0 | 6.6 |
| | | Effect fraction | 0.07 | 0.33 | 0.49 | 0.68 | 0.89 |
| | Benzyl acetate | Dose (% w/v) | 0.250 | 0.400 | 0.500 | 0.750 | 1.000 |
| | | Log reduction | 0.0 | 1.1 | 2.8 | 4.6 | 5.2 |
| | | Effect fraction | 0 | 0.14 | 0.38 | 0.62 | 0.7 |

TABLE 4

Dose response of S14 mixture and compositions against *C. xerosis* ATCC 373

| Code | Sample name | | BCT_120 s_*C. xerosis* ATCC 373 in 25% EtOH | | | | |
|---|---|---|---|---|---|---|---|
| | S14 mixture (Geraniol: | Dose (% w/v) | 0.105 | 0.158 | 0.210 | 0.263 | 0.315 |
| | EugenolF:Cinnamic | Log reduction | 0.0 | 1.8 | 4.9 | 6.8 | 7.2 |
| | alcohol:Calone = | Effect fraction | 0.00 | 0.25 | 0.68 | 0.94 | 1.00 |
| | 10:5:5:1) | | | | | | |
| | (E)-3,7-DIMETHYL- | Dose (% w/v) | 0.100 | 0.125 | 0.150 | 0.175 | 0.200 |
| | 2,6-OCTADIEN-1-OL | Log reduction | 0.9 | 3.6 | 4.8 | 6.8 | 7.0 |
| | "Geraniol Pur" | Effect fraction | 0.12 | 0.50 | 0.67 | 0.94 | 0.97 |
| | Eugenol F | Dose (% w/v) | 0.100 | 0.200 | 0.300 | 0.400 | 0.500 |
| | | Log reduction | 0.1 | 0.4 | 5.0 | 6.4 | 7.2 |
| | | Effect fraction | 0.01 | 0.05 | 0.69 | 0.89 | 1.00 |
| | (2E)-3-phenyl-2-propen- | Dose (% w/v) | 0.250 | 0.500 | 0.600 | 0.700 | 0.800 |
| | 1-ol "Cinnamic alcohol" | Log reduction | 0.0 | 2.9 | 4.3 | 6.0 | 7.2 |
| | | Effect fraction | 0.00 | 0.40 | 0.59 | 0.83 | 1.00 |
| | 7-methyl-2H-1,5- | Dose (% w/v) | 0.500 | 0.750 | 1.000 | 1.250 | 1.500 |
| | benzodioxepin-3(4H)- | Log reduction | 0.2 | 0.6 | 3.2 | 6.0 | 6.8 |
| | one "Calone" | Effect fraction | 0.03 | 0.09 | 0.44 | 0.83 | 0.94 |

TABLE 5

Dose response of S2 mixture and compositions against *C. xerosis* ATCC 373

| Code | Sample name | | BCT_120 s_*C. xerosis* ATCC 373 in 25% EtOH | | | |
|---|---|---|---|---|---|---|
| | S2 mixture | Dose (% w/v) | 0.18 | 0.24 | 0.3 | 0.45 |
| | (Phenylhexanol: | Log reduction | 1.5 | 4.0 | 4.4 | 6.4 |
| | Terpineol: | Effect fraction | 0.24 | 0.63 | 0.69 | 1.00 |
| | Isoeugenol = | | | | | |
| | 2:5:5) | | | | | |
| | Phenylhexanol | Dose (% w/v) | 0.15 | 0.20 | 0.25 | 0.30 |
| | | Log reduction | 3.8 | 4.4 | 5.2 | 5.6 |
| | | Effect fraction | 0.59 | 0.69 | 0.81 | 0.88 |
| | Terpineol Ord | Dose (% w/v) | 0.25 | 0.30 | 0.35 | 0.40 |
| | | Log reduction | 2.9 | 3.9 | 6.0 | 6.4 |
| | | Effect fraction | 0.45 | 0.61 | 0.94 | 1.00 |
| | Isoeugenol | Dose (% w/v) | 0.25 | 0.30 | 0.40 | 0.50 |
| | | Log reduction | 1.6 | 3.3 | 4.7 | 7.4 |
| | | Effect fraction | 0.22 | 0.44 | 0.63 | 1.00 |

TABLE 6

Dose response of S12 mixture and compositions against *C. xerosis* ATCC 373

| Code | Sample name | | BCT_120 s_*C. xerosis* ATCC 373 in 25% EtOH | | | |
|---|---|---|---|---|---|---|
| | S12 mixture | Dose (% w/v) | 0.18 | 0.270 | 0.36 | 0.450 |
| | (Phenylhexanol: | Log reduction | 2.2 | 4.7 | 7.2 | 7.0 |
| | Terpineol: | Effect fraction | 0.29 | 0.64 | 0.97 | 0.95 |
| | Isoeugenol: | | | | | |
| | Coumarine = 5:1:1:2) | | | | | |
| | Phenylhexanol | Dose (% w/v) | 0.15 | 0.20 | 0.25 | 0.30 |
| | | Log reduction | 3.8 | 4.4 | 5.2 | 5.6 |
| | | Effect fraction | 0.59 | 0.69 | 0.81 | 0.88 |
| | Terpineol Ord | Dose (% w/v) | 0.25 | 0.30 | 0.35 | 0.40 |
| | | Log reduction | 2.9 | 3.9 | 6.0 | 6.4 |
| | | Effect fraction | 0.45 | 0.61 | 0.94 | 1.00 |
| | Isoeugenol | Dose (% w/v) | 0.25 | 0.30 | 0.40 | 0.50 |
| | | Log reduction | 1.6 | 3.3 | 4.7 | 7.4 |
| | | Effect fraction | 0.22 | 0.44 | 0.63 | 1.00 |
| | Coumarine | Dose (% w/v) | 0.75 | 1.00 | 1.25 | 1.50 |
| | | Log reduction | −0.2 | 0.8 | 2.6 | 2.7 |
| | | Effect fraction | −0.02 | 0.11 | 0.35 | 0.37 |

TABLE 7

Dose response of A3 mixture and compositions against *S. haemolyticus* 114126

| Code | Sample Name | BCT_120 s_*S. haemolyticus* 114126 in 25% EtOH | | | | | |
|---|---|---|---|---|---|---|---|
| | A3 (Decal: | Dose (% w/v) | 0.100 | 0.125 | 0.150 | 0.175 | 0.200 |
| | Isoeugenol: | Log reduction | 0.5 | 1.6 | 5.2 | 7.2 | 7.0 |
| | Perycorolle: | Effect fraction | 0.07 | 0.23 | 0.73 | 1.00 | 0.97 |
| | Tetralinol = 2:1:5:1) | | | | | | |
| | Decal | Dose (% w/v) | 0.100 | 0.125 | 0.150 | 0.175 | 0.200 |
| | | Log reduction | 0.5 | 0.7 | 1.2 | 3.2 | 4.5 |
| | | Effect fraction | 0.06 | 0.09 | 0.16 | 0.42 | 0.60 |
| | Isoeugenol | Dose (% w/v) | 0.150 | 0.200 | 0.300 | 0.350 | 0.400 |
| | | Log reduction | −0.3 | 0.5 | 3.7 | 5.6 | 7.2 |
| | | Effect fraction | −0.04 | 0.07 | 0.52 | 0.78 | 1.00 |
| | Perycorolle | Dose (% w/v) | 0.100 | 0.125 | 0.150 | 0.175 | 0.200 |
| | | Log reduction | −0.2 | 0.4 | 1.9 | 6.4 | 7.2 |
| | | Effect fraction | −0.03 | 0.06 | 0.26 | 0.89 | 1.00 |
| | Tetralinol | Dose (% w/v) | 0.050 | 0.075 | 0.100 | 0.125 | 0.150 |
| | | Log reduction | 0.0 | 1.2 | 5.0 | 7.3 | 7.1 |
| | | Effect fraction | 0.00 | 0.17 | 0.67 | 0.97 | 0.95 |

TABLE 8

Dose response of A4 mixture and compositions against *S. haemolyticus* 114126

| Code | Sample Name | BCT_120 s_*S. haemolyticus* 114126 in 25% EtOH | | | | | |
|---|---|---|---|---|---|---|---|
| | A4 (Heliopropanal: | Dose (% w/v) | 0.05 | 0.1 | 0.125 | 0.15 | 0.175 |
| | Nerol: | Log reduction | 0.2 | 1.7 | 3.1 | 5.1 | 7.4 |
| | Phenylhexanol: | Effect fraction | 0.03 | 0.23 | 0.42 | 0.68 | 1.00 |
| | Tetralinol = 6:3:5:6) | | | | | | |
| | Heliopropanal | Dose (% w/v) | 0.175 | 0.25% | 0.30% | 0.40% | 0.45% |
| | | Log reduction | 0.1 | 0.3 | 1.5 | 3.2 | 5.2 |
| | | Effect fraction | 0.01 | 0.05 | 0.20 | 0.43 | 0.70 |
| | Nerol | Dose (% w/v) | 0.05% | 0.10% | 0.125% | 0.15% | 0.175% |
| | | Log reduction | 0.1 | 1.4 | 4.0 | 6.2 | 7.4 |
| | | Effect fraction | 0.01 | 0.18 | 0.53 | 0.83 | 1.00 |
| | phenylhexanol | Dose (% w/v) | 0.05% | 0.10% | 0.125% | 0.15% | 0.175% |
| | | Log reduction | 0.0 | 1.2 | 3.9 | 6.1 | 6.9 |
| | | Effect fraction | 0.00 | 0.17 | 0.53 | 0.84 | 0.95 |
| | Tetralinol | Dose (% w/v) | 0.050% | 0.075% | 0.100% | 0.125% | 0.150% |
| | | Log reduction | 0.1 | 2.1 | 5.1 | 6.9 | 6.9 |
| | | Effect fraction | 0.01 | 0.29 | 0.70 | 0.95 | 0.95 |

TABLE 9

Dose response of A3 mixture and compositions against *S. haemolyticus* 114126

| Code | Sample Name | BCT_120 s_*S. haemolyticus* 114126 in 25% EtOH | | | | | |
|---|---|---|---|---|---|---|---|
| | S2 mixture | Dose (% w/v) | 0.15 | 0.18 | 0.24 | 0.27 | 0.3 |
| | (Phenylhexanol: | Log reduction | 0.7 | 3.0 | 5.4 | 7.4 | 7.4 |
| | Terpineol: | Effect fraction | 0.10 | 0.41 | 0.72 | 1.00 | 1.00 |
| | Isoeugenol = 2:5:5) | | | | | | |
| | Phenylhexanol | Dose (% w/v) | 0.05% | 0.10% | 0.125% | 0.15% | 0.200% |
| | | Log reduction | −0.1 | 0.9 | 3.9 | 6.7 | 7.3 |
| | | Effect fraction | 0.00 | 0.17 | 0.53 | 0.84 | 0.95 |
| | Terpineol Ord | Dose (% w/v) | 0.100% | 0.200% | 0.250% | 0.300% | 0.400% |
| | | Log reduction | −0.1 | 1.9 | 5.8 | 7.4 | 7.4 |
| | | Effect fraction | −0.02 | 0.26 | 0.78 | 1.00 | 1.00 |
| | Isoeugenol | Dose (% w/v) | 0.20% | 0.25% | 0.30% | 0.35% | 0.40% |
| | | Log reduction | 0.4 | 2.2 | 3.7 | 4.0 | 7.3 |
| | | Effect fraction | 0.05 | 0.30 | 0.50 | 0.53 | 0.97 |

TABLE 10

Dose response of S12 mixture and compositions against *S. haemolyticus* 114126

| Code | Sample Name | | BCT_120 s_*S. haemolyticus* 114126 in 25% EtOH | | | | |
|---|---|---|---|---|---|---|---|
| | S12 mixture | Dose (% w/v) | 0.09 | 0.135 | 0.180 | 0.225 | 0.270 |
| | (Phenylhexanol: | Log reduction | 0.2 | 1.1 | 4.4 | 7.5 | 7.5 |
| | Terpineol: | Effect fraction | 0.02 | 0.15 | 0.59 | 1.00 | 1.00 |
| | Isoeugenol: | | | | | | |
| | Coumarine = | | | | | | |
| | 5:1:1:2) | | | | | | |
| | Phenylhexanol | Dose (% w/v) | 0.05% | 0.10% | 0.125% | 0.15% | 0.200% |
| | | Log reduction | −0.1 | 0.9 | 3.9 | 6.7 | 7.3 |
| | | Effect fraction | 0.00 | 0.17 | 0.53 | 0.84 | 0.95 |
| | Terpineol Ord | Dose (% w/v) | 0.100% | 0.200% | 0.250% | 0.300% | 0.400% |
| | | Log reduction | −0.1 | 1.9 | 5.8 | 7.4 | 7.4 |
| | | Effect fraction | −0.02 | 0.26 | 0.78 | 1.00 | 1.00 |
| | Isoeugenol | Dose (% w/v) | 0.20% | 0.25% | 0.30% | 0.35% | 0.40% |
| | | Log reduction | 0.4 | 2.2 | 3.7 | 4.0 | 7.3 |
| | | Effect fraction | 0.05 | 0.30 | 0.50 | 0.53 | 0.97 |
| | Coumarine | Dose (% w/v) | 0.50% | 0.75% | 1.00% | 1.25% | 1.50% |
| | | Log reduction | 0.0 | 0.7 | 1.7 | 6.3 | 7.5 |
| | | Effect fraction | 0.00 | 0.09 | 0.23 | 0.84 | 1.00 |

TABLE 11

Dose response of S5 mixture and compositions against *S. haemolyticus* 114126

| Code | Sample Name | | BCT_120 s_*S. haemolyticus* 114126 in 25% EtOH | | | | |
|---|---|---|---|---|---|---|---|
| | S5 mixture (EugenolF: | Dose (% w/v) | 0.080 | 0.16 | 0.192 | 0.224 | 0.24 |
| | Phenylhexanol:Carbinol | Log reduction | 0.2 | 1.1 | 1.9 | 3.0 | 4.8 |
| | muguet = 1:5:10) | Effect fraction | 0.03 | 0.15 | 0.25 | 0.40 | 0.63 |
| | Eugenol F | Dose (% w/v) | 0.200 | 0.250 | 0.300 | 0.350 | |
| | | Log reduction | 0.30 | 2.37 | 4.90 | 7.60 | |
| | | Effect fraction | 0.04 | 0.31 | 0.64 | 1.00 | |
| | phenylhexanol | Dose (% w/v) | 0.100 | 0.125 | 0.150 | 0.175 | |
| | | Log reduction | 0.7 | 3.0 | 5.7 | 6.2 | |
| | | Effect fraction | 0.10 | 0.40 | 0.75 | 0.82 | |
| | Carbinol muguet | Dose (% w/v) | 0.100 | 0.200 | 0.300 | 0.400 | 0.500 |
| | | Log reduction | 0.1 | −0.1 | 0.9 | 5.3 | 7.4 |
| | | Effect fraction | 0.01 | −0.02 | 0.13 | 0.72 | 1.00 |

TABLE 12

Dose response of S15 mixture and compositions against *S. haemolyticus* 114126

| Code | Sample Name | | BCT_120 s_*S. haemolyticus* 114126 in 25% EtOH | | | | |
|---|---|---|---|---|---|---|---|
| | S15 mixture (EugenolF: | Dose (% w/v) | 0.13 | 0.195 | 0.156 | 0.325 | 0.39 |
| | phenylhexanol:Carbinol | Log reduction | 0.2 | 1.2 | 3.7 | 5.8 | 7.4 |
| | muguet:Benzyl acetate = | Effect fraction | 0.03 | 0.17 | 0.50 | 0.78 | 1.00 |
| | 1:5:10:10) | | | | | | |
| | Eugenol F | Dose (% w/v) | 0.200 | 0.250 | 0.300 | 0.350 | |
| | | Log reduction | 0.30 | 2.37 | 4.90 | 7.60 | |
| | | Effect fraction | 0.04 | 0.31 | 0.64 | 1.00 | |
| | phenylhexanol | Dose (% w/v) | 0.100 | 0.125 | 0.150 | 0.175 | |
| | | Log reduction | 0.7 | 3.0 | 5.7 | 6.2 | |
| | | Effect fraction | 0.10 | 0.40 | 0.75 | 0.82 | |
| | Carbinol muguet | Dose (% w/v) | 0.100 | 0.200 | 0.300 | 0.400 | 0.500 |
| | | Log reduction | 0.1 | −0.1 | 0.9 | 5.3 | 7.4 |
| | | Effect fraction | 0.01 | −0.02 | 0.13 | 0.72 | 1.00 |
| | Benzyl acetate | Dose (% w/v) | 0.250 | 0.300 | 0.350 | 0.400 | 0.500 |
| | | Log reduction | 0.2 | 0.5 | 1.3 | 2.5 | 6.2 |
| | | Effect fraction | 0.03 | 0.06 | 0.18 | 0.34 | 0.84 |

TABLE 13

Dose response of S4 mixture and compositions against *S. haemolyticus* 114126

| Code | Sample Name | | BCT_120 s_*S. haemolyticus* 114126 in 25% EtOH | | | | |
|---|---|---|---|---|---|---|---|
| | S4 mixture (Geraniol: | Dose (% w/v) | 0.1375 | 0.275 | 0.33 | 0.385 | 0.44 |
| | EugenolF:Cinnamic | Log reduction | 0.2 | 1.8 | 4.1 | 7.1 | 7.5 |
| | alcohol = 2:5:15) | Effect fraction | 0.02 | 0.24 | 0.55 | 0.95 | 1.00 |
| | Geraniol Pur | Dose (% w/v) | 0.050 | 0.100 | 0.125 | 0.150 | |
| | | Log reduction | −0.2 | 2.7 | 5.3 | 7.1 | |
| | | Effect fraction | −0.03 | 0.36 | 0.72 | 0.95 | |
| | Eugenol F | Dose (% w/v) | 0.20 | 0.25 | 0.30 | 0.350 | |
| | | Log reduction | 0.6 | 3.3 | 7.1 | 7.5 | |
| | | Effect fraction | 0.08 | 0.45 | 0.95 | 1.00 | |
| | Cinnamic alcohol | Dose (% w/v) | 0.5 | 1 | 1.25 | 1.5 | |
| | | Log reduction | 4.1 | 7.3 | 7.3 | 7.3 | |
| | | Effect fraction | 0.56 | 1.00 | 1.00 | 1.00 | |

TABLE 14

Dose response of S14 mixture and compositions against *S. haemolyticus* 114126

| Code | Sample Name | | BCT_120 s_*S. haemolyticus* 114126 in 25% EtOH | | | | |
|---|---|---|---|---|---|---|---|
| | S14 mixture (Geraniol: | Dose (% w/v) | 0.105 | 0.126 | 0.137 | 0.147 | 0.158 |
| | EugenolF:Cinnamic | Log reduction | 0.3 | 0.8 | 1.3 | 2.0 | 4.5 |
| | alcohol:Calone = | Effect fraction | 0.04 | 0.11 | 0.18 | 0.28 | 0.61 |
| | 10:5:5:1) | | | | | | |
| | Geraniol Pur | Dose (% w/v) | 0.050 | 0.100 | 0.125 | 0.150 | |
| | | Log reduction | −0.2 | 2.7 | 5.3 | 7.1 | |
| | | Effect fraction | −0.03 | 0.36 | 0.72 | 0.95 | |
| | Eugenol F | Dose (% w/v) | 0.20 | 0.25 | 0.30 | 0.350 | |
| | | Log reduction | 0.6 | 3.3 | 7.1 | 7.5 | |
| | | Effect fraction | 0.08 | 0.45 | 0.95 | 1.00 | |
| | Cinnamic alcohol | Dose (% w/v) | 0.25 | 0.5 | 1 | 1.25 | 1.5 |
| | | Log reduction | 0.2 | 4.1 | 7.3 | 7.3 | 7.3 |
| | | Effect fraction | 0.02 | 0.56 | 1.00 | 1.00 | 1.00 |
| | Calone | Dose (% w/v) | 0.500 | 0.700 | 0.800 | 0.900 | 1.200 |
| | | Log reduction | 0.0 | 0.5 | 2.9 | 4.7 | 6.9 |
| | | Effect fraction | 0.00 | 0.07 | 0.40 | 0.65 | 0.95 |

TABLE 15

Dose response of A3 mixture and compositions against *E. coli* ATCC 10536

| Code | Sample Name | | BCT_45 s._*E. coli* ATCC10536 in 20% EtOH | | | | |
|---|---|---|---|---|---|---|---|
| | Decal:Isoeugenol: | Dose (% w/v) | 0.050 | 0.055 | 0.060 | 0.065 | 0.075 |
| | Perycorolle: | Log reduction | 0.8 | 1.7 | 3.6 | 4.9 | 7.3 |
| | Tetralinol = 2:1:5:1 | Effect fraction | 0.11 | 0.23 | 0.49 | 0.67 | 1.00 |
| | Decal | Dose (% w/v) | 0.050 | 0.060 | 0.070 | 0.080 | 0.090 |
| | | Log reduction | 0.0 | 0.9 | 2.8 | 6.1 | 7.3 |
| | | Effect fraction | 0.00 | 0.13 | 0.38 | 0.84 | 1.00 |
| | Isoeugenol | Dose (% w/v) | 0.050 | 0.070 | 0.090 | 0.100 | 0.120 |
| | | Log reduction | 0.1 | 0.8 | 2.9 | 4.9 | 7.4 |
| | | Effect fraction | 0.01 | 0.11 | 0.39 | 0.66 | 1.00 |
| | Perycorolle | Dose (% w/v) | 0.050 | 0.070 | 0.080 | 0.090 | 0.100 |
| | | Log reduction | 0.0 | 1.2 | 3.7 | 6.0 | 7.4 |
| | | Effect fraction | 0.00 | 0.16 | 0.49 | 0.81 | 1.00 |
| | Tetralinol | Dose (% w/v) | 0.020 | 0.025 | 0.030 | 0.035 | 0.040 |
| | | Log reduction | 0.0 | 0.7 | 2.0 | 5.9 | 7.0 |
| | | Effect fraction | 0.00 | 0.09 | 0.28 | 0.81 | 1.00 |

TABLE 16

Dose response of A4 mixture and compositions against *E. coli* ATCC 10536

| Code | Sample Name | | BCT_45 s_*E. coli* ATCC10536 in 20% EtOH | | | | |
|---|---|---|---|---|---|---|---|
| | Heliopropanal: | Dose (% w/v) | 0.035 | 0.040 | 0.045 | 0.050 | 0.060 |
| | Nerol: | Log reduction | 0.3 | 0.8 | 2.5 | 3.8 | 7.4 |
| | Phenylhexanol: | Effect fraction | 0.04 | 0.10 | 0.34 | 0.51 | 1.00 |
| | Tetralinol = 6:3:5:5 | | | | | | |
| | Heliopropanal | Dose (% w/v) | 0.100 | 0.120 | 0.140 | 0.160 | 0.180 |
| | | Log reduction | 0.5 | 1.1 | 3.1 | 7.0 | 7.4 |
| | | Effect fraction | 0.06 | 0.15 | 0.43 | 0.95 | 1.00 |
| | Nerol | Dose (% w/v) | 0.050 | 0.060 | 0.070 | 0.080 | 0.090 |
| | | Log reduction | 0.1 | 3.2 | 7.0 | 7.4 | 7.4 |
| | | Effect fraction | 0.02 | 0.44 | 0.95 | 1.00 | 1.00 |
| | phenylhexanol | Dose (% w/v) | 0.020 | 0.030 | 0.035 | 0.040 | 0.050 |
| | | Log reduction | 0.0 | 0.0 | 1.1 | 2.4 | 7.2 |
| | | Effect fraction | −0.02 | 0.01 | 0.15 | 0.32 | 0.97 |
| | Tetralinol | Dose (% w/v) | 0.020 | 0.025 | 0.030 | 0.035 | |
| | | Log reduction | 0.2 | 0.8 | 1.7 | 5.0 | |
| | | Effect fraction | 0.03 | 0.11 | 0.23 | 0.67 | |

TABLE 17

Dose response of A9 mixture and compositions against *E. coli* ATCC 10536

| Code | Sample Name | | BCT_45 s_*E. coli* ATCC10536 in 20% EtOH | | | | |
|---|---|---|---|---|---|---|---|
| | A9 mixture (PEA:Geraniol | Dose (% w/v) | 0.100 | 0.125 | 0.150 | 0.175 | 0.200 |
| | Pur:Styrallyl Acetate: | Log reduction | 0.0 | 0.7 | 5.2 | 7.0 | 7.2 |
| | Eugenol F = 10:5:3:2) | Effect fraction | 0.01 | 0.10 | 0.72 | 0.97 | 1.00 |
| | PEA | Dose (% w/v) | 0.650 | 0.700 | 0.750 | 0.800 | 0.850 |
| | | Log reduction | 0.0 | 0.1 | 0.8 | 1.2 | 4.3 |
| | | Effect fraction | 0.00 | 0.01 | 0.11 | 0.16 | 0.60 |
| | Geraniol Pur | Dose (% w/v) | 0.040 | 0.050 | 0.060 | 0.070 | 0.080 |
| | | Log reduction | 0.4 | 1.9 | 6.4 | 7.4 | 7.4 |
| | | Effect fraction | 0.05 | 0.26 | 0.86 | 1.00 | 1.00 |
| | 1-phenylethyl acetate | Dose (% w/v) | 0.12 | 0.14 | 0.16 | 0.18 | 0.2 |
| | "Styrallyl Acetate" | Log reduction | 0.3 | 0.7 | 2.7 | 6.4 | 7.4 |
| | | Effect fraction | 0.03 | 0.09 | 0.37 | 0.86 | 1.00 |
| | Eugenol F | Dose (% w/v) | 0.075 | 0.09 | 0.1 | 0.125 | 0.15 |
| | | Log reduction | 0 | 0.3 | 0.9 | 2.5 | 7.4 |
| | | Effect fraction | 0.00 | 0.03 | 0.12 | 0.34 | 1.00 |

TABLE 18

Dose response of A10 mixture and compositions against *E. coli* ATCC 10536

| Code | Sample Name | | BCT_45 s_*E. coli* ATCC10536 in 20% EtOH | | | | |
|---|---|---|---|---|---|---|---|
| | A10 mixture (Coumarine: | Dose (% w/v) | 0.300 | 0.325 | 0.350 | 0.400 | 0.450 |
| | Heliotropin:Ethyl | Log reduction | 0.9 | 5.3 | 7.1 | 7.1 | 7.3 |
| | Cinnamate:Cinnamic | Effect fraction | 0.13 | 0.73 | 0.97 | 0.97 | 1.00 |
| | alcohol:Benzyl alcohol = | | | | | | |
| | 2:4:1:6:7) | | | | | | |
| | Coumarine | Dose (% w/v) | 0.500 | 0.600 | 0.650 | 0.700 | 0.800 |
| | | Log reduction | −0.1 | 0.2 | 0.5 | 2.8 | 7.3 |
| | | Effect fraction | 0.00 | 0.03 | 0.07 | 0.38 | 1.00 |
| | Heliotropin | Dose (% w/v) | 0.450 | 0.500 | 0.550 | 0.600 | |
| | | Log reduction | 0.1 | 2.4 | 5.3 | 7.3 | |
| | | Effect fraction | 0.01 | 0.33 | 0.73 | 1.00 | |
| | ETHYL (E)-3-PRENYL- | Dose (% w/v) | 0.025 | 0.030 | 0.035 | 0.040 | 0.045 |
| | 2-PROPENOATE "Ethyl | Log reduction | −0.2 | 1.0 | 3.7 | 5.4 | 7.3 |
| | Cinnamate" | Effect fraction | 0.00 | 0.13 | 0.50 | 0.74 | 1.00 |
| | (2E)-3-phenyl-2-propen-1- | Dose (% w/v) | 0.200 | 0.250 | 0.300 | 0.350 | 0.400 |
| | ol "Cinnamic alcohol" | Log reduction | 0.1 | 0.6 | 1.4 | 4.2 | 7.3 |
| | | Effect fraction | 0.01 | 0.08 | 0.19 | 0.58 | 1.00 |
| | Benzyl alcohol | Dose (% w/v) | 1.000 | 1.200 | 1.300 | 1.400 | 1.600 |
| | | Log reduction | 0.2 | 2.0 | 4.3 | 5.9 | 7.3 |
| | | Effect fraction | 0.03 | 0.28 | 0.59 | 0.81 | 1.00 |

TABLE 19

Dose response of E1 mixture and compositions against *E. coli* ATCC 10536

| Code | Sample Name | | BCT_45 s_*E. coli* ATCC10536 in 20% EtOH | | | | |
|---|---|---|---|---|---|---|---|
| | E1 mixture (Decal: | Dose (% w/v) | 0.028 | 0.042 | 0.049 | 0.056 | 0.070 |
| | Geraniol:Tetralinol = | Log reduction | 0.1 | 0.7 | 2.7 | 5.8 | 7.4 |
| | 6:5:3) | Effect fraction | 0.01 | 0.09 | 0.37 | 0.78 | 1.00 |
| | Decal | Dose (% w/v) | 0.05 | 0.06 | 0.070 | 0.080 | |
| | | Log reduction | 0.1 | 0.7 | 2.4 | 6.4 | |
| | | Effect fraction | 0.01 | 0.10 | 0.33 | 0.86 | |
| | Geraniol Pur | Dose (% w/v) | 0.04 | 0.050 | 0.060 | 0.070 | 0.080 |
| | | Log reduction | 0.2 | 1.4 | 6.2 | 7.6 | 7.6 |
| | | Effect fraction | 0.02 | 0.18 | 0.82 | 1.00 | 1.00 |
| | Tetralinol | Dose (% w/v) | 0.02 | 0.025 | 0.030 | 0.035 | 0.040 |
| | | Log reduction | 0.1 | 0.6 | 1.4 | 5.0 | NT |
| | | Effect fraction | 0.01 | 0.08 | 0.19 | 0.68 | NT |

TABLE 20

Dose response of E2 mixture and compositions against *E. coli* ATCC 10536

| Code | Sample Name | | BCT_45 s_*E. coli* ATCC10536 in 20% EtOH | | | | |
|---|---|---|---|---|---|---|---|
| | E2 mixture (Decal: | Dose (% w/v) | 0.076 | 0.095 | 0.114 | 0.133 | 0.152 |
| | Geraniol: | Log reduction | 0 | 1.2 | 3.2 | 7.6 | 7.6 |
| | Tetralinol: | Effect fraction | 0.00 | 0.16 | 0.42 | 1.00 | 1.00 |
| | Cinnamic alcohol = | | | | | | |
| | 6:5:3:24) | | | | | | |
| | Decal | Dose (% w/v) | 0.05 | 0.06 | 0.070 | 0.080 | |
| | | Log reduction | 0.1 | 0.7 | 2.4 | 6.4 | |
| | | Effect fraction | 0.01 | 0.10 | 0.33 | 0.86 | |
| | Geraniol Pur | Dose (% w/v) | 0.04 | 0.050 | 0.060 | 0.070 | 0.080 |
| | | Log reduction | 0.2 | 1.4 | 6.2 | 7.6 | 7.6 |
| | | Effect fraction | 0.02 | 0.18 | 0.82 | 1.00 | 1.00 |
| | Tetralinol | Dose (% w/v) | 0.02 | 0.025 | 0.030 | 0.035 | 0.040 |
| | | Log reduction | 0.1 | 0.6 | 1.4 | 5.0 | |
| | | Effect fraction | 0.01 | 0.08 | 0.19 | 0.68 | |
| | Cinnamic Alcohol | Dose (% w/v) | 0.2 | 0.25 | 0.300 | 0.350 | 0.400 |
| | Ord | Log reduction | 0 | 0.2 | 1.3 | 4.0 | 7.6 |
| | | Effect fraction | 0.00 | 0.02 | 0.17 | 0.52 | 1.00 |

TABLE 21

Dose response of E3 mixture and compositions against *E. coli* ATCC 10536

| Code | Sample Name | | BCT_45 s_*E. coli* ATCC10536 in 20% EtOH | | | | |
|---|---|---|---|---|---|---|---|
| | E3 mixture (Decal: | Dose (% w/v) | 0.165 | 0.193 | 0.220 | 0.248 | 0.275 |
| | Aldehyde Anisic: | Log reduction | 0.0 | 0.8 | 1.7 | 5.4 | 7.3 |
| | Nerol = 1:9:1) | Effect fraction | 0.00 | 0.11 | 0.23 | 0.75 | 1.00 |
| | Decal | Dose (% w/v) | 0.050 | 0.060 | 0.070 | 0.080 | |
| | | Log reduction | 0.1 | 0.7 | 1.8 | 5.2 | |
| | | Effect fraction | 0.01 | 0.10 | 0.24 | 0.72 | |
| | Aldehyde Anisic | Dose (% w/v) | 0.400 | 0.450 | 0.500 | 0.550 | 0.600 |
| | | Log reduction | 0.3 | 0.6 | 2.7 | 6.7 | 7.3 |
| | | Effect fraction | 0.04 | 0.09 | 0.37 | 0.92 | 1.00 |
| | Nerol | Dose (% w/v) | 0.050 | 0.060 | 0.070 | 0.080 | 0.090 |
| | | Log reduction | 1.1 | 3.2 | 6.7 | 7.3 | 7.3 |
| | | Effect fraction | 0.15 | 0.44 | 0.92 | 1.00 | 1.00 |

TABLE 22

Dose response of E4 mixture and compositions against *E. coli* ATCC 10536

| Code | Sample Name | | BCT_45 s_*E. coli* ATCC10536 in 20% EtOH | | | | |
|---|---|---|---|---|---|---|---|
| | E4 mixture (Decal: Aldehyde Anisic: Nerol: Heliopropanal = 1:9:1:2.5) | Dose (% w/v) | 0.135 | 0.1687 | 0.2025 | 0.2193 | 0.2362 |
| | | Log reduction | 0 | 1 | 4.3 | 7.1 | 7.3 |
| | | Effect fraction | 0.00 | 0.14 | 0.59 | 0.97 | 1.00 |
| | Decal | Dose (% w/v) | 0.050 | 0.060 | 0.070 | 0.080 | |
| | | Log reduction | 0.1 | 0.7 | 1.8 | 5.2 | |
| | | Effect fraction | 0.01 | 0.1 | 0.24 | 0.72 | |
| | Aldehyde Anisic | Dose (% w/v) | 0.400 | 0.450 | 0.500 | 0.550 | 0.600 |
| | | Log reduction | 0.3 | 0.6 | 2.7 | 6.7 | 7.3 |
| | | Effect fraction | 0.04 | 0.09 | 0.37 | 0.92 | 1.00 |
| | Nerol | Dose (% w/v) | 0.050 | 0.060 | 0.070 | 0.080 | 0.090 |
| | | Log reduction | 1.1 | 3.2 | 6.7 | 7.3 | 7.3 |
| | | Effect fraction | 0.15 | 0.44 | 0.92 | 1.00 | 1.00 |
| | Heliopropanal | Dose (% w/v) | 0.100 | 0.120 | 0.140 | 0.160 | 0.180 |
| | | Log reduction | 1 | 2.1 | 4.3 | 7.3 | 7.3 |
| | | Effect fraction | 0.14 | 0.28 | 0.59 | 1.00 | 1.00 |

TABLE 23

Dose response of E5 mixture and compositions against *E. coli* ATCC 10536

| Code | Sample Name | | BCT_45 s_*E. coli* ATCC10536 in 20% EtOH | | | | |
|---|---|---|---|---|---|---|---|
| | E5 mixture (Decal: Heliotropin: Terpineol = 10:90:25) | Dose (% w/v) | 0.125 | 0.1875 | 0.25 | 0.281 | 0.3125 |
| | | Log reduction | 0.0 | 0.1 | 2.3 | 4.7 | 7.1 |
| | | Effect fraction | −0.02 | 0.01 | 0.31 | 0.63 | 0.95 |
| | Decal | Dose (% w/v) | 0.060 | 0.070 | 0.080 | 0.090 | |
| | | Log reduction | 0.4 | 2.1 | 5.0 | 7.1 | |
| | | Effect fraction | 0.06 | 0.28 | 0.67 | 0.95 | |
| | Heliotropin | Dose (% w/v) | 0.450 | 0.500 | 0.550 | 0.600 | |
| | | Log reduction | 0.1 | 0.9 | 5.3 | 7.4 | |
| | | Effect fraction | 0.01 | 0.13 | 0.72 | 1.00 | |
| | Terpineol | Dose (% w/v) | 0.100 | 0.110 | 0.125 | 0.150 | 0.200 |
| | | Log reduction | 0.1 | 0.3 | 1.3 | 3.8 | 7.4 |
| | | Effect fraction | 0.01 | 0.04 | 0.18 | 0.51 | 1.00 |

TABLE 24

Dose response of E6 mixture and compositions against *E. coli* ATCC 10536

| Code | Sample Name | | BCT_45 s_*E. coli* ATCC10536 in 20% EtOH | | | | |
|---|---|---|---|---|---|---|---|
| | E6 mixture (Decal: Heliotropin: Terpineol:Ethyl cinnamate = 10:90:25:6) | Dose (% w/v) | 0.131 | 0.1637 | 0.1965 | 0.2292 | 0.262 |
| | | Log reduction | 0.2 | 0.5 | 2.5 | 6.5 | 7.5 |
| | | Effect fraction | 0.02 | 0.07 | 0.33 | 0.87 | 1.00 |
| | Decal | Dose (% w/v) | 0.060 | 0.070 | 0.080 | 0.090 | |
| | | Log reduction | 0.4 | 2.1 | 5.0 | 7.1 | |
| | | Effect fraction | 0.06 | 0.28 | 0.67 | 0.95 | |
| | Heliotropin | Dose (% w/v) | 0.450 | 0.500 | 0.550 | 0.600 | |
| | | Log reduction | 0.1 | 0.9 | 5.3 | 7.4 | |
| | | Effect fraction | 0.01 | 0.13 | 0.72 | 1.00 | |
| | Terpineol | Dose (% w/v) | 0.100 | 0.110 | 0.125 | 0.150 | 0.200 |
| | | Log reduction | 0.1 | 0.3 | 1.3 | 3.8 | 7.4 |
| | | Effect fraction | 0.01 | 0.04 | 0.18 | 0.51 | 1.00 |
| | Ethyl Cinnamate | Dose (% w/v) | 0.025 | 0.030 | 0.035 | 0.040 | 0.045 |
| | | Log reduction | 0 | 1.1 | 3.7 | 6.4 | 7.2 |
| | | Effect fraction | −0.02 | 0.14 | 0.51 | 0.86 | 0.97 |

TABLE 25

Dose response of A3 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | A3 mixture (Decal: | Dose (% w/v) | 0.05 | 0.0625 | 0.075 | 0.0875 | 0.100 |
| | isoeugenol:Perycorolle: | Log reduction | 1.4 | 2.3 | 3.6 | 5.4 | 7.0 |
| | Tetralinol = 2:1:5:2) | Effect fraction | 0.18 | 0.30 | 0.47 | 0.72 | 0.92 |
| | Decal | Dose (% w/v) | 0.080 | 0.100 | 0.120 | 0.160 | 0.200 |
| | | Log reduction | 2.4 | 5.0 | 6.6 | 7.2 | 7.0 |
| | | Effect fraction | 0.32 | 0.66 | 0.88 | 0.95 | 0.93 |
| | Isoeugenol | Dose (% w/v) | 0.050 | 0.100 | 0.125 | 0.150 | 0.200 |
| | | Log reduction | −0.4 | 1.1 | 3.7 | 5.6 | 7.5 |
| | | Effect fraction | −0.05 | 0.15 | 0.49 | 0.75 | 0.99 |
| | Perycorolle | Dose (% w/v) | 0.050 | 0.075 | 0.100 | 0.125 | 0.150 |
| | | Log reduction | 0.2 | 1.6 | 5.1 | 7.3 | 7.3 |
| | | Effect fraction | 0.02 | 0.20 | 0.65 | 0.92 | 0.93 |
| | Tetralinol | Dose (% w/v) | 0.025 | 0.0375 | 0.050 | 0.075 | 0.100 |
| | | Log reduction | 0.5 | 1.3 | 5.5 | 7.3 | 7.5 |
| | | Effect fraction | 0.07 | 0.17 | 0.69 | 0.93 | 0.94 |

TABLE 26

Dose response of A4 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | A4 mixture | Dose (% w/v) | 0.05 | 0.06 | 0.07 | 0.08 | 0.10 |
| | (Heliopropanal:Nerol: | Log reduction | 0.7 | 1.6 | 4.3 | 6.3 | 7.0 |
| | Phenylhexanol: | Effect fraction | 0.09 | 0.21 | 0.56 | 0.83 | 0.92 |
| | Tetralinol = 6:3:5:6) | | | | | | | |
| | Heliopropanal | Dose (% w/v) | 0.150 | 0.200 | 0.225 | 0.250 | 0.300 |
| | | Log reduction | 0.4 | 1.2 | 4.2 | 7.0 | 7.3 |
| | | Effect fraction | 0.05 | 0.16 | 0.56 | 0.92 | 0.96 |
| | Nerol | Dose (% w/v) | 0.0625 | 0.075 | 0.100 | 0.125 | 0.150 |
| | | Log reduction | 1.3 | 3.2 | 7.0 | 7.3 | 7.5 |
| | | Effect fraction | 0.17 | 0.42 | 0.92 | 0.96 | 0.99 |
| | Phenylhexanol | Dose (% w/v) | 0.050 | 0.060 | 0.070 | 0.080 | 0.090 |
| | | Log reduction | 1.0 | 3.3 | 6.7 | 7.0 | 7.5 |
| | | Effect fraction | 0.12 | 0.43 | 0.86 | 0.90 | 0.96 |
| | Tetralinol | Dose (% w/v) | 0.025 | 0.0375 | 0.050 | 0.075 | 0.100 |
| | | Log reduction | 0.0 | 1.7 | 5.2 | 7.5 | 7.0 |
| | | Effect fraction | 0.00 | 0.22 | 0.67 | 0.96 | 0.90 |

TABLE 27

Dose response of S1 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S1 mixture (Aldehyde | Dose (% w/v) | 0.18 | 0.27 | 0.36 | 0.45 | 0.54 |
| | anisic:Heliotropin: | Log reduction | 0.0 | 0.2 | 2.0 | 3.0 | 6.9 |
| | Terpineol = 13:20:3) | Effect fraction | 0.00 | 0.03 | 0.27 | 0.41 | 0.94 |
| | Aldehyde Anisic | Dose (% w/v) | 0.500 | 0.600 | 0.650 | 0.700 | 0.800 |
| | | Log reduction | 0.7 | 2.3 | 3.5 | 5.9 | 6.9 |
| | | Effect fraction | 0.09 | 0.32 | 0.48 | 0.81 | 0.94 |
| | Heliotropin | Dose (% w/v) | 0.50 | 0.60 | 0.7 | 0.75 | 1.00 |
| | | Log reduction | 0.7 | 2.7 | 6.1 | 7.1 | 7.1 |
| | | Effect fraction | 0.10 | 0.37 | 0.83 | 0.97 | 0.97 |
| | Terpineol Ord | Dose (% w/v) | 0.125 | 0.15 | 0.175 | 0.2 | |
| | | Log reduction | 0.8 | 2.8 | 4.8 | 6.2 | |
| | | Effect fraction | 0.11 | 0.40 | 0.66 | 0.86 | |

TABLE 28

Dose response of S11 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S11 mixture (Aldehyde anisic:Heliotropin:Terpineol:Heliopropanal = 13:20:3:20) | Dose (% w/v) | 0.14 | 0.28 | 0.35 | 0.42 | 0.56 |
| | | Log reduction | 0.2 | 1.9 | 5.2 | 7.2 | 7.2 |
| | | Effect fraction | 0.03 | 0.27 | 0.73 | 1.00 | 1.00 |
| | Aldehyde Anisic | Dose (% w/v) | 0.500 | 0.600 | 0.650 | 0.700 | 0.800 |
| | | Log reduction | 0.7 | 2.3 | 3.5 | 5.9 | 6.9 |
| | | Effect fraction | 0.09 | 0.32 | 0.48 | 0.81 | 0.94 |
| | Heliotropin | Dose (% w/v) | 0.50 | 0.60 | 0.7 | 0.75 | 1.00 |
| | | Log reduction | 0.7 | 2.7 | 6.1 | 7.1 | 7.1 |
| | | Effect fraction | 0.10 | 0.37 | 0.83 | 0.97 | 0.97 |
| | Terpineol Ord | Dose (% w/v) | 0.125 | 0.15 | 0.175 | 0.2 | |
| | | Log reduction | 0.8 | 2.8 | 4.8 | 6.2 | |
| | | Effect fraction | 0.11 | 0.40 | 0.66 | 0.86 | |
| | Heliopropanal | Dose (% w/v) | 0.150 | 0.200 | 0.225 | 0.250 | |
| | | Log reduction | 0.4 | 1.8 | 3.6 | 7.2 | |
| | | Effect fraction | 0.05 | 0.24 | 0.50 | 1.00 | |

TABLE 29

Dose response of S12 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S12 mixture (Phenylhexanol:Terpineol:Isoeugenol:Coumarine = 5:1:1:2) | Dose (% w/v) | 0.045 | 0.090 | 0.135 | 0.180 | |
| | | Log reduction | 0.3 | 2.8 | 7.2 | 7.0 | |
| | | Effect fraction | 0.04 | 0.40 | 1.00 | 1.00 | |
| | Phenylhexanol | Dose (% w/v) | 0.050 | 0.060 | 0.070 | 0.080 | 0.090 |
| | | Log reduction | 0.6 | 2.1 | 4.6 | 7.1 | 7.3 |
| | | Effect fraction | 0.08 | 0.29 | 0.64 | 0.97 | 1.00 |
| | Terpineol Ord | Dose (% w/v) | 0.125 | 0.150 | 0.175 | 0.200 | 0.250 |
| | | Log reduction | 0.8 | 3.3 | 5.7 | 6.7 | 7.3 |
| | | Effect fraction | 0.11 | 0.45 | 0.78 | 0.92 | 1.00 |
| | Isoeugenol | Dose (% w/v) | 0.050 | 0.100 | 0.125 | 0.150 | 0.200 |
| | | Log reduction | 0.5 | 0.7 | 2.7 | 5.0 | 7.2 |
| | | Effect fraction | 0.06 | 0.09 | 0.38 | 0.69 | 1.00 |
| | Coumarine | Dose (% w/v) | 0.500 | 0.750 | 0.875 | 1.000 | 1.250 |
| | | Log reduction | −0.1 | 0.4 | 0.8 | 2.1 | 7.0 |
| | | Effect fraction | −0.02 | 0.05 | 0.11 | 0.29 | 0.97 |

TABLE 30

Dose response of S2 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S2 mixture (Phenylhexanol:Terpineol:Isoeugenol = 2:5:5) | Dose (% w/v) | 0.03 | 0.06 | 0.09 | 0.12 | 0.15 |
| | | Log reduction | 0.3 | 1.1 | 3.1 | 5.7 | 7.3 |
| | | Effect fraction | 0.04 | 0.16 | 0.42 | 0.78 | 1.00 |
| | Phenylhexanol | Dose (% w/v) | 0.050 | 0.060 | 0.070 | 0.080 | 0.090 |
| | | Log reduction | 0.6 | 2.1 | 4.6 | 7.1 | 7.3 |
| | | Effect fraction | 0.08 | 0.29 | 0.64 | 0.97 | 1.00 |
| | Terpineol Ord | Dose (% w/v) | 0.125 | 0.150 | 0.175 | 0.200 | 0.250 |
| | | Log reduction | 0.8 | 3.3 | 5.7 | 6.7 | 7.3 |
| | | Effect fraction | 0.11 | 0.45 | 0.78 | 0.92 | 1.00 |
| | Isoeugenol | Dose (% w/v) | 0.050 | 0.100 | 0.125 | 0.150 | 0.200 |
| | | Log reduction | 0.5 | 0.7 | 2.7 | 5.0 | 7.2 |
| | | Effect fraction | 0.06 | 0.09 | 0.38 | 0.69 | 1.00 |

TABLE 31

Dose response of S5 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S5 mixture (EugenolF: | Dose (% w/v) | 0.080 | 0.096 | 0.112 | 0.128 | 0.16 |
| | Phenylhexanol:Carbinol | Log reduction | 0.2 | 1.1 | 2.5 | 4.1 | 7.2 |
| | muguet = 1:5:10) | Effect fraction | 0.02 | 0.15 | 0.34 | 0.56 | 0.97 |
| | Eugenol F | Dose (% w/v) | 0.100 | 0.125 | 0.150 | 0.175 | |
| | | Log reduction | 0.7 | 1.5 | 2.2 | 4.6 | |
| | | Effect fraction | 0.09 | 0.20 | 0.30 | 0.63 | |
| | Phenylhexanol | Dose (% w/v) | 0.050 | 0.060 | 0.070 | 0.080 | |
| | | Log reduction | 0.7 | 1.7 | 4.5 | 6.4 | |
| | | Effect fraction | 0.10 | 0.23 | 0.61 | 0.86 | |
| | Carbinol muguet | Dose (% w/v) | 0.200 | 0.250 | 0.300 | 0.350 | 0.400 |
| | | Log reduction | 1.2 | 3.2 | 6.5 | 7.3 | 7.3 |
| | | Effect fraction | 0.16 | 0.44 | 0.89 | 1.00 | 1.00 |

TABLE 32

Dose response of S15 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S15 mixture (EugenolF: | Dose (% w/v) | 0.13 | 0.156 | 0.182 | 0.208 | 0.26 |
| | Phenylhexanol:Carbinol | Log reduction | 1.2 | 2.3 | 6.3 | 7.1 | 7.3 |
| | muguet:Benzyl acetate = | Effect fraction | 0.16 | 0.32 | 0.86 | 0.97 | 1.00 |
| | 1:5:10:10) | | | | | | |
| | Eugenol F | Dose (% w/v) | 0.100 | 0.125 | 0.150 | 0.175 | |
| | | Log reduction | 0.7 | 1.5 | 2.2 | 4.6 | |
| | | Effect fraction | 0.09 | 0.20 | 0.30 | 0.63 | |
| | Phenylhexanol | Dose (% w/v) | 0.050 | 0.060 | 0.070 | 0.080 | |
| | | Log reduction | 0.7 | 1.7 | 4.5 | 6.4 | |
| | | Effect fraction | 0.10 | 0.23 | 0.61 | 0.86 | |
| | Carbinol muguet | Dose (% w/v) | 0.200 | 0.250 | 0.300 | 0.350 | 0.400 |
| | | Log reduction | 1.2 | 3.2 | 6.5 | 7.3 | 7.3 |
| | | Effect fraction | 0.16 | 0.44 | 0.89 | 1.00 | 1.00 |
| | Benzyl acetate | Dose (% w/v) | 0.250 | 0.300 | 0.350 | 0.4 | 0.45 |
| | | Log reduction | 0.8 | 1.9 | 5.1 | 6.7 | 7.1 |
| | | Effect fraction | 0.11 | 0.26 | 0.70 | 0.92 | 0.97 |

TABLE 33

Dose response of S14 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S14 mixture (Geraniol: | Dose (% w/v) | 0.053 | 0.105 | 0.116 | 0.126 | 0.137 |
| | EugenolF: | Log reduction | 0.4 | 4.0 | 6.1 | 7.3 | 7.3 |
| | Cinnamic alcohol: | Effect fraction | 0.05 | 0.55 | 0.83 | 1.00 | 1.00 |
| | Calone = 10:5:5:1) | | | | | | |
| | Geraniol Pur | Dose (% w/v) | 0.050 | 0.060 | 0.070 | 0.080 | 0.100 |
| | | Log reduction | 0.2 | 0.4 | 1.5 | 4.0 | 7.3 |
| | | Effect fraction | 0.03 | 0.06 | 0.21 | 0.55 | 1.00 |
| | Eugenol F | Dose (% w/v) | 0.10 | 0.13 | 0.15 | 0.175 | 0.20 |
| | | Log reduction | 0.8 | 1.6 | 3.0 | 6.5 | 6.9 |
| | | Effect fraction | 0.12 | 0.23 | 0.44 | 0.94 | 1.00 |
| | Cinnamic alcohol | Dose (% w/v) | 0.3 | 0.35 | 0.4 | 0.45 | 0.5 |
| | | Log reduction | 1.8 | 2.6 | 5.5 | 6.9 | 6.9 |
| | | Effect fraction | 0.26 | 0.38 | 0.79 | 1.00 | 1.00 |
| | Calone | Dose (% w/v) | 0.600 | 0.700 | 0.800 | 0.900 | 1.000 |
| | | Log reduction | 1.6 | 2.5 | 6.9 | 6.9 | 6.9 |
| | | Effect fraction | 0.23 | 0.36 | 1.00 | 1.00 | 1.00 |

TABLE 34

Dose response of S6-G mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | S6-g mixture (Eugenol F: Aldehyde C11 Lique: Cinnamic aldehyde = 5:1:1) | Dose (% w/v) | 0.00875 | 0.0175 | 0.02625 | 0.035 | |
| | | Log reduction | 0.1 | 1.4 | 3.9 | 4.2 | |
| | | Effect fraction | 0.01 | 0.19 | 0.54 | 0.58 | |
| | Eugenol F | Dose (% w/v) | 0.10 | 0.125 | 0.150 | 0.175 | |
| | | Log reduction | 0.8 | 1.6 | 2.3 | 5.5 | |
| | | Effect fraction | 0.11 | 0.21 | 0.31 | 0.75 | |
| | undecanal "Aldehyde C11 Lique" | Dose (% w/v) | 0.0010 | 0.0025 | 0.0050 | 0.0100 | 0.0150 |
| | | Log reduction | 0.2 | 0.5 | 3.9 | 5.9 | 7.3 |
| | | Effect fraction | 0.03 | 0.07 | 0.54 | 0.81 | 1.00 |
| | Cinnamic aldehyde | Dose (% w/v) | 0.25 | 0.3 | 0.325 | 0.35 | 0.4 |
| | | Log reduction | 0.3 | 2.9 | 4.2 | 6.5 | 7.1 |
| | | Effect fraction | 0.05 | 0.40 | 0.59 | 0.92 | 1.00 |

TABLE 35

Dose response of A6 mixture and compositions against *S. aureus* ATCC 6538

| Code | Sample Name | | BCT_60 s_*S. aureus* ATCC 6538 in 25% EtOH | | | | |
|---|---|---|---|---|---|---|---|
| | A6 mixture (Methoxymelonal: Heliopropanal: Aldolone:Stemone = 1:5:1:3) | Dose (% w/v) | 0.1 | 0.125 | 0.15 | 0.175 | 0.200 |
| | | Log reduction | 0.7 | 1.4 | 4.1 | 6.5 | 7.3 |
| | | Effect fraction | 0.100 | 0.190 | 0.560 | 0.890 | 1.000 |
| | 6-methoxy-2,6-dimethylheptanal "Methoxymelonal" | Dose (% w/v) | 0.600 | 0.800 | 0.900 | 1.000 | 1.200 |
| | | Log reduction | 0.1 | 0.8 | 2.6 | 5.1 | 7.1 |
| | | Effect fraction | 0.020 | 0.110 | 0.360 | 0.700 | 0.970 |
| | Heliopropanal | Dose (% w/v) | 0.150 | 0.175 | 0.200 | 0.225 | 0.250 |
| | | Log reduction | 0.4 | 0.4 | 1.3 | 3.5 | 7.3 |
| | | Effect fraction | 0.050 | 0.060 | 0.180 | 0.470 | 1.000 |
| | 7-PROPYL-2H,4H-1,5-BENZODIOXEPIN-3-ONE "Aldolone" | Dose (% w/v) | 0.050 | 0.075 | 0.100 | 0.125 | 0.150 |
| | | Log reduction | 0.3 | 2.0 | 5.0 | 7.2 | 7.2 |
| | | Effect fraction | 0.050 | 0.280 | 0.700 | 1.000 | 1.000 |
| | 5-METHYL-3-HEPTANONE OXIME "Stemone" | Dose (% w/v) | 0.100 | 0.120 | 0.140 | 0.150 | 0.160 |
| | | Log reduction | 0.4 | 1.6 | 4.8 | 6.4 | 7.2 |
| | | Effect fraction | 0.050 | 0.220 | 0.660 | 0.890 | 1.000 |

TABLE 36

Dose response of A3 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| | A3 mixture (Decal: isoeugenol: Perycorolle: Tetralinol = 2:1:5:2) | Dose (% w/v) | 0.0375 | 0.05 | 0.0625 | 0.075 | |
| | | Log reduction | 1.8 | 3.7 | 6.3 | 7.5 | |
| | | Effect fraction | 0.24 | 0.49 | 0.84 | 1.00 | |
| | Decal | Dose (% w/v) | 0.050 | 0.055 | 0.06 | 0.065 | 0.070 |
| | | Log reduction | 1.3 | 2.7 | 2.8 | 4.7 | 5.2 |
| | | Effect fraction | 0.17 | 0.36 | 0.38 | 0.63 | 0.70 |
| | Isoeugenol | Dose (% w/v) | 0.050 | 0.075 | 0.100 | 0.125 | 0.150 |
| | | Log reduction | 0.1 | 1.5 | 4.7 | 7.5 | 7.5 |
| | | Effect fraction | 0.02 | 0.20 | 0.64 | 1.00 | 1.00 |
| | Perycorolle | Dose (% w/v) | 0.050 | 0.060 | 0.07 | 0.080 | 0.100 |
| | | Log reduction | 1.8 | 3.7 | 5.1 | 7.1 | 7.5 |
| | | Effect fraction | 0.24 | 0.49 | 0.67 | 0.95 | 1.00 |
| | Tetralinol | Dose (% w/v) | 0.025 | 0.050 | 0.075 | 0.100 | 0.125 |
| | | Log reduction | 1.2 | 3.2 | 3.9 | 7.1 | 7.1 |
| | | Effect fraction | 0.16 | 0.42 | 0.52 | 0.95 | 0.95 |

TABLE 37

Dose response of A4 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| | A4 mixture (Heliopropanal:Nerol: Phenylhexanol:Tetralinol = 6:3:5:6) | Dose (% w/v) | 0.05 | 0.06 | 0.08 | 0.09 | 0.10 |
| | | Log reduction | 2.4 | 3.1 | 5.2 | 6.6 | 7.4 |
| | | Effect fraction | 0.32 | 0.42 | 0.70 | 0.89 | 1.00 |
| | Heliopropanal | Dose (% w/v) | 0.125 | 0.150 | 0.175 | 0.200 | 0.250 |
| | | Log reduction | 1.9 | 3.4 | 4.8 | 7.2 | 7.4 |
| | | Effect fraction | 0.25 | 0.46 | 0.65 | 0.97 | 1.00 |
| | Nerol | Dose (% w/v) | 0.025 | 0.05 | 0.0625 | 0.075 | 0.100 |
| | | Log reduction | 0.4 | 3.6 | 5.6 | 7.4 | 7.4 |
| | | Effect fraction | 0.05 | 0.48 | 0.76 | 1.00 | 1.00 |
| | phenylhexanol | Dose (% w/v) | 0.025 | 0.050 | 0.060 | 0.070 | 0.080 |
| | | Log reduction | 0.2 | 3.7 | 5.3 | 7.1 | 7.5 |
| | | Effect fraction | 0.03 | 0.50 | 0.71 | 0.95 | 1.00 |
| | Tetralinol | Dose (% w/v) | 0.025 | 0.050 | 0.075 | 0.100 | 0.125 |
| | | Log reduction | 0.7 | 3.6 | 4.5 | 6.9 | 7.5 |
| | | Effect fraction | 0.10 | 0.48 | 0.60 | 0.92 | 1.00 |

TABLE 38

Dose response of S1 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| Item no | Name | | Dose response curve results | | | | |
| | S1 mixture (Aldehyde anisique:Heliotropin: Terpineol = 13:20:3) | Dose (% w/v) | 0.27 | 0.315 | 0.36 | 0.405 | 0.45 |
| | | Log reduction | 0.9 | 2.6 | 4.1 | 6.7 | 7.5 |
| | | Effect fraction | 0.12 | 0.35 | 0.55 | 0.89 | 1.00 |
| | Aldehyde Anisic | Dose (% w/v) | 0.35 | 0.400 | 0.450 | 0.475 | 0.500 |
| | | Log reduction | 1.6 | 4 | 6.2 | 5.9 | 7 |
| | | Effect fraction | 0.21 | 0.53 | 0.82 | 0.78 | 0.92 |
| | Heliotropin | Dose (% w/v) | 0.2 | 0.30 | 0.40 | 0.45 | 0.55 |
| | | Log reduction | 0 | 0.6 | 3.4 | 4.1 | 7.6 |
| | | Effect fraction | 0.00 | 0.08 | 0.45 | 0.53 | 1.00 |
| | Terpineol Ord | Dose (% w/v) | 0.1 | 0.125 | 0.135 | 0.15 | 0.2 |
| | | Log reduction | 1.70 | 4.40 | 4.30 | 6.60 | 7.6 |
| | | Effect fraction | 0.22 | 0.57 | 0.57 | 0.87 | 1.00 |

TABLE 39

Dose response of S11 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| | S11 mixture (Aldehyde anisic:Heliotropin: Terpineol:Heliopropanal = 13:20:3:20) | Dose (% w/v) | 0.14 | 0.21 | 0.28 | 0.315 | 0.35 |
| | | Log reduction | 0.10 | 0.90 | 3.60 | 7.10 | 7.5 |
| | | Effect fraction | 0.01 | 0.12 | 0.49 | 0.95 | 1.00 |
| | Aldehyde Anisic | Dose (% w/v) | 0.3 | 0.35 | 0.4 | 0.45 | 0.5 |
| | | Log reduction | 0.60 | 0.80 | 1.70 | 3.20 | 3.8 |
| | | Effect fraction | 0.08 | 0.11 | 0.22 | 0.42 | 0.51 |
| | Heliotropin | Dose (% w/v) | 0.2 | 0.3 | 0.4 | 0.45 | 0.55 |
| | | Log reduction | 0.00 | 0.40 | 2.60 | 4.20 | 7.5 |
| | | Effect fraction | 0.00 | 0.05 | 0.35 | 0.56 | 1.00 |
| | Terpineol Ord | Dose (% w/v) | 0.1 | 0.125 | 0.135 | 0.15 | 0.2 |
| | | Log reduction | 1.10 | 2.80 | 3.90 | 5.10 | 7.5 |
| | | Effect fraction | 0.15 | 0.37 | 0.52 | 0.68 | 1.00 |
| | Heliopropanal | Dose (% w/v) | 0.125 | 0.15 | 0.175 | 0.2 | 0.25 |
| | | Log reduction | 0.60 | 1.50 | 2.80 | 3.80 | 6.9 |
| | | Effect fraction | 0.08 | 0.21 | 0.37 | 0.51 | 0.92 |

20

TABLE 40

Dose response of S2 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| | S2 mixture (Phenylhexanol: Terpineol: Isoeugenol = 2:5:5) | Dose (% w/v) | 0.03 | 0.06 | 0.0075 | 0.09 | 0.12 |
| | | Log reduction | −0.1 | 1.1 | 2.8 | 3.8 | 7.4 |
| | | Effect fraction | 0.02 | 0.15 | 0.39 | 0.52 | 1.00 |
| | phenylhexanol | Dose (% w/v) | 0.025 | 0.050 | 0.060 | 0.070 | 0.080 |
| | | Log reduction | 0.1 | 2.8 | 4.2 | 5.4 | 7.4 |
| | | Effect fraction | 0.02 | 0.38 | 0.57 | 0.73 | 1.00 |
| | Terpineol Ord | Dose (% w/v) | 0.100 | 0.125 | 0.135 | 0.150 | 0.200 |
| | | Log reduction | 2.4 | 4.4 | 5.3 | 7.4 | 7.4 |
| | | Effect fraction | 0.33 | 0.60 | 0.72 | 1.00 | 1.00 |
| | Isoeugenol | Dose (% w/v) | 0.050 | 0.075 | 0.100 | 0.125 | 0.150 |
| | | Log reduction | 0.0 | 0.4 | 2.1 | 7.1 | 7.5 |
| | | Effect fraction | 0.01 | 0.05 | 0.28 | 0.95 | 1.00 |

TABLE 41

Dose response of S12 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| | S12 mixture (Phenylhexanol: Terpineol: Isoeugenol: Coumarine = 5:1:1:2) | Dose (% w/v) | 0.0225 | 0.045 | 0.0675 | 0.090 | 0.113 |
| | | Log reduction | 0.2 | 0.30 | 2.30 | 5.10 | 7.5 |
| | | Effect fraction | 0.03 | 0.04 | 0.31 | 0.68 | 1.00 |
| | phenylhexanol | Dose (% w/v) | 0.025 | 0.050 | 0.060 | 0.070 | 0.080 |
| | | Log reduction | 0.1 | 2.8 | 4.2 | 5.4 | 7.4 |
| | | Effect fraction | 0.02 | 0.38 | 0.57 | 0.73 | 1.00 |
| | Terpineol Ord | Dose (% w/v) | 0.100 | 0.125 | 0.135 | 0.150 | 0.200 |
| | | Log reduction | 2.4 | 4.4 | 5.3 | 7.4 | 7.4 |
| | | Effect fraction | 0.33 | 0.60 | 0.72 | 1.00 | 1.00 |
| | Isoeugenol | Dose (% w/v) | 0.050 | 0.075 | 0.100 | 0.125 | 0.150 |
| | | Log reduction | 0.0 | 0.4 | 2.1 | 7.1 | 7.5 |
| | | Effect fraction | 0.01 | 0.05 | 0.28 | 0.95 | 1.00 |
| | Coumarine | Dose (% w/v) | 0.30 | 0.35 | 0.4 | 0.45 | 0.50 |
| | | Log reduction | 0.4 | 0.4 | 0.7 | 1.20 | 2.90 |
| | | Effect fraction | 0.05 | 0.05 | 0.09 | 0.16 | 0.39 |

TABLE 42

Dose response of S5 mixture and compositions against *P. aeruginosa* ATCC 15442

| Code | Sample Name | BCT_60 s_*P. aeruginosa* ATCC 15442 in 25% EtOH | | | | | |
|---|---|---|---|---|---|---|---|
| | S5 mixture (EugenolF: | Dose (% w/v) | 0.080 | 0.088 | 0.096 | 0.104 | |
| | phenylhexanol: | Log reduction | 2.2 | 3.1 | 3.7 | 5.1 | |
| | Carbinol muguet = | Effect fraction | 0.30 | 0.42 | 0.50 | 0.69 | |
| | 1:5:10) | | | | | | |
| | Eugenol F | Dose (% w/v) | 0.05 | 0.10 | 0.120 | 0.14 | |
| | | Log reduction | 0.0 | 0.5 | 2.4 | 3.8 | |
| | | Effect fraction | 0.00 | 0.06 | 0.32 | 0.51 | |
| | phenylhexanol | Dose (% w/v) | 0.025 | 0.050 | 0.060 | 0.070 | |
| | | Log reduction | 0 | 2.8 | 4.7 | 7.4 | |
| | | Effect fraction | 0.00 | 0.38 | 0.64 | 1.00 | |
| | Carbinol muguet | Dose (% w/v) | 0.1 | 0.150 | 0.175 | 0.200 | 0.250 |
| | | Log reduction | 0.1 | 1.3 | 3.1 | 4.9 | 7.4 |
| | | Effect fraction | 0.02 | 0.17 | 0.42 | 0.67 | 1.00 |

TABLE 43

Dose response of S15 mixture and compositions against *P. aeruginosa* ATCC 15442

| Code | Sample Name | BCT_60 s_*P. aeruginosa* ATCC 15442 in 25% EtOH | | | | | |
|---|---|---|---|---|---|---|---|
| | S15 mixture (EugenolF: | Dose (% w/v) | 0.104 | 0.117 | 0.13 | 0.143 | |
| | phenylhexanol: | Log reduction | 1.5 | 3.4 | 3.7 | 6.2 | |
| | Carbinol muguet: | Effect fraction | 0.20 | 0.45 | 0.50 | 0.84 | |
| | Benzyl acetate = | | | | | | |
| | 1:5:10:10) | | | | | | |
| | Eugenol F | Dose (% w/v) | 0.05 | 0.10 | 0.120 | 0.14 | |
| | | Log reduction | 0.0 | 0.5 | 2.4 | 3.8 | |
| | | Effect fraction | 0.00 | 0.06 | 0.32 | 0.51 | |
| | phenylhexanol | Dose (% w/v) | 0.025 | 0.050 | 0.060 | 0.070 | |
| | | Log reduction | 0 | 2.8 | 4.7 | 7.4 | |
| | | Effect fraction | 0.00 | 0.38 | 0.64 | 1.00 | |
| | Carbinol muguet | Dose (% w/v) | 0.1 | 0.150 | 0.175 | 0.200 | 0.250 |
| | | Log reduction | 0.1 | 1.3 | 3.1 | 4.9 | 7.4 |
| | | Effect fraction | 0.02 | 0.17 | 0.42 | 0.67 | 1.00 |
| | Benzyl acetate | Dose (% w/v) | 0.2 | 0.25 | 0.400 | 0.450 | 0.5 |
| | | Log reduction | 1.2 | 3.9 | 7.4 | 7.4 | 7.4 |
| | | Effect fraction | 0.16 | 0.52 | 1.00 | 1.00 | 1.00 |

TABLE 44

Dose response of S4 mixture and compositions against *P. aeruginosa* ATCC 15442

| Code | Sample Name | BCT_60 s_*P. aeruginosa* ATCC 15442 in 25% EtOH | | | | | |
|---|---|---|---|---|---|---|---|
| | S4 mixture (Geraniol: | Dose (% w/v) | 0.11 | 0.132 | 0.154 | 0.176 | 0.198 |
| | EugenolF: Cinnamic | Log reduction | 0.7 | 1.6 | 3.3 | 4.5 | 6.8 |
| | alcohol = 2:5:15) | Effect fraction | 0.09 | 0.21 | 0.43 | 0.59 | 0.90 |
| | Geraniol Pur | Dose (% w/v) | 0.03 | 0.040 | 0.050 | 0.060 | 0.080 |
| | | Log reduction | 0.2 | 1.4 | 3.9 | 5.9 | 7.5 |
| | | Effect fraction | 0.03 | 0.18 | 0.52 | 0.79 | 1.00 |
| | Eugenol F | Dose (% w/v) | 0.05 | 0.10 | 0.120 | 0.14 | 0.15 |
| | | Log reduction | 0 | 1.1 | 2.5 | 6.1 | 7.5 |
| | | Effect fraction | 0.00 | 0.15 | 0.33 | 0.81 | 1.00 |
| | Cinnamic alcohol | Dose (% w/v) | 0.15 | 0.2 | 0.25 | 0.3 | 0.4 |
| | | Log reduction | 0.3 | 1.7 | 4.1 | 6.7 | 7.5 |
| | | Effect fraction | 0.04 | 0.23 | 0.54 | 0.89 | 1.00 |

TABLE 45

Dose response of S14 mixture and compositions against *P. aeruginosa* ATCC 15442

| Code | Sample Name | | BCT_60 s_*P. aeruginosa* ATCC 15442 in 25% EtOH | | | | |
|---|---|---|---|---|---|---|---|
| | S14 mixture (Geraniol:EugenolF: Cinnamic alcohol: Calone = 10:5:5:1) | Dose (% w/v) | 0.063 | 0.084 | 0.105 | 0.126 | |
| | | Log reduction | 1.8 | 6.3 | 7.5 | 7.5 | |
| | | Effect fraction | 0.24 | 0.84 | 1.00 | 1.00 | |
| | Geraniol Pur | Dose (% w/v) | 0.03 | 0.040 | 0.050 | 0.060 | 0.080 |
| | | Log reduction | 0.3 | 2.5 | 5.8 | 7.4 | 7.4 |
| | | Effect fraction | 0.05 | 0.34 | 0.78 | 1.00 | 1.00 |
| | Eugenol F | Dose (% w/v) | 0.05 | 0.10 | 0.120 | 0.14 | 0.15 |
| | | Log reduction | −0.3 | 2.1 | 4.7 | 6.8 | 7.4 |
| | | Effect fraction | 0.00 | 0.28 | 0.63 | 0.92 | 1.00 |
| | Cinnamic alcohol | Dose (% w/v) | 0.15 | 0.2 | 0.25 | 0.3 | 0.4 |
| | | Log reduction | 0.7 | 3.9 | 6.5 | 7.5 | 7.5 |
| | | Effect fraction | 0.10 | 0.51 | 0.87 | 1.00 | 1.00 |
| | Calone | Dose (% w/v) | 0.25 | 0.3 | 0.350 | 0.400 | 0.500 |
| | | Log reduction | 0.3 | 1 | 2.7 | 4.3 | 6.9 |
| | | Effect fraction | 0.04 | 0.13 | 0.36 | 0.57 | 0.92 |

TABLE 46

Dose response of A3 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | A3 mixture (Decal: isoeugenol: Perycorolle: Tetralinol = 2:1:5:2) | Dose (% w/v) | 0.025 | 0.04 | 0.05 | 0.0625 | 0.075 |
| | | Log reduction | −0.1 | 0.0 | 1.7 | 4.3 | 7.6 |
| | | Effect fraction | −0.02 | 0.01 | 0.22 | 0.56 | 1 |
| | Decal | Dose (% w/v) | 0.04 | 0.050 | 0.06 | 0.07 | 0.080 |
| | | Log reduction | 0.3 | 0.7 | 1.3 | 2.2 | 5.8 |
| | | Effect fraction | 0.04 | 0.09 | 0.16 | 0.28 | 0.76 |
| | Isoeugenol | Dose (% w/v) | 0.050 | 0.060 | 0.080 | 0.100 | 0.120 |
| | | Log reduction | −0.1 | 0.0 | 0.8 | 2.6 | 7.2 |
| | | Effect fraction | −0.01 | 0.01 | 0.10 | 0.34 | 0.95 |
| | Perycorolle | Dose (% w/v) | 0.040 | 0.050 | 0.06 | 0.070 | 0.080 |
| | | Log reduction | 0.0 | 0.3 | 0.9 | 2.2 | 5.2 |
| | | Effect fraction | 0.00 | 0.04 | 0.12 | 0.29 | 0.68 |
| | Tetralinol | Dose (% w/v) | 0.020 | 0.025 | 0.03 | 0.040 | 0.050 |
| | | Log reduction | 0.0 | 0.1 | 0.9 | 5.3 | 6.2 |
| | | Effect fraction | −0.01 | 0.01 | 0.11 | 0.69 | 0.82 |

TABLE 47

Dose response of A4 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | A4 mixture (Heliopropanal:Nerol: Phenylhexanol: Tetralinol = 6:3:5:6) | Dose (% w/v) | 0.025 | 0.04 | 0.05 | 0.06 | |
| | | Log reduction | 0.3 | 4.2 | 7.7 | 7.7 | |
| | | Effect fraction | 0.04 | 0.55 | 1.00 | 1.00 | |
| | Heliopropanal | Dose (% w/v) | 0.05 | 0.1 | 0.120 | 0.130 | 0.14 |
| | | Log reduction | 0.0 | 0.8 | 2.9 | 3.9 | 5.5 |
| | | Effect fraction | −0.01 | 0.10 | 0.38 | 0.51 | 0.71 |
| | Nerol | Dose (% w/v) | 0.01 | 0.03 | 0.04 | 0.0500 | 0.060 |
| | | Log reduction | 0.0 | 0.7 | 2.2 | 5.6 | 7.3 |
| | | Effect fraction | 0.000 | 0.090 | 0.280 | 0.710 | 0.920 |
| | phenylhexanol | Dose (% w/v) | 0.02 | 0.030 | 0.035 | 0.040 | 0.045 |
| | | Log reduction | 0.4 | 2.1 | 3.8 | 5.7 | 7.9 |
| | | Effect fraction | 0.05 | 0.26 | 0.48 | 0.72 | 1.00 |
| | Tetralinol | Dose (% w/v) | 0.020 | 0.0250 | 0.03 | 0.040 | 0.050 |
| | | Log reduction | 0.2 | 1.3 | 2.5 | 7.3 | 7.7 |
| | | Effect fraction | 0.03 | 0.17 | 0.32 | 0.95 | 1.00 |

TABLE 48

Dose response of S14 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | S14 mixture (Geraniol: EugenolF:Cinnamic alcohol:Calone = 10:5:5:1) | Dose (% w/v) | 0.021 | 0.0525 | 0.063 | 0.084 | 0.105 |
| | | Log reduction | 0.2 | 1.1 | 3.0 | 6.0 | 7.8 |
| | | Effect fraction | 0.02 | 0.14 | 0.39 | 0.77 | 1.00 |
| | Geraniol Pur | Dose (% w/v) | 0.025 | 0.030 | 0.040 | 0.045 | 0.050 |
| | | Log reduction | 0.2 | 0.2 | 2.4 | 3.6 | 4.9 |
| | | Effect fraction | 0.02 | 0.02 | 0.31 | 0.47 | 0.63 |
| | Eugenol F | Dose (% w/v) | 0.05 | 0.075 | 0.10 | 0.125 | 0.15 |
| | | Log reduction | 0.0 | 1.0 | 2.4 | 4.4 | 7.8 |
| | | Effect fraction | 0.00 | 0.13 | 0.31 | 0.56 | 1.00 |
| | Cinnamic alcohol | Dose (% w/v) | 0.15 | 0.175 | 0.2 | 0.25 | 0.3 |
| | | Log reduction | 0.5 | 1.0 | 1.5 | 4.9 | 7.8 |
| | | Effect fraction | 0.06 | 0.12 | 0.19 | 0.63 | 1.00 |
| | Calone | Dose (% w/v) | 0.25 | 0.3 | 0.350 | 0.400 | 0.450 |
| | | Log reduction | 0.7 | 2.7 | 4.2 | 7.2 | 7.8 |
| | | Effect fraction | 0.09 | 0.34 | 0.55 | 0.92 | 1.00 |

TABLE 49

Dose response of S1 mixture and compositions against *Salmonella enterica* ATCC 10708

| Code | Sample Name | | BCT_60 s_*Salmonella enterica* ATCC 10708 in 25% EtOH | | | |
|---|---|---|---|---|---|---|
| | S1 mixture (Aldehyde anisique:Heliotropin:Terpineol = 13:20:3) | Dose (% w/v) | 0.288 | 0.306 | 0.324 | 0.36 |
| | | Log reduction | 0.6 | 0.7 | 2.6 | 5.1 |
| | | Effect fraction | 0.08 | 0.1 | 0.33 | 0.65 |
| | Aldehyde Anisique | Dose (% w/v) | 0.40 | 0.42 | 0.46 | 0.50 |
| | | Log reduction | 1.5 | 2.8 | 5.2 | 7.7 |
| | | Effect fraction | 0.190 | 0.370 | 0.670 | 1.000 |
| | Heliotropin | Dose (% w/v) | 0.3 | 0.4 | 0.5 | 0.6 |
| | | Log reduction | 0.3 | 1.8 | 6.7 | 7.7 |
| | | Effect fraction | 0.03 | 0.23 | 0.87 | 1 |
| | Terpineol Ord | Dose (% w/v) | 0.075 | 0.1 | 0.125 | 0.15 |
| | | Log reduction | 0.3 | 0.8 | 2.4 | 7.7 |
| | | Effect fraction | 0.04 | 0.10 | 0.32 | 1.00 |

TABLE 50

Dose response of S15 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | S15 mixture (EugenolF:phenylhexanol:Carbinol muguet:Benzyl acetate = 1:5:10:10) | Dose (% w/v) | 0.078 | 0.091 | 0.104 | | |
| | | Log reduction | 0.8 | 2.6 | 4.7 | | |
| | | Effect fraction | 0.10 | 0.34 | 0.61 | | |
| | Eugenol F | Dose (% w/v) | 0.05 | 0.075 | 0.10 | 0.125 | 0.15 |
| | | Log reduction | 0.2 | 0.8 | 2.0 | 4.1 | 7.8 |
| | | Effect fraction | 0.03 | 0.11 | 0.25 | 0.52 | 1.00 |
| | phenylhexanol | Dose (% w/v) | 0.02 | 0.030 | 0.035 | 0.040 | 0.045 |
| | | Log reduction | 0.1 | 0.2 | 1.1 | 2.2 | 5.3 |
| | | Effect fraction | 0.01 | 0.03 | 0.14 | 0.28 | 0.68 |
| | Carbinol muguet | Dose (% w/v) | 0.150 | 0.160 | 0.170 | 0.180 | |
| | | Log reduction | 3.0 | 3.7 | 5.3 | 6.5 | |
| | | Effect fraction | 0.39 | 0.49 | 0.69 | 0.84 | 0.95 |
| | Benzyl acetate | Dose (% w/v) | 0.15 | 0.200 | 0.225 | 0.250 | 0.3 |
| | | Log reduction | 0.0 | 1.9 | 5.0 | 6.5 | 7.7 |
| | | Effect fraction | −0.01 | 0.25 | 0.65 | 0.84 | 1.00 |

TABLE 51

Dose response of S5 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | S5 mixture (EugenolF: | Dose (% w/v) | 0.048 | 0.064 | 0.08 | 0.096 | |
| | phenylhexanol:Carbinol | Log reduction | 0.5 | 0.9 | 3.9 | 7.6 | |
| | muguet = 1:5:10) | Effect fraction | 0.06 | 0.12 | 0.5 | 0.97 | |
| | Eugenol F | Dose (% w/v) | 0.05 | 0.075 | 0.10 | 0.125 | 0.15 |
| | | Log reduction | 0.2 | 0.8 | 2.0 | 4.1 | 7.8 |
| | | Effect fraction | 0.03 | 0.11 | 0.25 | 0.52 | 1.00 |
| | phenylhexanol | Dose (% w/v) | 0.02 | 0.030 | 0.035 | 0.040 | 0.045 |
| | | Log reduction | 0.1 | 0.2 | 1.1 | 2.2 | 5.3 |
| | | Effect fraction | 0.01 | 0.03 | 0.14 | 0.28 | 0.68 |
| | Carbinol muguet | Dose (% w/v) | 0.150 | 0.160 | 0.170 | 0.180 | |
| | | Log reduction | 3.0 | 3.7 | 5.3 | 6.5 | |
| | | Effect fraction | 0.39 | 0.49 | 0.69 | 0.84 | 0.95 |

TABLE 52

Dose response of S2 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | S2 mixture | Dose (% w/v) | 0.03 | 0.06 | 0.075 | 0.0825 | 0.09 |
| | (Phenylhexanol: | Log reduction | 0.2 | 4.2 | 7.3 | 7.7 | 7.7 |
| | Terpineol:Isoeugenol = | Effect fraction | 0.03 | 0.55 | 0.95 | 1.00 | 1.00 |
| | 2:5:5) | Dose (% w/v) | 0.02 | 0.030 | 0.035 | 0.040 | 0.045 |
| | phenylhexanol | Log reduction | 0.2 | 2.4 | 4.9 | 6.5 | 7.3 |
| | | Effect fraction | 0.02 | 0.31 | 0.63 | 0.84 | 0.95 |
| | | Dose (% w/v) | 0.075 | 0.100 | 0.125 | 0.1375 | 0.150 |
| | Terpineol Ord | Log reduction | 1.2 | 5.4 | 7.5 | 7.7 | 7.7 |
| | | Effect fraction | 0.15 | 0.70 | 0.97 | 1.00 | 1.00 |
| | | Dose (% w/v) | 0.075 | 0.080 | 0.100 | 0.110 | 0.120 |
| | Isoeugenol | Log reduction | 4.0 | 4.0 | 6.9 | 7.5 | 7.5 |
| | | Effect fraction | 0.54 | 0.53 | 0.92 | 1.00 | 1.00 |

TABLE 53

Dose response of S12 mixture and compositions against *Salmonella enterica* ATCC 10708

| Code | Sample Name | | BCT_60 s_*Salmonella enterica* ATCC 10708 in 25% EtOH | | | | |
|---|---|---|---|---|---|---|---|
| | S12 mixture | Dose (% w/v) | 0.0225 | 0.036 | 0.045 | 0.05625 | 0.0675 |
| | (Phenylhexanol: | Log reduction | 0.5 | 3.6 | 5.3 | 7.3 | 7.5 |
| | Terpineol: | Effect fraction | 0.07 | 0.47 | 0.71 | 0.97 | 1.00 |
| | Isoeugenol: | | | | | | |
| | Coumarine = 5:1:1:2) | | | | | | |
| | phenylhexanol | Dose (% w/v) | 0.02 | 0.030 | 0.035 | 0.040 | 0.045 |
| | | Log reduction | 0.2 | 2.4 | 4.9 | 6.5 | 7.3 |
| | | Effect fraction | 0.02 | 0.31 | 0.63 | 0.84 | 0.95 |
| | Terpineol Ord | Dose (% w/v) | 0.075 | 0.100 | 0.125 | 0.1375 | 0.150 |
| | | Log reduction | 1.2 | 5.4 | 7.5 | 7.7 | 7.7 |
| | | Effect fraction | 0.15 | 0.70 | 0.97 | 1.00 | 1.00 |
| | Isoeugenol | Dose (% w/v) | 0.075 | 0.080 | 0.100 | 0.110 | 0.120 |
| | | Log reduction | 4.0 | 4.0 | 6.9 | 7.5 | 7.5 |
| | | Effect fraction | 0.54 | 0.53 | 0.92 | 1.00 | 1.00 |
| | Coumarine | Dose (% w/v) | 0.300 | 0.400 | 0.450 | 0.500 | 0.600 |
| | | Log reduction | 0.2 | 3.0 | 5.1 | 7.5 | 7.5 |
| | | Effect fraction | 0.03 | 0.40 | 0.68 | 1.00 | 1.00 |

TABLE 54

Deo application: Log reduction by BCT test with contact time of 120 s and calculated combination index (CI) value

| Code | Composition | Corynebacterium xerosis ATCC 373 | | | Staphylococcus haemolyticus 114126 | | |
|---|---|---|---|---|---|---|---|
| | | Conc. (%) | Log reduction | CI Value | Conc. (%) | Log reduction | CI Value |
| A4 | Heliopropanal: | 0.1250 | 1.2 | 0.94 | 0.1000 | 1.7 | 0.98 |
| | Nerol: | 0.1500 | 3.2 | 0.73 | 0.1250 | 3.1 | 1.06 |
| | Phenylhexanol: | 0.1750 | 3.7 | 0.78 | 0.1500 | 5.1 | 1.06 |
| | Tetralinol = 6:3:5:6 | 0.2000 | 5.0 | 0.73 | 0.1750 | >7.0 | 0.67 |
| S12 | Phenylhexanol: | 0.1800 | 2.2 | 1.27 | 0.1350 | 1.1 | 0.94 |
| | Terpineol: | 0.2700 | 4.7 | 1.11 | 0.1800 | 4.4 | 0.97 |
| | Isoeugenol: | 0.3600 | >7.0 | 0.55 | 0.2250 | >7.0 | 0.74 |
| | Coumarine = 5:1:1:2 | | | | | | |
| S15 | EugenolF: | 0.2600 | 2.6 | 0.77 | 0.1950 | 1.2 | 0.96 |
| | Phenylhexanol: | 0.3250 | 4.0 | 0.78 | 0.1560 | 3.7 | 0.99 |
| | Carbinol muguet: | 0.3900 | 4.7 | 0.84 | 0.3250 | 5.8 | 1.01 |
| | Benzyl acetate = | 0.5200 | 5.9 | 0.84 | 0.3900 | >7.0 | 0.72 |
| | 1:5:10:10 | | | | | | |
| S2 | Phenylhexanol: | 0.1800 | 1.5 | 0.96 | 0.1500 | 0.7 | 0.88 |
| | Terpineol: | 0.2400 | 4.0 | 0.89 | 0.1800 | 3.0 | 0.88 |
| | Isoeugenol = 2:5:5 | 0.4500 | 6.4 | 0.87 | 0.2400 | 5.4 | 1.02 |
| A3 | Decal:Isoeugenol: | 0.1000 | 0.3 | 1.00 | 0.1000 | 0.5 | 0.91 |
| | Perycorolle: | 0.1500 | 3.5 | 0.91 | 0.1250 | 1.6 | 0.98 |
| | Tetralinol = 2:1:5:2 | 0.2000 | 6.0 | 0.90 | 0.1500 | 5.2 | 0.94 |
| S14 | Geraniol:EugenolF: | 0.1580 | 1.8 | 0.93 | 0.1260 | 0.8 | 0.94 |
| | Cinnamic alcohol: | 0.2100 | 4.9 | 0.97 | 0.1365 | 1.3 | 0.96 |
| | Calone = 10:5:5:1 | 0.2625 | 6.8 | 0.93 | 0.1470 | 2.0 | 0.96 |
| S5 | EugenolF: | | | | 0.1600 | 1.1 | 1.01 |
| | Phenylhexanol: | | | | 0.1920 | 1.9 | 1.09 |
| | Carbinol muguet = | | | | 0.2400 | 4.8 | 1.03 |
| | 1:5:10 | | | | | | |
| S4 | Geraniol:EugenolF: | | | | 0.2750 | 1.8 | 1.01 |
| | Cinnamic alcohol = | | | | 0.3300 | 4.1 | 1.02 |
| | 2:5:15 | | | | | | |

Synergistic: CI < 0.90  Additive 1.10 ≥ CI ≥ 0.90

TABLE 55

Liquid soap application: Log reduction by BCT test with contact time of 45 s and calculated combination index (CI) value

| Code | Composition | Escherichia coli ATCC 10536 | | |
|---|---|---|---|---|
| | | Conc. (%) | Log reduction | CI Value |
| A4 | Heliopropanal:Nerol: | 0.0400 | 0.8 | 1.00 |
| | Phenylhexanol: | 0.0450 | 2.5 | 0.96 |
| | Tetralinol = 6:3:5:6 | 0.0500 | 3.8 | 0.99 |
| | | 0.0600 | >7.0 | 0.76 |
| A3 | Decal:Isoeugenol: | 0.0550 | 1.7 | 1.00 |
| | Perycorolle: | 0.0600 | 3.6 | 1.02 |
| | Tetralinol = 2:1:5:2 | 0.0650 | 4.9 | 1.05 |
| | | 0.0750 | >7.0 | 0.94 |
| A9 | Phenethylol:Geraniol: | 0.1250 | 0.7 | 0.94 |
| | Styrallyl Acetate: | 0.1500 | 5.2 | 1.05 |
| | Eugenol F = 10:5:3:2 | 0.1750 | >7.0 | 1.06 |
| A10 | Coumarine:Heliotropin:Ethyl | 0.3000 | 0.9 | 1.07 |
| | Cinnamate:Cinnamic alcohol: | 0.3250 | 5.3 | 0.97 |
| | Benzyl alcohol = 2:4:1:6:7 | 0.3500 | >7.0 | 0.90 |
| E1 | Decal: Geraniol: | 0.0420 | 0.7 | 0.98 |
| | Tetralinol = 6:5:3 | 0.0490 | 2.7 | 0.98 |
| | | 0.0560 | 5.8 | 0.96 |
| | | 0.0700 | >7.0 | 0.90 |
| E2 | Decal:Geraniol:Tetralinol: | 0.0950 | 1.2 | 0.98 |
| | Cinnamic alcohol = 6:5:3:24 | 0.1140 | 3.2 | 1.05 |
| E3 | E3 mixture (Decal:Aldehyde | 0.1925 | 0.8 | 0.98 |
| | Anisic:Nerol = 1:9:1) | 0.2200 | 1.7 | 1.06 |
| | | 0.2475 | 5.4 | 1.04 |
| E4 | Decal:Aldehyde Anisic:Nerol: | 0.1688 | 1.0 | 0.98 |
| | Heliopropanal = 2:18:2:5 | 0.2025 | 4.3 | 1.03 |
| | | 0.2193 | >7.0 | 0.93 |
| E5 | Decal:Heliotropin: | 0.1875 | 0.1 | 0.94 |
| | Terpineol = 10:90:25 | 0.2500 | 2.3 | 1.03 |
| | | 0.2812 | 4.7 | 1.08 |
| | | 0.3125 | >7.0 | 1.06 |
| E6 | Decal:Heliotropin:Terpineol: | 0.1638 | 0.5 | 0.95 |
| | Ethyl cinnamate = 10:90:25:6 | 0.1965 | 2.5 | 1.03 |
| | | 0.2292 | 6.5 | 1.04 |

Synergistic: CI < 0.90  Additive 1.10 ≥ CI ≥ 0.90

TABLE 56

Surface cleaner application: Log reduction by BCT test with contact time of 60 s and calculated combination index (CI) value

| | | Staphylococcus aureus ATCC 6538 | | | Pseudomonas aeroginosa ATCC 15442 | | | Salmonella enterica ATCC 10708 | | |
|---|---|---|---|---|---|---|---|---|---|---|
| Code | Composition | Conc. (%) | Log reduction | CI Value | Conc. (%) | Log reduction | CI Value | Conc. (%) | Log reduction | CI Value |
| A4 | Heliopropanal: | 0.0600 | 1.6 | 0.91 | 0.0500 | 2.4 | 0.98 | 0.0250 | 0.3 | 0.87 |
| | Nerol: | 0.0700 | 4.3 | 0.90 | 0.0600 | 3.1 | 1.08 | 0.0400 | 4.2 | 0.92 |
| | Phenylhexanol: | 0.0800 | 6.3 | 0.93 | 0.0900 | 6.6 | 1.03 | 0.0500 | >7.0 | 0.68 |
| | Tetralinol = 6:3:5:6 | | | | | | | | | |
| S12 | Phenylhexanol: | 0.0450 | 0.3 | 0.66 | 0.0675 | 2.3 | 1.03 | 0.0360 | 3.6 | 0.74 |
| | Terpineol: | 0.0900 | 2.8 | 0.96 | 0.0900 | 5.1 | 1.08 | 0.0450 | 5.3 | 0.83 |
| | Isoeugenol: | 0.1350 | >7.0 | 0.82 | 0.1130 | >7.0 | 0.75 | 0.0563 | >7.0 | 0.76 |
| | Coumarine = 5:1:1:2 | | | | | | | | | |
| S15 | EugenolF: | 0.1300 | 1.2 | 0.93 | 0.1040 | 1.5 | 0.96 | 0.0910 | 2.6 | 0.86 |
| | Phenylhexanol: | 0.1560 | 2.3 | 1.01 | 0.1170 | 3.4 | 0.95 | 0.1040 | 4.7 | 0.87 |
| | Carbinol muguet: | 0.1820 | 6.3 | 0.88 | 0.1300 | 3.7 | 1.03 | 0.1170 | 6.7 | 0.83 |
| | Benzyl acetate = | 0.2080 | >7.0 | 0.83 | 0.1430 | 6.2 | 0.95 | 0.1300 | 7.7 | 0.68 |
| | 1:5:10:10 | | | | | | | | | |
| S2 | Phenylhexanol: | 0.0600 | 1.1 | 0.61 | 0.0750 | 2.8 | 0.91 | 0.0300 | 0.2 | 0.68 |
| | Terpineol: | 0.0900 | 3.1 | 0.78 | 0.0900 | 3.8 | 1.02 | 0.0600 | 4.2 | 0.90 |
| | Isoeugenol = 2:5:5 | 0.1200 | 5.7 | 0.87 | 0.1200 | >7.0 | 0.76 | 0.0750 | >7.0 | 0.82 |
| A3 | Decal:Isoeugenol: | 0.0500 | 1.4 | 0.87 | 0.0375 | 1.8 | 0.78 | 0.0400 | 0.0 | 1.11 |
| | Perycorolle: | 0.0625 | 2.3 | 0.95 | 0.0500 | 3.7 | 0.85 | 0.0500 | 1.7 | 0.90 |
| | Tetralinol = 2:1:5:2 | 0.0750 | 3.6 | 0.99 | 0.0625 | 6.3 | 0.80 | 0.0625 | 4.3 | 0.93 |
| | | 0.0875 | 5.4 | 0.93 | 0.0750 | >7.0 | 0.61 | 0.0750 | >7.0 | 0.65 |
| S14 | Geraniol:EugenolF: | 0.1050 | 4.0 | 0.93 | 0.0630 | 1.8 | 1.08 | 0.0525 | 1.1 | 0.90 |
| | Cinnamic alcoho: | 0.1155 | 6.1 | 0.91 | 0.0840 | 6.3 | 1.04 | 0.0630 | 3.0 | 0.92 |
| | Calone = 10:5:5:1 | 0.1260 | >7.0 | 0.76 | 0.1050 | >7.0 | 0.92 | 0.0840 | 6.0 | 1.02 |
| S5 | EugenolF: | 0.0960 | 1.1 | 0.90 | 0.0800 | 2.2 | 0.90 | 0.0480 | 0.5 | 0.80 |
| | Phenylhexanol: | 0.1120 | 2.5 | 0.93 | 0.0880 | 3.1 | 0.94 | 0.0640 | 0.9 | 0.96 |
| | Carbinol muguet = | 0.1280 | 4.1 | 0.95 | 0.0960 | 3.7 | 0.99 | 0.0800 | 3.9 | 0.92 |
| | 1:5:10 | 0.1600 | >7.0 | 0.81 | 0.1040 | 5.1 | 0.99 | 0.0960 | >7.0 | 0.71 |
| S1 | Aldehyde anisic: | 0.2700 | 0.2 | 0.76 | 0.3150 | 2.6 | 1.02 | 0.288 | 0.6 | 1.01 |
| | Heliotropin: | 0.3600 | 2.0 | 0.79 | 0.3600 | 4.1 | 1.07 | 0.306 | 0.7 | 1.05 |
| | Terpineol = 13:20:3 | 0.4500 | 3.0 | 0.93 | 0.4050 | 6.7 | 1.00 | 0.324 | 2.6 | 0.99 |
| | | 0.5400 | 6.9 | 0.82 | 0.4500 | >7.0 | 0.86 | 0.36 | 5.1 | 1.00 |
| S11 | Aldehyde anisic: | 0.2800 | 1.9 | 0.82 | 0.2100 | 0.9 | 1.02 | | | |
| | Heliotropin: | 0.3500 | 3.1 | 0.96 | 0.2800 | 3.6 | 1.04 | | | |
| | Terpineol: | 0.3850 | 5.7 | 0.92 | 0.3150 | >7.0 | 0.79 | | | |
| | Heliopropanal = 13:20:3:20 | | | | | | | | | |
| A6 | Methoxymelonal: | 0.1250 | 1.4 | 0.87 | | | | | | |
| | Heliopropanal: | 0.1500 | 4.1 | 0.91 | | | | | | |
| | Aldolone:Stemone = | 0.1750 | 6.5 | 0.91 | | | | | | |
| | 1:5:1:3 | 0.2000 | >7.0 | 0.85 | | | | | | |
| S6-G | EugenolF:Aldehyde | 0.0175 | 1.4 | 1.04 | | | | | | |
| | C11 Lique: | 0.0263 | 3.9 | 0.92 | | | | | | |
| | Cinnami aldehyde = | 0.0350 | 4.2 | 1.17 | | | | | | |
| | 5:1:1 | | | | | | | | | |
| S4 | Geraniol:EugenolF: | | | | 0.1320 | 1.6 | 1.06 | | | |
| | Cinnamic alcohol = | | | | 0.1430 | 2.0 | 1.11 | | | |
| | 2:5:15 | | | | 0.1540 | 3.3 | 1.09 | | | |
| | | | | | 0.1760 | 4.5 | 1.16 | | | |

Synergistic: CI < 0.90 Additive 1.10 ≥ CI ≥ 0.90 Antagonistic: CI > 1.10

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

The invention claimed is:

1. A composition, comprising:
   perfume ingredients,
   the perfume ingredients comprising:
   i. heliopropanal, nerol, phenylhexanol, and tetralinol;
   ii. anisic aldehyde, heliotropin, and terpineol;
   iii. anisic aldehyde, heliotropin, terpineol, and heliopropanal;
   iv. decal, isoeugenol, perycorolle, and tetralinol;
   V. phenylhexanol, terpineol, and isoeugenol;
   vi. phenylhexanol, terpineol, isoeugenol, and coumarine;
   vii. eugenol F, phenylhexanol, and carbinol muguet; or
   viii. eugenol F, phenylhexanol, carbinol muguet, and benzyl acetate,
   wherein the perfume ingredients are present in the composition in an amount sufficient to provide a synergistic antimicrobial effect.

2. A method, comprising treating a substrate comprising microbes with the composition of claim 1, in an amount effective to provide an antimicrobial effect.

3. The composition of claim 1, wherein the ratio of the heliopropanal, nerol, phenylhexanol, and tetralinol is 6:3:5:6.

4. The composition of claim 1, wherein the ratio of the anisic aldehyde, heliotropin, and terpineol is 13:20:3.

5. The composition of claim 1, wherein the ratio of the anisic aldehyde, heliotropin, terpineol, and heliopropanal is 13:20:3:20.

6. The composition of claim 1, wherein the ratio of the decal, isoeugenol, perycorolle, and tetralinol is 2:1:5:2.

7. The composition of claim 1, wherein the ratio of the phenylhexanol, terpineol, and isoeugenol is 2:5:5.

8. The composition of claim 1, wherein the ratio of the phenylhexanol, terpineol, isoeugenol, and coumarine is 5:1:1:2.

9. The composition of claim 1, wherein the ratio of the eugenol F, phenylhexanol, and carbinol is 1:5:10.

10. The composition of claim 1, wherein the ratio of the eugenol F, phenylhexanol, carbinol muguet, and benzyl acetate is 1:5:10:10.

11. The composition of claim 1, further comprising at least one ingredient selected from the group consisting of a perfumery carrier, a perfuming co-ingredient and mixtures thereof; and optionally at least one perfumery adjuvant.

12. The composition of claim 1, wherein the composition is formulated as a consumer product, selected from the group consisting of: a perfume, a fabric care product, a body-care product, a cosmetic preparation, a skin-care product, an air care product, and a home care product.

13. The composition of claim 12, wherein the consumer product is selected from the group consisting of: a fine perfume, a splash or eau de perfume, a cologne, an shave or after-shave lotion, a liquid or solid detergent, a fabric softener, a fabric refresher, an ironing water, a paper, a bleach, a carpet cleaners, a curtain-care product, a shampoo, a coloring preparation, a color care product, a hair shaping product, a dental care product, a disinfectant, an intimate care product, a hair spray, a vanishing cream, a deodorant or antiperspirant, hair remover, tanning or sun product, nail products, skin cleansing, a makeup, a perfumed soap, shower or bath mousse, oil or gel, a foot/hand care product, a hygiene product, an air freshener, a "ready to use" powdered air freshener, a mold remover, furnisher care, wipe, a dish detergent or hard-surface detergent, a leather care product, or a car care product.

14. The composition of claim 1, wherein the composition provides the antimicrobial effect by inactivating bacterial cells.

15. The composition of claim 14, wherein the antimicrobial effect is an inhibition of growth of a bacterial strain selected from the group consisting of: *Corynebacterium xerosis, Pseudomonas aeruginosa, Salmonella enterica, Staphylococcus haemolyticus, Staphylococcus aureus*, and *Escherichia coli*.

* * * * *